US012695842B2

(12) United States Patent (10) Patent No.: US 12,695,842 B2

Wu (45) Date of Patent: Jul. 28, 2026

(54) METHOD OF PROCESSING IMAGE, ELECTRONIC DEVICE, AND STORAGE MEDIUM

(71) Applicant: BOE TECHNOLOGY GROUP CO., LTD., Beijing (CN)

(72) Inventor: Yanhong Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 253 days.

(21) Appl. No.: 18/711,989

(22) PCT Filed: Apr. 27, 2023

(86) PCT No.: PCT/CN2023/091123

§ 371 (c)(1),
(2) Date: May 21, 2024

(87) PCT Pub. No.: WO2024/221327

PCT Pub. Date: Oct. 31, 2024

(65) Prior Publication Data

US 2025/0080682 A1 Mar. 6, 2025

(51) Int. Cl.
*G06T 7/90* (2017.01)
*G06V 10/56* (2022.01)
(Continued)

(52) U.S. Cl.
CPC ................. *H04N 1/60* (2013.01); *G06T 7/90* (2017.01); *G06V 10/56* (2022.01); *G06V 10/751* (2022.01); *G06T 2207/10024* (2013.01)

(58) Field of Classification Search
CPC .................................... H04N 1/60; G06T 7/90
See application file for complete search history.

(56) References Cited

U.S. PATENT DOCUMENTS 6,539,108 B1 3/2003 Kobayashi et al.
9,332,158 B2 5/2016 Mori et al.
(Continued)

FOREIGN PATENT DOCUMENTS

CN 103312937 A 9/2013
CN 104869281 A 8/2015
(Continued)

OTHER PUBLICATIONS

Translation of Extended European Search Report and Communication pursuant to Rules 10(2) and 70a(2) EPC for European Application No. EP. 2393424.2, dated Nov. 10, 2025, 10 pages.

*Primary Examiner* — Edward Park

(74) *Attorney, Agent, or Firm* — Westman, Champlin & Koehler, P.A.

(57) ABSTRACT

A method of processing an image, an electronic device, and a storage medium. The method includes: determining, based on a predetermined color mode, a second rendering color of pixels of an original image according to a first rendering color of the pixels, where the first rendering color corresponds to a first color space; adjusting the second rendering color according to the second rendering color and an original rendering color of the pixels to obtain a third rendering color of the pixels, the original, second, and third rendering colors corresponding to the second color space, the first rendering color being obtained by performing a color space conversion on the original rendering color; and obtaining a target image according to the third rendering color, where a region corresponding to a visual saliency region of the original image in the target image has a color corresponding to the predetermined color mode.

20 Claims, 11 Drawing Sheets

100

(51) Int. Cl.
    *G06V 10/75*     (2022.01)
    *H04N 1/60*     (2006.01)

(56)         References Cited

U.S. PATENT DOCUMENTS

| | | | |
|---|---|---|---|
| 11,705,079 B2 | 7/2023 | Wu et al. | |
| 2007/0188788 A1 | 8/2007 | Hayaishi | |
| 2015/0237235 A1 | 8/2015 | Mori et al. | |
| 2015/0338722 A1* | 11/2015 | Bonnier | G03B 15/07 |
| | | | 362/4 |
| 2017/0083762 A1* | 3/2017 | Segalovitz | G06V 30/40 |
| 2020/0105221 A1* | 4/2020 | Marcu | G06T 5/92 |
| 2022/0180823 A1 | 6/2022 | Wu et al. | |
| 2025/0080682 A1* | 3/2025 | Wu | G06V 10/56 |

FOREIGN PATENT DOCUMENTS

| | | |
|---|---|---|
| CN | 110555807 A | 12/2019 |
| CN | 110570380 A | 12/2019 |
| CN | 112598585 A | 4/2021 |
| CN | 114494073 A | 5/2022 |
| JP | 2003348363 A | 12/2003 |

* cited by examiner

100

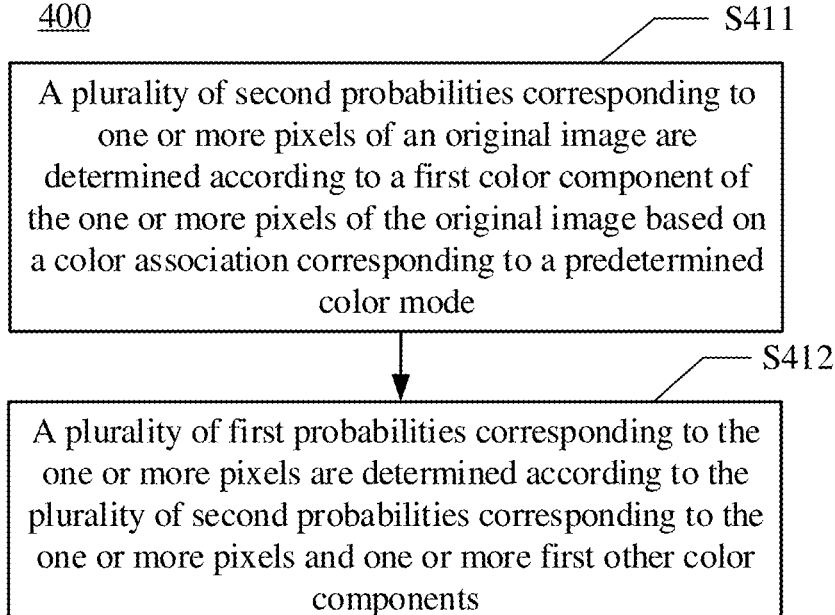

400                                          S411

A plurality of second probabilities corresponding to one or more pixels of an original image are determined according to a first color component of the one or more pixels of the original image based on a color association corresponding to a predetermined color mode

S412

A plurality of first probabilities corresponding to the one or more pixels are determined according to the plurality of second probabilities corresponding to the one or more pixels and one or more first other color components

FIG. 4

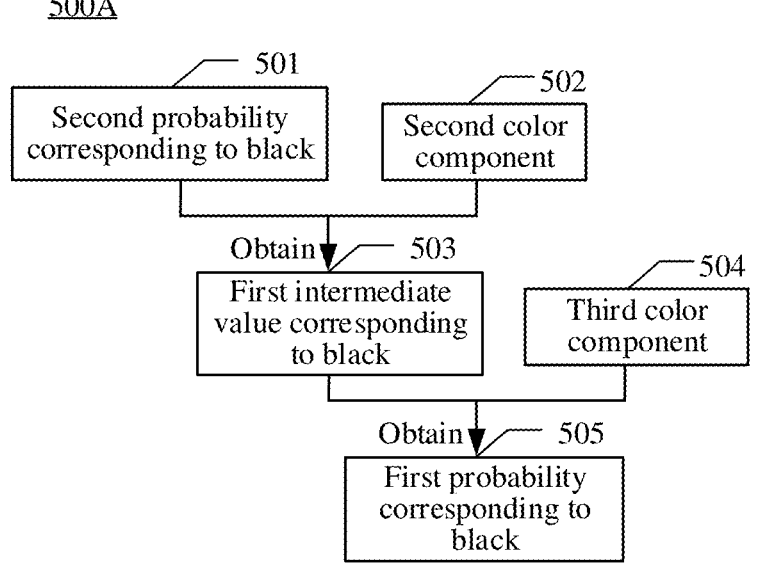

500A

501
Second probability corresponding to black

502
Second color component

Obtain          503
First intermediate value corresponding to black

504
Third color component

Obtain          505
First probability corresponding to black

——  ——  ——     White

—  —  —  —  —  —     Black

—  ·  —  ·  —  ·  —     Red

600B

|  |  |  |  |
|---|---|---|---|
| — — — | White | · — · — · — | Red |
| — — — — — | Black | — — — — | Yellow |

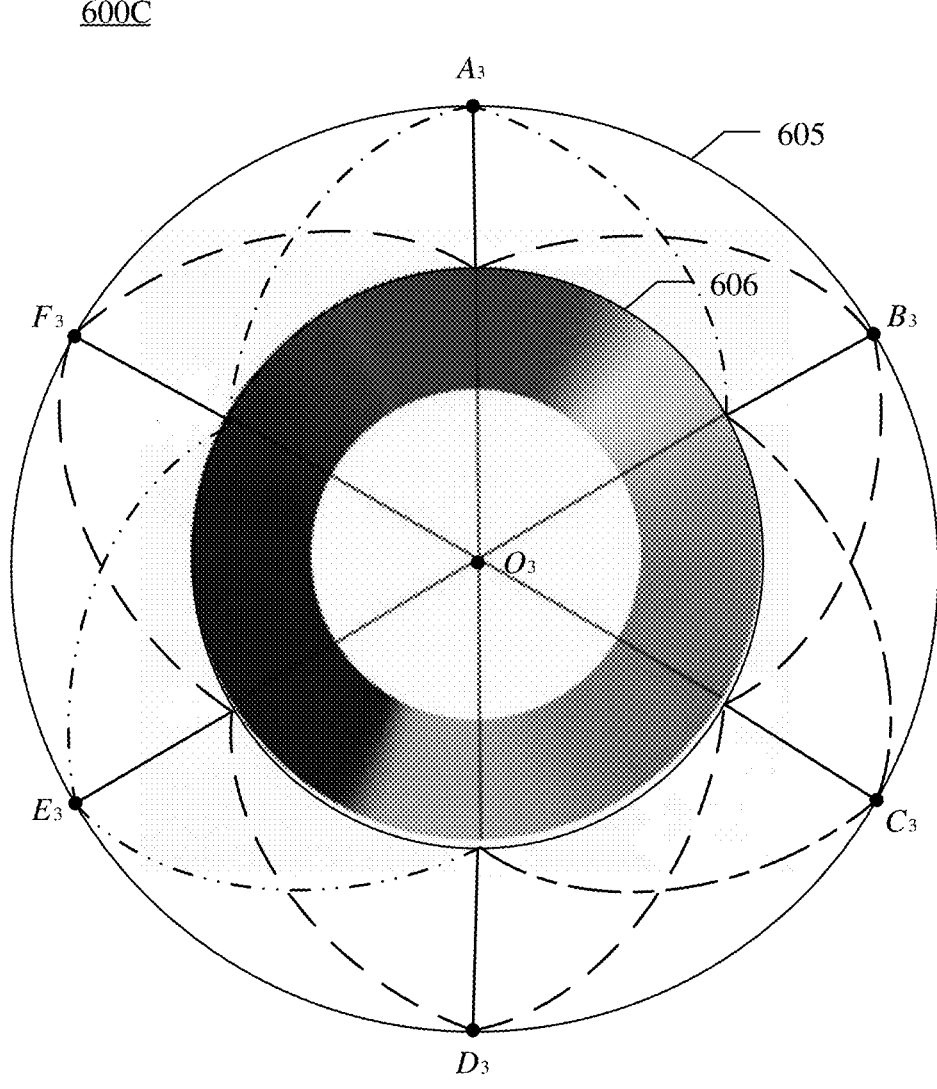
600C
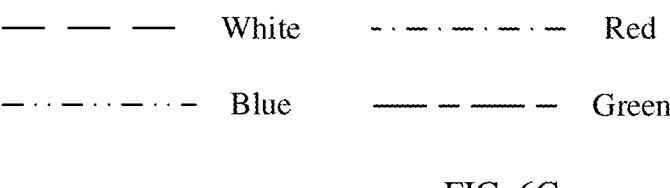
FIG. 6C

600D
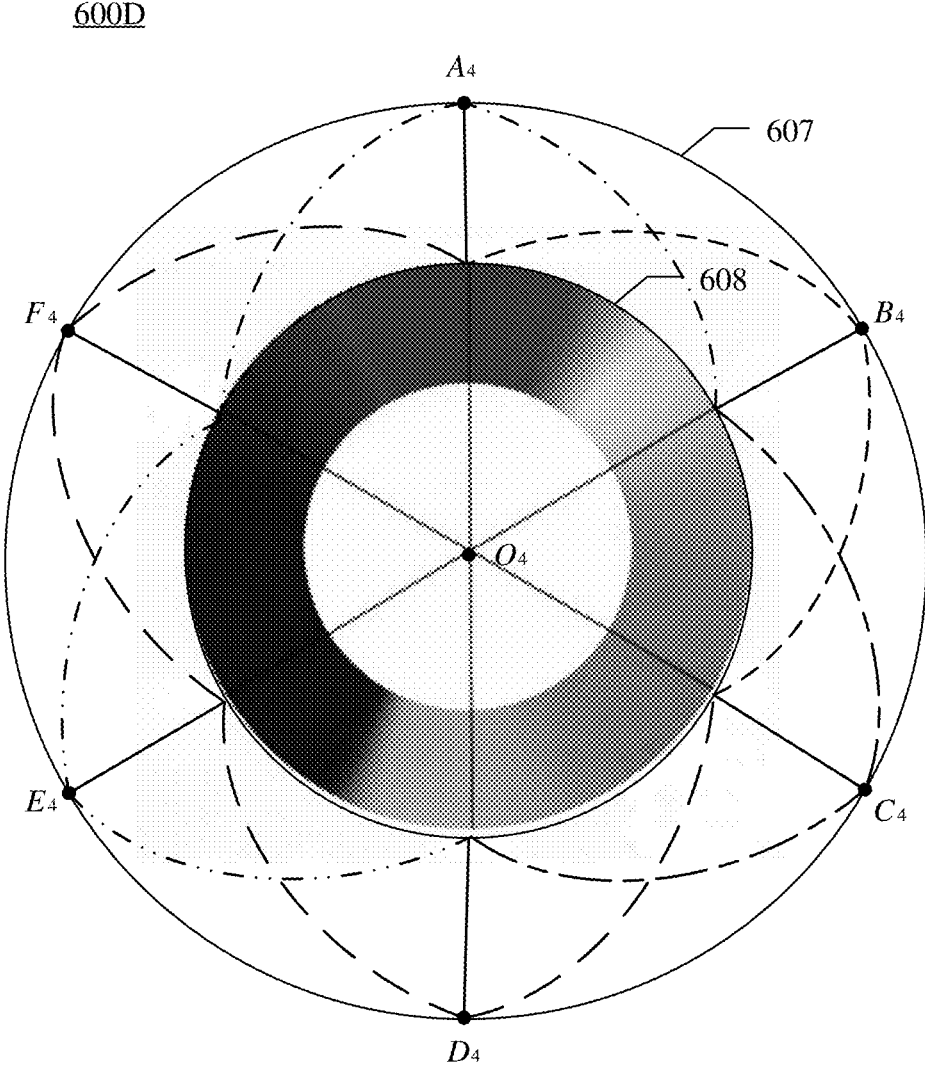
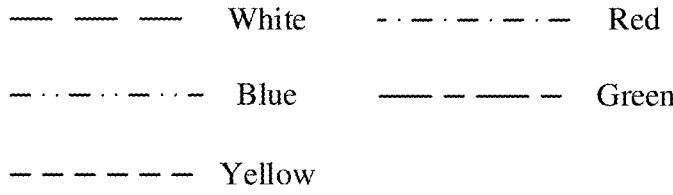
| | | | |
|---|---|---|---|
| ——— ——— ——— | White | — · — · — · — | Red |
| — · · — · · — · · — | Blue | — — —— — | Green |
| — — — — — — | Yellow | | |
FIG. 6D

600E

| — — — | White | — · — · — · — | Red |
| — · — · — · — | Blue | — — — — — | Green |
| — — — — — — | Yellow | · · · · · · · · · | Orange |

700
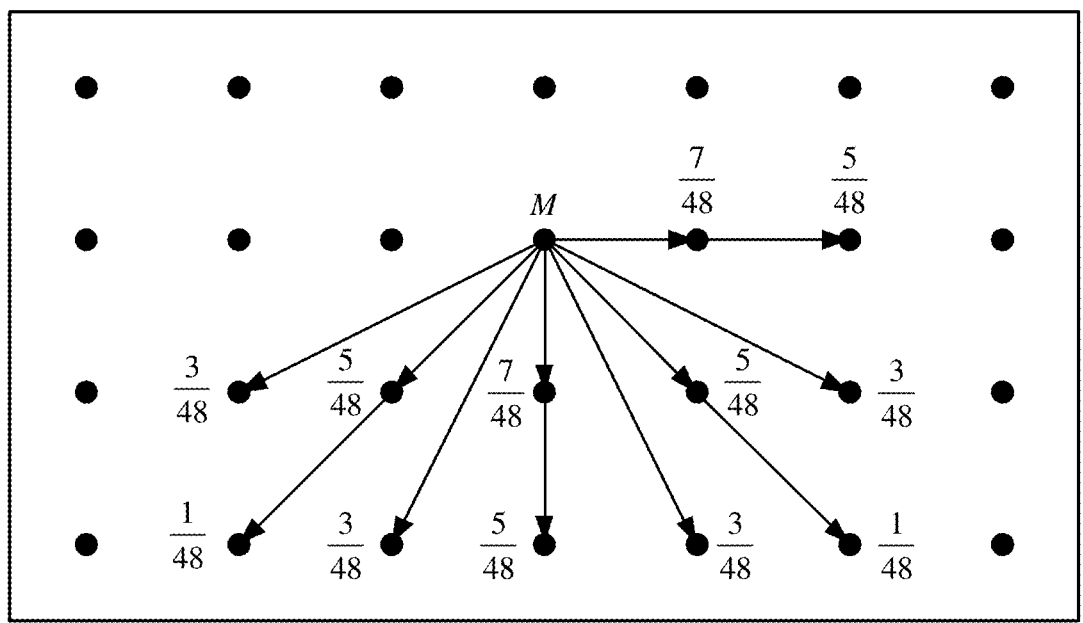
FIG. 7
800
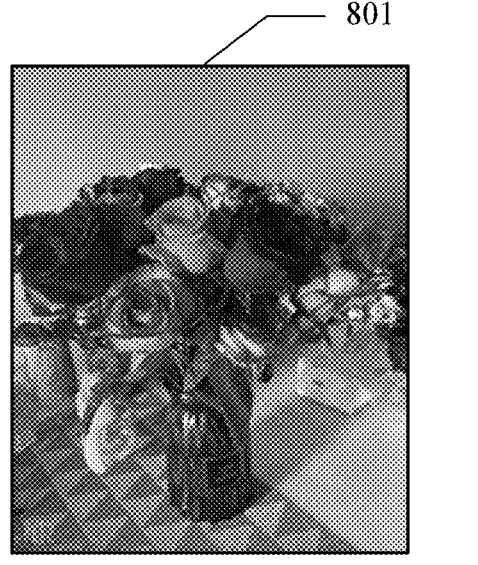
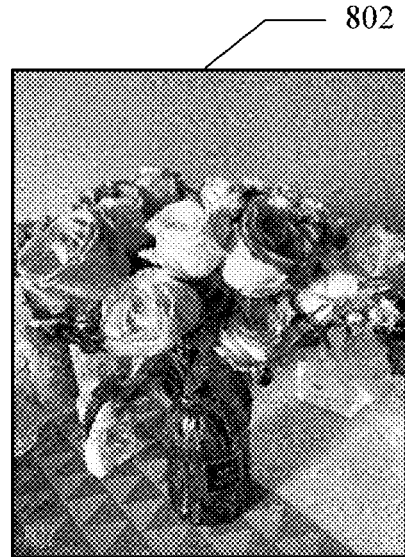
FIG. 8

METHOD OF PROCESSING IMAGE, ELECTRONIC DEVICE, AND STORAGE MEDIUM

CROSS REFERENCE TO RELATED APPLICATION(S)

This application is a Section 371 National Stage Application of International Application No. PCT/CN2023/091123, filed on Apr. 27, 2023, entitled "METHOD OF PROCESSING IMAGE, ELECTRONIC DEVICE, AND STORAGE MEDIUM", the content of which is incorporated by reference in its entirety.

TECHNICAL FIELD

The present disclosure relates to fields of an image processing technology and a display technology, and more specifically, to a method of processing an image, an electronic device, and a storage medium.

BACKGROUND

With a development of an electronic technology, a display technology has emerged, which may be applied to e-book readers, electronic paper, shelf labels, and electronic table cards, etc.

In a process of displaying an image on an electronic ink screen, it is possible to convert image data of the image into target color data according to a predetermined algorithm by using an internal image processor. By changing charges of surface particles, it is possible to arrange particles having different colors in an orderly manner to display the image.

SUMMARY

In view of this, the present disclosure provides a method of processing an image, an electronic device, and a storage medium.

According to an aspect of the present disclosure, a method of processing an image is provided, including: determining, based on a predetermined color mode, a second rendering color of one or more pixels of an original image according to a first rendering color of the one or more pixels of the original image, where the first rendering color corresponds to a first color space, and the second rendering color corresponds to a second color space; adjusting the second rendering color of the one or more pixels according to the second rendering color of the one or more pixels and an original rendering color of the one or more pixels, so as to obtain a third rendering color of the one or more pixels, where the original rendering color and the third rendering color correspond to the second color space, and the first rendering color is obtained by performing a color space conversion on the original rendering color; and obtaining a target image according to the third rendering color of the one or more pixels, where a region corresponding to a visual saliency region of the original image in the target image has a color corresponding to the predetermined color mode.

According to another aspect of the present disclosure, an electronic device is provided, including: one or more processors; a memory configured to store one or more instructions, where the one or more instructions, when executed by the one or more processors, are configured to cause the one or more processors to perform the method described in the present disclosure.

According to another aspect of the present disclosure, a computer-readable storage medium having executable instructions therein is provided, and the executable instructions, when executed by a processor, are configured to cause the processor to perform the method described in the present disclosure.

According to another aspect of the present disclosure, a computer program product containing computer-executable instructions is provided, where the computer-executable instructions, when executed, are configured to perform the method described in the present disclosure.

BRIEF DESCRIPTION OF THE DRAWINGS

The above and other objectives, features and advantages of the present disclosure will be clear through the following descriptions of embodiments of the present disclosure with reference to accompanying drawings, and in the drawings:

FIG. 4 schematically shows a flowchart of a method of determining a plurality of first probabilities corresponding to one or more pixels according to a first color component of the one or more pixels of the original image based on a color association corresponding to a predetermined color mode according to embodiments of the present disclosure;

FIG. 5A schematically shows an example schematic diagram of a process of determining a plurality of first probabilities corresponding to one or more pixels according to a plurality of second probabilities corresponding to the one or more pixels and one or more first other color components according to embodiments of the present disclosure;

Figure 6A:
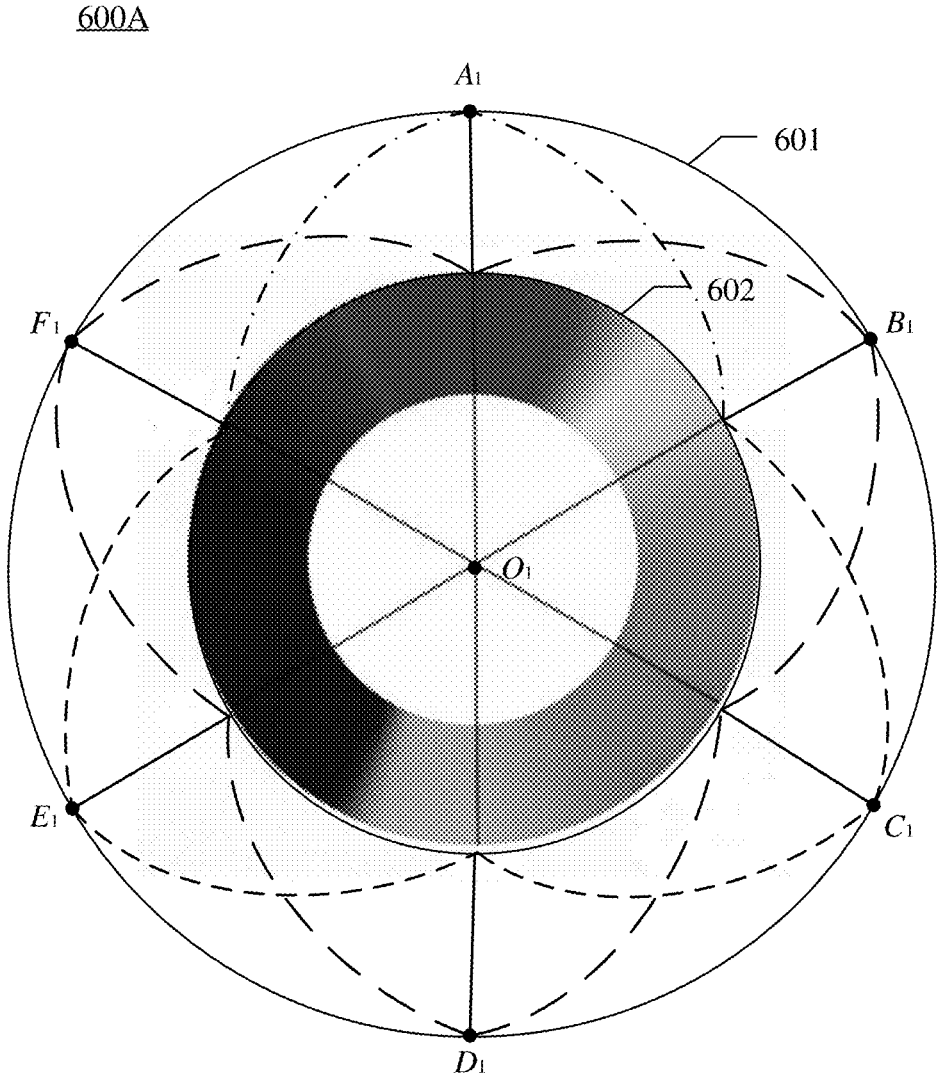
FIG. 6A schematically shows an example schematic diagram of a probability distribution corresponding to a predetermined color mode in a case of a plurality of predetermined colors including black, white and red according to embodiments of the present disclosure.
Figure 6B:
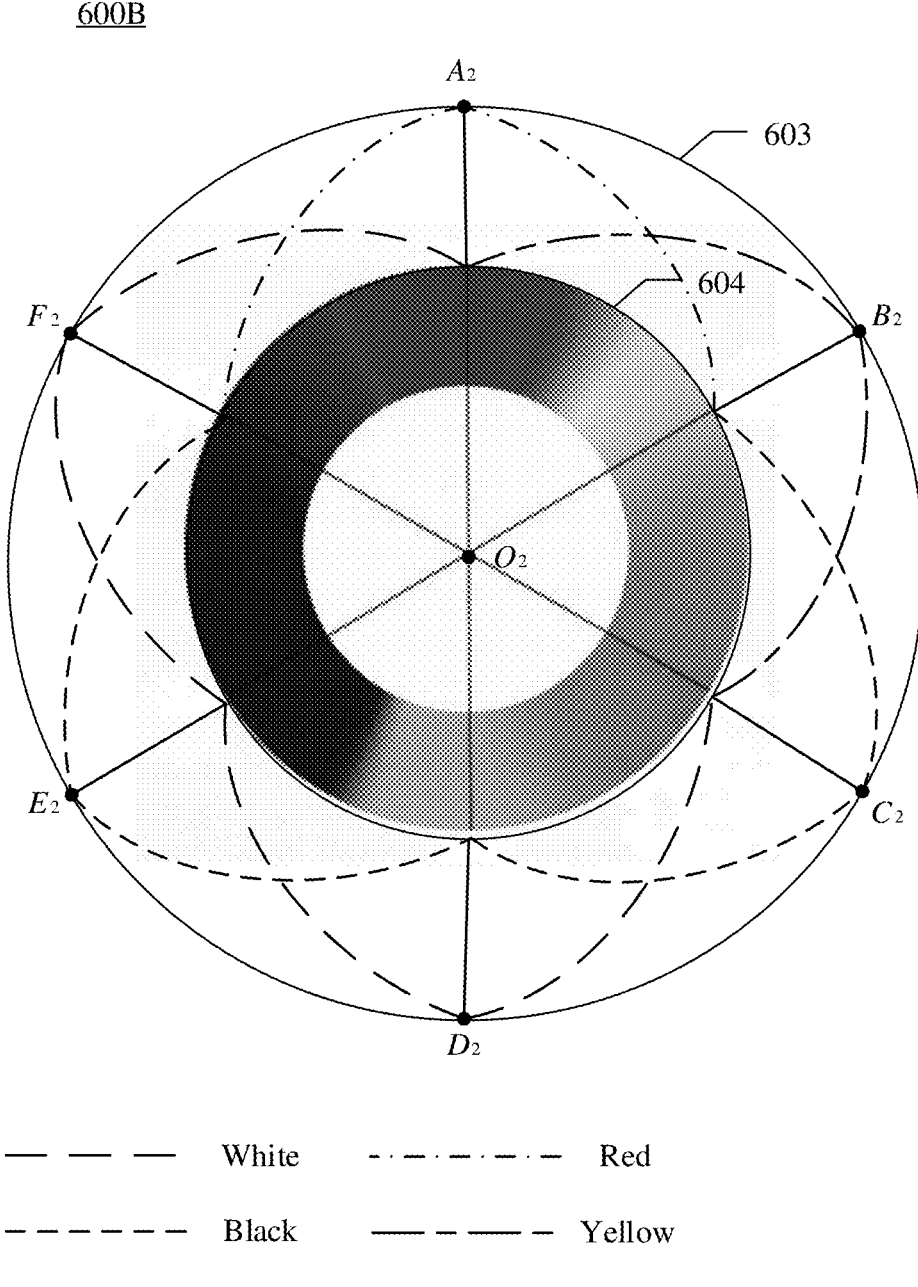
FIG. 6B schematically shows an example schematic diagram of a probability distribution corresponding to a predetermined color mode in a case of a plurality of predetermined colors including black, white, red and yellow according to embodiments of the present disclosure.
Figure 6E:
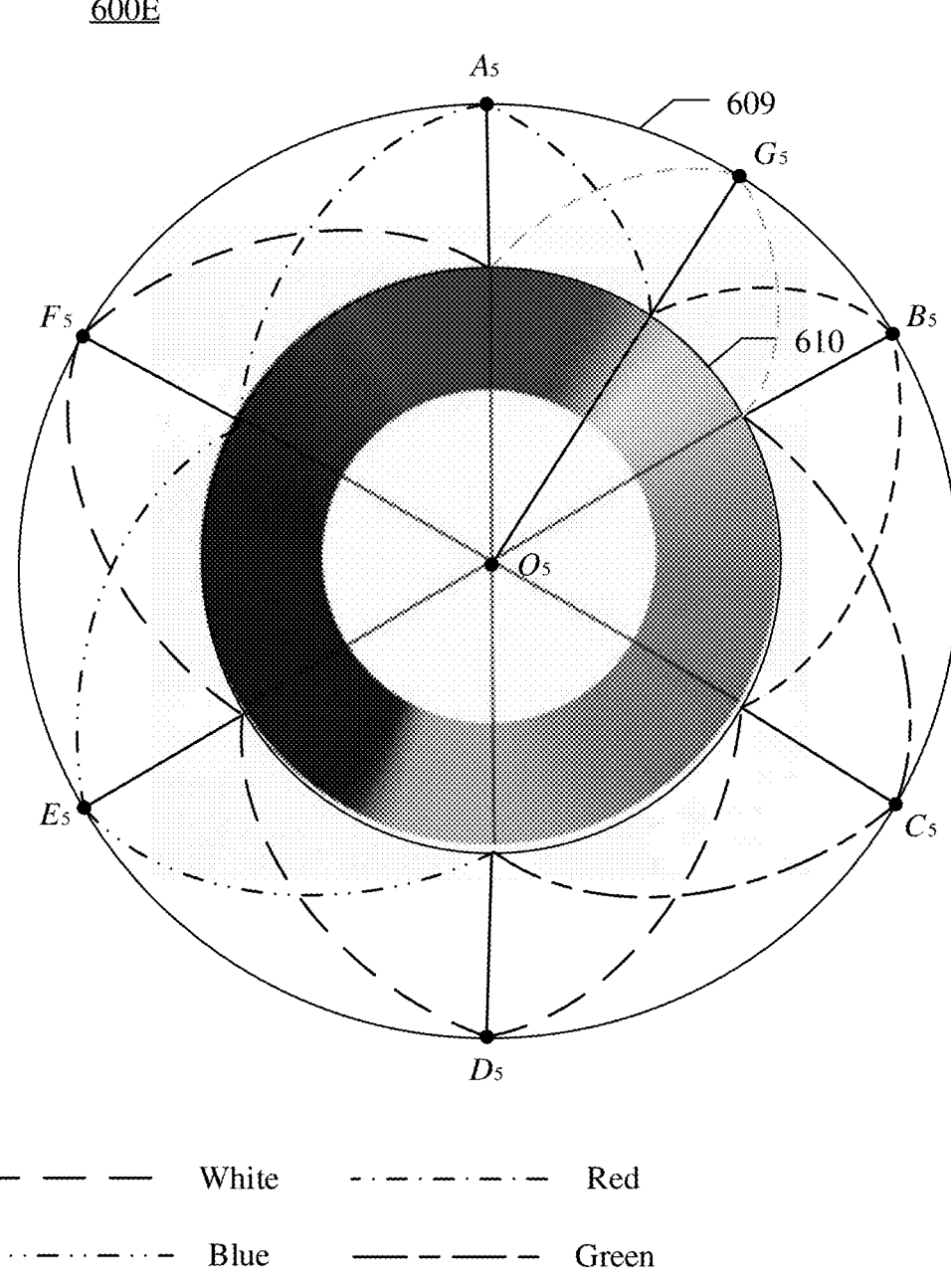
FIG. 6C schematically shows an example schematic diagram of a probability distribution corresponding to a predetermined color mode in a case of a plurality of predetermined colors including black, white, red, green and blue according to embodiments of the present disclosure.
FIG. 6D schematically shows an example schematic diagram of a probability distribution corresponding to a predetermined color mode in a case of a plurality of predetermined colors including black, white, red, yellow, green and blue according to embodiments of the present disclosure.
Figure 9:
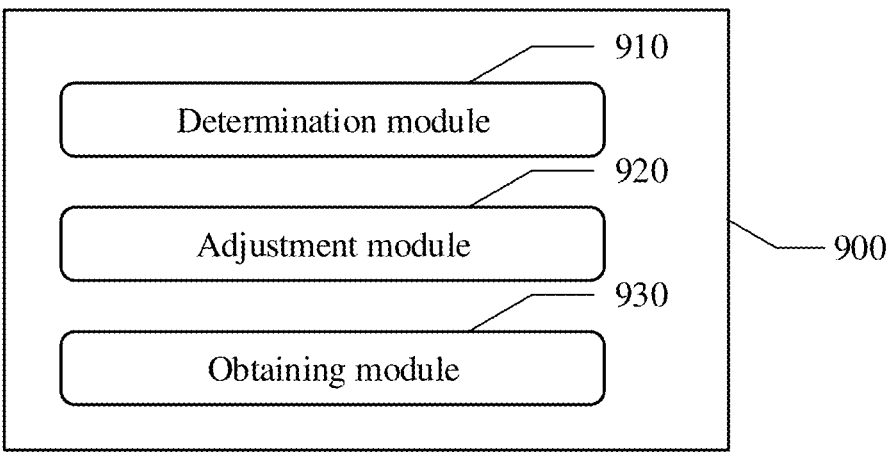
Figure 10:
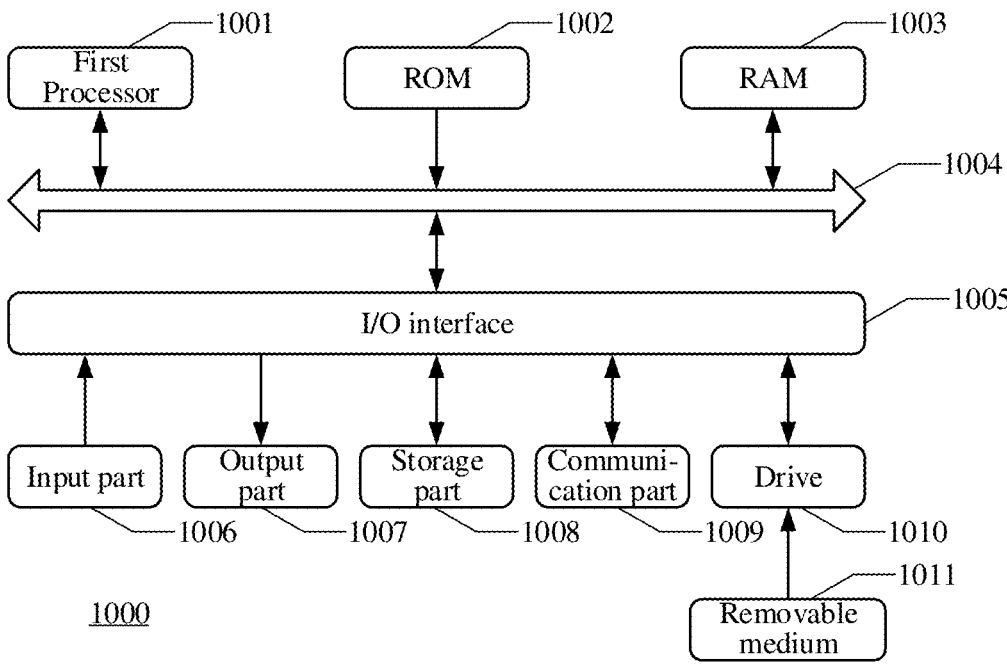

FIG. 6E schematically shows an example schematic diagram of a probability distribution corresponding to a predetermined color mode in a case of a plurality of predetermined colors including black, white, red, orange, yellow, green and blue according to embodiments of the present disclosure;

FIG. 7 schematically shows an example schematic diagram of a process of adjusting a second rendering color of one or more pixels to obtain a third rendering color of the one or more pixels according to the second rendering color and an original rendering color of the one or more pixels according to embodiments of the present disclosure;

FIG. 8 schematically shows an example schematic diagram of an original image and a target image according to embodiments of the present disclosure;

FIG. 9 schematically shows a block diagram of an apparatus of processing an image according to embodiments of the present disclosure; and FIG. 10 schematically shows a block diagram of an electronic device suitable for implementing a method of processing an image according to embodiments of the present disclosure.

DETAILED DESCRIPTION OF EMBODIMENTS

Embodiments of the present disclosure will be described below with reference to accompanying drawings. However, it should be understood that these descriptions are just exemplary and are not intended to limit the scope of the present disclosure. In the following detailed description, for ease of interpretation, many specific details are set forth to provide comprehensive understanding of embodiments of the present disclosure. However, it is clear that one or more embodiments may also be implemented without these specific details. In addition, in the following description, descriptions of well-known structures and technologies are omitted to avoid unnecessarily obscuring concepts of the present disclosure.

Terms are used herein for the purpose of describing specific embodiments only and are not intended to limit the present disclosure. The terms "including", "containing", etc. used herein indicate the presence of the feature, step, operation and/or component, but do not exclude the presence or addition of one or more other features, steps, operations or components.

All terms used herein (including technical and scientific terms) have the meanings generally understood by those skilled in the art, unless otherwise defined. It should be noted that the terms used herein can be interpreted to have meanings consistent with the context of this specification, and cannot be interpreted in an idealized or overly rigid manner.

In a case of using the expression similar to "at least one of A, B or C", it should be explained according to the meaning of the expression generally understood by those skilled in the art (for example, "a system including at least one of A, B or C" should include but not be limited to a system including A alone, a system including B alone, a system including C alone, a system including A and B, a system including A and C, a system including B and C, and/or a system including A, B and C). In a case of using the expression similar to "at least one of A, B or C", it should be explained according to the meaning of the expression generally understood by those skilled in the art (for example, "a system including at least one of A, B or C" should include but not be limited to a system including A alone, a system including B alone, a system including C alone, a system including A and B, a system including A and C, a system including B and C, and/or a system including A, B and C).

In technical solutions of the present disclosure, a collection, a storage and an application, etc. of user personal information involved comply with provisions of relevant laws and regulations, take necessary security measures, and do not violate public order and good custom.

In the technical solutions of the present disclosure, the acquisition or collection of user personal information has been authorized or allowed by users.

In an electronic ink screen display technology, an application of electrophoretic display (EPD) is increasingly extensive. The electrophoretic display may include a wet type electrophoretic display or a quick response liquid powder display (QR-LPD).

Therefore, embodiments of the present disclosure provide an image processing solution. For example, a second rendering color of one or more pixels of an original image is determined according to a first rendering color of the one or more pixels of the original image based on a predetermined color mode, where the first rendering color corresponds to a first color space, and the second rendering color corresponds to a second color space. The second rendering color of the one or more pixels is adjusted according to the second rendering color of the one or more pixels and an original rendering color of the one or more pixels, so as to obtain a third rendering color of the one or more pixels, where the original rendering color and the third rendering color correspond to the second color space, and the first rendering color is obtained by performing a color space conversion on the original rendering color. A target image is obtained according to the third rendering color of the one or more pixels, where a region corresponding to a visual saliency region of the original image in the target image has a color corresponding to the predetermined color mode.

According to embodiments of the present disclosure, the second rendering color of the pixel is determined according to the first rendering color of the pixel of the original image based on the predetermined color mode. On this basis, the second rendering color of the pixel is adjusted according to the second rendering color and the original rendering color of the pixel, so as to obtain the third rendering color of the pixel. Then, the target image is obtained according to the third rendering color of the pixel. As the color of the region corresponding to the visual saliency region of the original image in the target image corresponds to the predetermined color mode, a color richness of the target image may be improved, and then a display quality of the target image may be improved.

Figure 1:
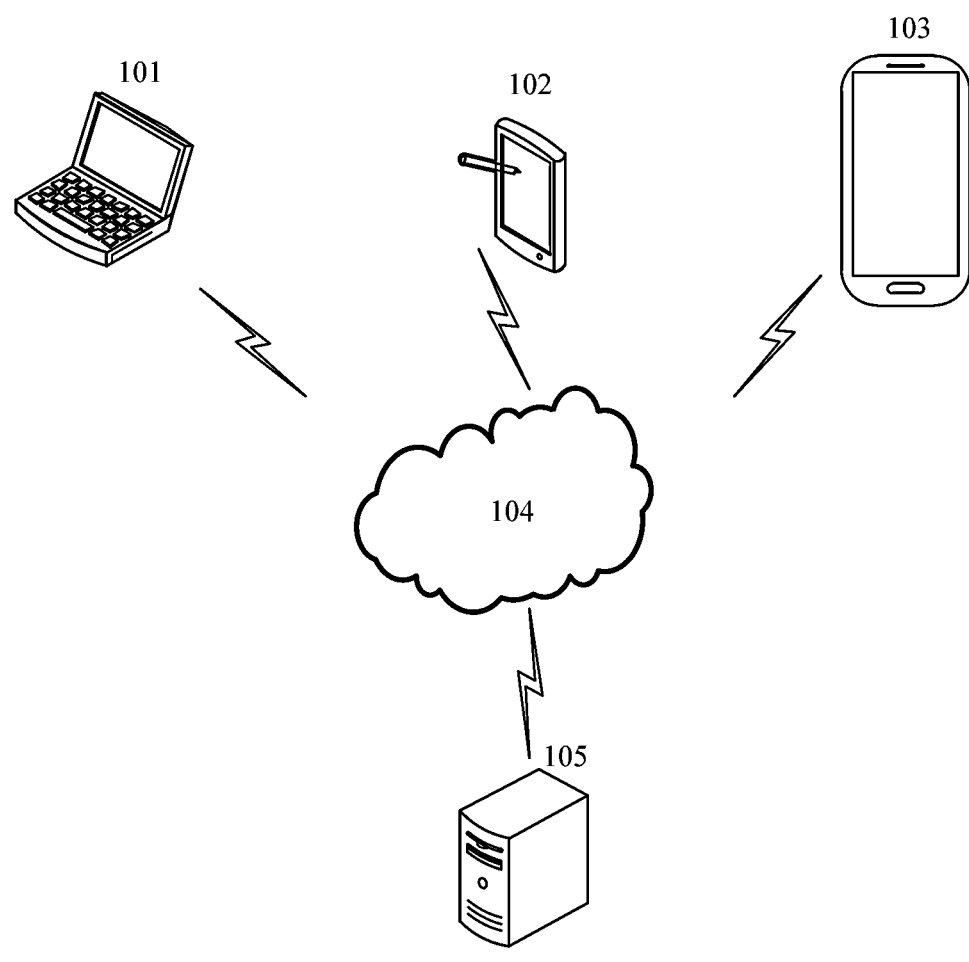
FIG. 1 schematically shows a system architecture to which a method of processing an image is applied according to embodiments of the present disclosure.

FIG. 1 schematically shows a system architecture to which a method of processing an image may be applied according to embodiments of the present disclosure.

It should be noted that FIG. 1 is just an example of the system architecture to which embodiments of the present disclosure may be applied, so as to help those skilled in the art understand technical contents of the present disclosure. However, it does not mean that embodiments of the present disclosure may not be applied to other devices, systems, environments or scenarios. For example, in other embodiments, the exemplary system architecture to which a method and an apparatus of processing an image may be applied may include a terminal device, but the terminal device may implement the method and apparatus of processing the image without interacting with a server.

As shown in FIG. 1, a system architecture 100 according to such embodiments may include a first terminal device 101, a second terminal device 102, a third terminal device 103, a network 104, and a server 105. The network 104 is a medium for providing a communication link between the first terminal device 101, the second terminal device 102, the third terminal device 103 and the server 105. The network 104 may include various connection types, such as wired and/or wireless communication links, etc. The terminal device may include at least one of the first terminal device 101, the second terminal device 102, or the third terminal device 103.

At least one of the first terminal device 101, the second terminal device 102 or the third terminal device 103 may be used by a user to interact with the server 105 through the network 104 to receive or send messages, etc. At least one of the first terminal device 101, the second terminal device 102 or the third terminal device 103 may be installed with various communication client applications, such as at least one of knowledge reading applications, web browser applications, search applications, instant messaging tools, email clients, and/or social platform software, etc.

The first terminal device 101, the second terminal device 102 and the third terminal device 103 may be various electronic devices having display screens and supporting web browsing. For example, the electronic devices may include at least one of e-books, smart phones, tablet computers, laptop computers, or desktop computers, etc. E-books may include e-ink screen-based e-books.

The server 105 may be a server providing various services. For example, the server 105 may be a cloud server, also known as a cloud computing server or a cloud host, which is a host product in a cloud computing service system to solve shortcomings of difficult management and weak service scalability existing in an existing physical host and VPS (Virtual Private Server) service.

It should be noted that the method of processing the image provided in embodiments of the present disclosure may generally be performed by one of the first terminal device 101, the second terminal device 102 or the third terminal device 103. Accordingly, the apparatus of processing the image provided in embodiments of the present disclosure may also be arranged in one of the first terminal device 101, the second terminal device 102 or the third terminal device 103.

Alternatively, the method of processing the image provided in embodiments of the present disclosure may generally be performed by the server 105. Accordingly, the apparatus of processing the image provided in embodiments of the present disclosure may also be arranged in the server 105. The method of processing the image provided in embodiments of the present disclosure may also be performed by a server or server cluster that is different from the server 105 and capable of communicating with at least one of the first terminal device 101, the second terminal device 102, the third terminal device 103 or the server 105. Accordingly, the apparatus of processing the image provided in embodiments of the present disclosure may also be arranged in a server or server cluster that is different from the server 105 and capable of communicating with at least one of the first terminal device 101, the second terminal device 102, the third terminal device 103 or the server 105.

It should be understood that the number of first terminal devices, second terminal devices, third terminal devices, networks and servers shown in FIG. 1 are just schematic. According to implementation needs, any number of first terminal devices, second terminal devices, third terminal devices, networks and servers may be provided.

It should be noted that a sequence number of each operation in the following methods is just used to represent the operation for ease of description, and should not be regarded as indicating an execution order of each operation. Unless explicitly stated, the method does not need to be performed exactly in the order shown.

Figure 2:
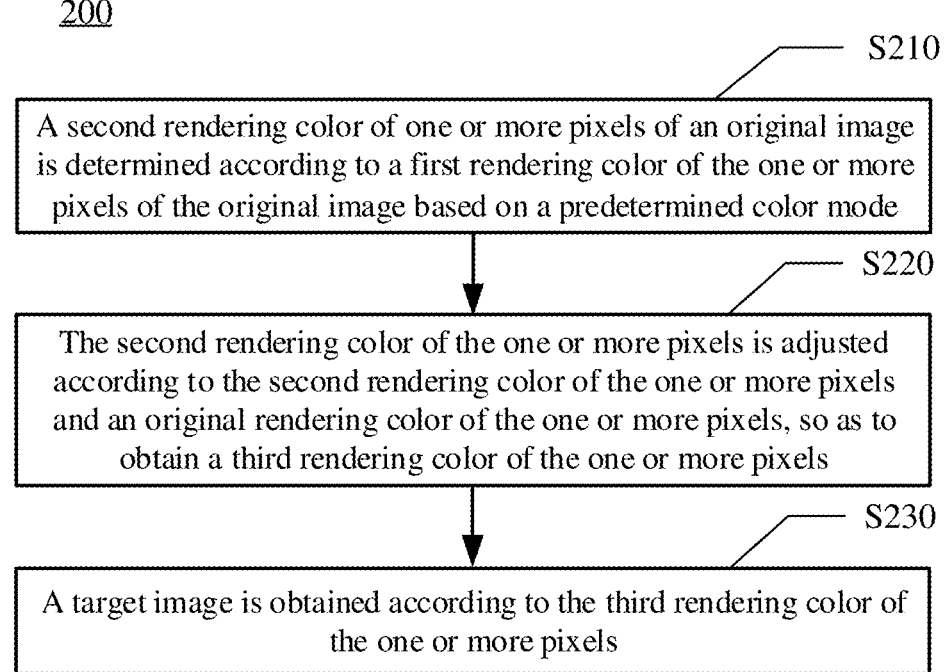
FIG. 2 schematically shows a flowchart of a method of processing an image according to embodiments of the present disclosure.

FIG. 2 schematically shows a flowchart of a method of processing an image according to embodiments of the present disclosure.

As shown in FIG. 2, a method 200 includes operations S210 to S230.

In operation S210, a second rendering color of one or more pixels of an original image is determined according to a first rendering color of the one or more pixels of the original image based on a predetermined color mode.

In operation S220, the second rendering color of the one or more pixels is adjusted according to the second rendering color of the one or more pixels and an original rendering color of the one or more pixels, so as to obtain a third rendering color of the one or more pixels.

In operation S230, a target image is obtained according to the third rendering color of the one or more pixels.

According to embodiments of the present disclosure, the first rendering color may correspond to a first color space, the second rendering color may correspond to a second color space, and the original rendering color and the third rendering color may correspond to the second color space. The first rendering color may be obtained by performing a color space conversion on the original rendering color. A region corresponding to a visual saliency region of the original image in the target image may have a color corresponding to the predetermined color mode.

According to embodiments of the present disclosure, an image format of the original image may include at least one of: Joint Photographic Experts Group (JPEG), Tag Image File Format (TIFF), Portable Network Graphics (PNG), Portable Document Format (PDF), Graphics Interchange Format (GIF), Bitmap (BMP), or Tagged Graphics (TGA).

According to embodiments of the present disclosure, after obtaining the original image, it is possible to determine the second color space corresponding to the original image. For each of the one or more pixels in the original image, it is possible to determine the original rendering color of the pixel in the second color space. The second color space may refer to a color space in which a range of colors is defined using a coordinate system. The second color space may include at least one of: HSV (Hue Saturation Value, Hexcone) color space, RGB (Red Green Blue) color space, YUV (Luminance Chromnance Chroma) color space, Lab color space, HSI (Hue Saturation Intensity) color space, or CMYK (Cyan Magenta Yellow Black) color space.

According to embodiments of the present disclosure, after obtaining the original rendering color of the one or more pixels, it is possible to determine the first color space to be converted into. The first color space may be determined according to actual service desires and is not limited here, as long as the first color space is different from the second color space. For example, the first color space may include one of: HSV color space, RGB color space, YUV color space, Lab color space, HSI color space, or CMYK color space. For each of the one or more pixels, a color space conversion may be performed on the original rendering color in the second color space to obtain the first rendering color in the first color space corresponding to the pixel.

For example, the first color space is the HSV color space, and the second color space is the RGB color space. For each of the one or more pixels of the original image, it is possible to determine a red component, a green component and a blue component corresponding to the pixel in the second color space. The original rendering color corresponding to the pixel in the second color space may be determined according to the red component, the green component and the blue component corresponding to the pixel in the second color space. After the original rendering color in the second color space is obtained, a color space conversion may be performed on the original rendering color in the second color space, which is the RGB color space, to obtain a hue component, a saturation component and a value component corresponding to the pixel in the first color space. The first rendering color corresponding to the pixel in the first color space may be determined according to the hue component, the saturation component and the value component corresponding to the pixel in the first color space.

According to embodiments of the present disclosure, a color component may be used to represent the first rendering color in the first color space. The color component may include at least one of: a first color component, a second color component, or a third color component. For example, when the first color space is the HSV color space, the first color component may be the hue component (i.e., H), the second color component may be the saturation component (i.e., S), and the third color component may be the value component (i.e., V). The hue component may be measured based on an angle. For example, red may correspond to 0 degrees, and starting from red in a counterclockwise direction, green may correspond to 120 degrees and blue may correspond to 240 degrees. In this case, a color region in which the first rendering color is located in the first color space may be determined according to the hue component, the saturation component and the value component of the first rendering color. Alternatively, when the first color space is the RGB color space, the first color component may be the red component (i.e., R), the second color component may be the green component (i.e., G), and the third color component may be the blue component (i.e., B). In this case, a color region in which the first rendering color is located in the first color space may be determined according to the red component, the green component and the blue component of the first rendering color.

According to embodiments of the present disclosure, after obtaining the first rendering color of the one or more pixels, it is possible to determine the second rendering color of the one or more pixels in the second color space according to the first rendering color of the one or more pixels in the first color space based on a predetermined color mode. The predetermined color mode may be used to map any predetermined rendering color in the first color space to a target rendering color in the second color space. The predetermined color mode may be set according to actual service desires and is not limited here. For example, a method of determining the predetermined color mode may include at least one of an analytical modeling method and an empirical modeling method. The one or more pixels may be a pixel in a region to be adjusted in the original image. The region to be adjusted may be at least partial region in the original image.

According to embodiments of the present disclosure, in a case of determining the predetermined color mode based on the analytical modeling method, it is possible to establish a conversion relationship between rendering colors in different color spaces through a theoretical analysis. The second rendering color of the pixel in the second color space may be determined according to the first rendering color of the pixel of the original image in the first color space based on the conversion relationship between rendering colors in different color spaces. For example, the analytical modeling method may include Neugebauer equation.

According to embodiments of the present disclosure, in a case of determining the predetermined color mode based on the empirical modeling method, it is possible to establish a conversion relationship between rendering colors in different color spaces using a mathematical method by measuring predetermined feature samples. The second rendering color of the pixel in the second color space may be determined according to the first rendering color of the pixel of the original image in the first color space based on the conversion relationship between colors in different color spaces. For example, the empirical modeling method may include at least one of: a lookup table-interpolation method, a polynomial regression method, or a neural network method.

For example, the first color space is the HSV color space, and the second color space is the RGB color space. After obtaining the first rendering color in the first color space, it is possible to determine the hue component, the saturation component and the value component corresponding to the pixel in the first color space. The second rendering color corresponding to the pixel in the second color space may be determined according to the hue component, the saturation component and the value component corresponding to the pixel in the first color space based on the predetermined color mode.

According to embodiments of the present disclosure, the predetermined color mode may include at least one of: a tricolor mode, a four-color mode, a five-color mode, a six-color mode, or a seven-color mode. The target rendering color may include at least one of: black, white, red, orange, yellow, green, or blue. The predetermined color mode may include a first base color, a second base color, and other configuration color(s). For example, the first base color may include black, the second base color may include white, and the other configuration color(s) may include at least one of red, orange, yellow, green, or blue.

For example, when the predetermined color mode is the tricolor mode and the other configuration color is orange, the predetermined color mode may be used to map red and orange in the first color space to orange in the second color space. Alternatively, when the predetermined color mode is the four-color mode and the other configuration colors are yellow and green, the predetermined color mode may be used to map red and yellow in the first color space to yellow in the second color space. Alternatively, when the predetermined color mode is the five-color mode and the other configuration colors are yellow, green and blue, the predetermined color mode may be used to map red and yellow in the first color space to yellow in the second color space.

According to embodiments of the present disclosure, after determining the other configuration color(s), there is a high probability that the other configuration color(s) appears/appear in a visual saliency region, and there is a high probability that the first base color and the second base color appear in a non-visual saliency region. The visual saliency region may refer to a region of interest (ROI) in a real-world scene that may be spontaneously recognized and processed by human being to ignore a region of non-interest. Visual saliency regions may be sorted according to a saliencies of color regions for human eyes. For example, visual saliency regions may sequentially include a red region, an orange region, a yellow region, a green region, a blue region, a white region, and a black region.

According to embodiments of the present disclosure, the probability of the other configuration colors appearing may be related to the second color component and the third color component of a visual saliency color in the visual saliency region. For example, when the first color space is the HSV color space, the second color component is the saturation component and the third color component is the value component, the probability of the other configuration colors appearing may decrease as the value component of the visual saliency color in the visual saliency region decreases, and the probability of the other configuration colors appearing may decrease as the saturation component of the visual saliency color in the visual saliency region decreases.

According to embodiments of the present disclosure, the probability of the first base color appearing is related to the third color component of the visual saliency color in the visual saliency region. For example, when the first color space is the HSV color space and the third color component is the value component, the probability of the first base color appearing may increase as the value component of the visual saliency color in the visual saliency region decreases. The probability of the second base color appearing is related to the second color component of the visual saliency color in the visual saliency region. For example, the probability of the second base color appearing may increase as the saturation of the visual saliency color in the visual saliency region decreases.

According to embodiments of the present disclosure, after the second rendering color of the one or more pixels is obtained, the second rendering color of the one or more pixels may be adjusted according to the second rendering color and the original rendering color of the one or more pixels based on an error diffusion algorithm, so as to obtain the third rendering color of the one or more pixels. The error diffusion algorithm may be used to assign a quantization error of a central pixel to unprocessed adjacent pixels around the central pixel so as to enhance an image boundary. The error diffusion algorithm may include at least one of Floyd-Steinberg error diffusion algorithm or Jarris Judice-Ninke error diffusion algorithm.

According to embodiments of the present disclosure, after obtaining the third rendering color of the one or more pixels, it is possible to obtain the target image according to the third rendering color of the one or more pixels. By assigning the visual saliency region in the original image with the first base color, the second base color or the configuration color in the predetermined color mode, the region corresponding to the visual saliency region of the original image in the target image may have a color corresponding to the predetermined color mode. For example, taking the predetermined color mode being the tricolor mode and the configuration color being orange as an example, if the original image includes a black region, a white region, an orange region and a red region, the orange region and the red region may be assigned with orange according to the third rendering color of the one or more pixels, and a black region, a white region and a red region in the target image may be obtained.

According to embodiments of the present disclosure, the second rendering color of the pixel is determined according to the first rendering color of the pixel of the original image based on the predetermined color mode. On this basis, the second rendering color of the pixel is adjusted according to the second rendering color and the original rendering color of the pixel to obtain the third rendering color of the pixel, and the target image may be obtained according to the third rendering color of the pixel. As the color of the region corresponding to the visual saliency region of the original image in the target image corresponds to the predetermined color mode, the color richness of the target image may be improved, and the display quality of the target image may be improved.

According to embodiments of the present disclosure, operation S210 may include the following operations.

A region to be adjusted in the original image is determined. The second rendering color of one or more pixels in the region to be adjusted is determined according to the first rendering color of the one or more pixels in the region to be adjusted based on the predetermined color mode.

According to embodiments of the present disclosure, the region to be adjusted may refer to a region of which the original rendering color needs to be adjusted in the original image. The region to be adjusted may be determined from the original image according to a predetermined visual saliency order and the original rendering color of the original image. For example, it is possible to determine a rendering color to be adjusted from the original rendering color of the original image according to the predetermined visual saliency order, and determine a region corresponding to the rendering color to be adjusted as the region to be adjusted. For example, the region to be adjusted may be an entire region of the original image. Alternatively, the region to be adjusted may be a partial region of the original image.

According to embodiments of the present disclosure, as the one or more pixels is in the region to be adjusted in the original image, the number of pixels to be adjusted may be reduced, and an adjustment efficiency may be improved. In addition, the region to be adjusted may be flexibly configured, so that an adjustment convenience may be improved.

The method of processing the image according to specific embodiments of the present disclosure will be further described below in conjunction with specific embodiments with reference to FIG. 3, FIG. 4, FIG. 5A, FIG. 5B, FIG. 6A, FIG. 6B, FIG. 6C, FIG. 6D, FIG. 6E, FIG. 7 and FIG. 8.

According to embodiments of the present disclosure, taking the first color space being the HSV color space and the second color space being the RGB color space as an example, after obtaining the original image, it is possible to determine the original rendering color of one or more pixels in the original image in the RGB color space. After the original rendering color of the one or more pixels in the RGB color space is obtained, for each of the one or more pixels, a color space conversion may be performed on the original rendering color in the RGB color space to obtain the first rendering color in the HSV color space corresponding to the pixel by using Equations (1) to (3) as follows.

$$
H = \begin{cases}
0°, \Delta = 0 & (1) \\
60° \times \left( \dfrac{G^* - E^*}{\Delta} + 0 \right), C_{max} = R^* \\
60° \times \left( \dfrac{B^* - R^*}{\Delta} + 2 \right), C_{max} = G^* \\
60° \times \left( \dfrac{R^* - G^*}{\Delta} + 4 \right), C_{max} = B^*
\end{cases}
$$

$$
S = \begin{cases}
0, C_{max} = 0 & (2) \\
\dfrac{\Delta}{C_{max}}, C_{max} \neq 0
\end{cases}
$$

$$
V = C_{max} \tag{3}
$$

TABLE 1-continued

| First rendering color | Red, orange, yellow, green, blue |
| --- | --- |

According to embodiments of the present disclosure, the color association corresponding to the predetermined color mode may be determined according to the predetermined color mode. The color association may be used to represent an association between the first color component and the second rendering color. For example, as shown in Table 1, when the predetermined color mode is a tricolor mode and the configuration color is orange, the color association may include an association between the first color component representing red or orange and the second rendering color representing orange. When the first color component of the pixel is red or orange, it may be determined that the second rendering color of the pixel is orange.

Alternatively, as shown in Table 1, when the predetermined color mode is a tricolor mode and the configuration color is yellow, the color association may include an association between the first color component representing red or yellow and the second rendering color representing yellow. When the first color component of the pixel is red or yellow, it may be determined that the second rendering color of the pixel is yellow.

For example, as shown in Table 1, when the predetermined color mode is a four-color mode and the configuration colors are yellow and green, the color association may include an association between the first color component representing red or yellow and the second rendering color representing yellow. When the first color component of the pixel is red or yellow, it may be determined that the second rendering color of the pixel is yellow.

Alternatively, as shown in Table 1, when the predetermined color mode is a four-color mode and the configuration colors are yellow and blue, the color association may include an association between the first color component representing red or yellow and the second rendering color representing yellow. When the first color component of the pixel is red or yellow, it may be determined that the second rendering color of the pixel is yellow.

For example, as shown in Table 1, when the predetermined color mode is a five-color mode and the configuration colors are yellow, green and blue, the color association may include an association between the first color component representing red or yellow and the second rendering color representing yellow. When the first color component of the pixel is red or yellow, it may be determined that the second rendering color of the pixel is yellow.

According to embodiments of the present disclosure, the second rendering color is determined according to the first color component of the pixel of the original image based on the color association corresponding to the predetermined color mode, therefore an efficiency of image processing may be improved.

According to embodiments of the present disclosure, determining the second rendering color of the at least one color according to the first color component of the one or more pixels of the original image based on the color association corresponding to the predetermined color mode may include the following operations.

A plurality of first probabilities corresponding to the one or more pixels are determined according to the first color component of the one or more pixels of the original image based on the color association corresponding to the predetermined color mode. A target probability corresponding to the one or more pixels is determined according to the plurality of first probabilities corresponding to the one or more pixels. The second rendering color of the one or more pixels is determined according to the target probability corresponding to the one or more pixels.

According to embodiments of the present disclosure, the predetermined color mode may correspond to a plurality of predetermined colors. The first probability may represent a probability of the second rendering color of the pixel being the predetermined color. The target probability may include at least one of: a maximum probability, a minimum probability, a probability corresponding to a mode, or a probability corresponding to a median.

According to embodiments of the present disclosure, for each of the one or more pixels of the original image, after obtaining the first color component of the pixel is obtained, it is possible to obtain a plurality of first probabilities corresponding to the pixel according to the first color component of the pixel. The plurality of predetermined colors may include black, white, red, orange, yellow, green and blue.

According to embodiments of the present disclosure, after obtaining the plurality of first probabilities corresponding to the one or more pixels, it is possible to determine a maximum probability corresponding to each of the one or more pixels according to the plurality of first probabilities corresponding to each of the one or more pixels, and the maximum probability corresponding to each of the one or more pixels may be determined as a target probability corresponding to that pixel. Alternatively, it is possible to determine a minimum probability corresponding to each of the one or more pixels according to the plurality of first probabilities corresponding to each of the one or more pixels, and the minimum probability corresponding to each of the one or more pixels may be determined as the target probability corresponding to that pixel. Alternatively, it is possible to determine a mode corresponding to each of the one or more pixels according to the plurality of first probabilities corresponding to each of the one or more pixels, and the mode corresponding to each of the one or more pixels may be determined as the target probability corresponding to that pixel. Alternatively, it is possible to determine a median corresponding to each of the one or more pixels, and the median corresponding to each of the one or more pixels may be determined as the target probability corresponding to that pixel. Alternatively, it is possible to weight the plurality of first probabilities corresponding to each of the one or more pixels to obtain the target probability corresponding to that pixel.

For example, for each of the one or more pixels, the maximum probability corresponding to the pixel may be determined from the plurality of first probabilities corresponding to the pixel by using Equation (4), and the maximum probability corresponding to the pixel may be determined as the target probability of the pixel. Alternatively, it is possible to weight the plurality of first probabilities corresponding to the pixel to obtain the target probability of the pixel. After the target probability corresponding to the one or more pixels is obtained, the second rendering color of the one or more pixels may be determined according to the target probability corresponding to the one or more pixels.

$$P = \max\left(P'_{red}, P'_{orange}, P'_{yellow}, P'_{green}, P'_{blue}, P'_{white}, P'_{black}\right) \qquad (4)$$

According to embodiments of the present disclosure, P may represent a target probability, $P'_{red}$ may represent a probability of the second rendering color of the pixel being red, P may represent a probability of the second rendering color of the pixel being orange, $P'_{orange}$ may represent a probability of the second rendering color of the pixel being yellow, $P'_{green}$ may represent a probability of the second rendering color of the pixel being green, $P'_{blue}$ may represent a probability of the second rendering color of the pixel being blue, $P'_{black}$ may represent a probability of the second rendering color of the pixel being black, and $P'_{white}$ may represent a probability of the second rendering color of the pixel being white.

According to embodiments of the present disclosure, if $P=P'_{red}$, it may be determined that the second rendering color of the one or more pixels is red, that is, an RGB value is (255, 0, 0). If $P=P'_{orange}$, it may be determined that the second rendering color of the one or more pixels is orange, that is, the RGB value is (255, 128, 0). If $P=P'_{yellow}$, it may be determined that the second rendering color of the one or more pixels is yellow, that is, the RGB value is (255, 255, 0). If $P=P'_{green}$, it may be determined that the second rendering color of the one or more pixels is green, that is, the RGB value is (0, 255, 0). If $P=P'_{blue}$, it may be determined that the second rendering color of the one or more pixels is blue, that is, the RGB value is (0, 0, 255). If $P=P'_{black}$, it may be determined that the second rendering color of the one or more pixels is black, that is, the RGB value is (0, 0, 0). If $P=P'_{white}$, it may be determined that the second rendering color of the one or more pixels is white, that is, the RGB value is (255, 255, 255).

According to embodiments of the present disclosure, as the target probability is determined according to the plurality of first probabilities corresponding to the pixel and the plurality of first probabilities are determined according to the first color component of the pixel of the original image based on the color association corresponding to the predetermined color mode, the target probability may be used to represent a probability of the pixel belonging to the predetermined color. On this basis, determining the second rendering color of the pixel according to the target probability corresponding to the pixel may improve the color richness of the target image.

Figure 3:
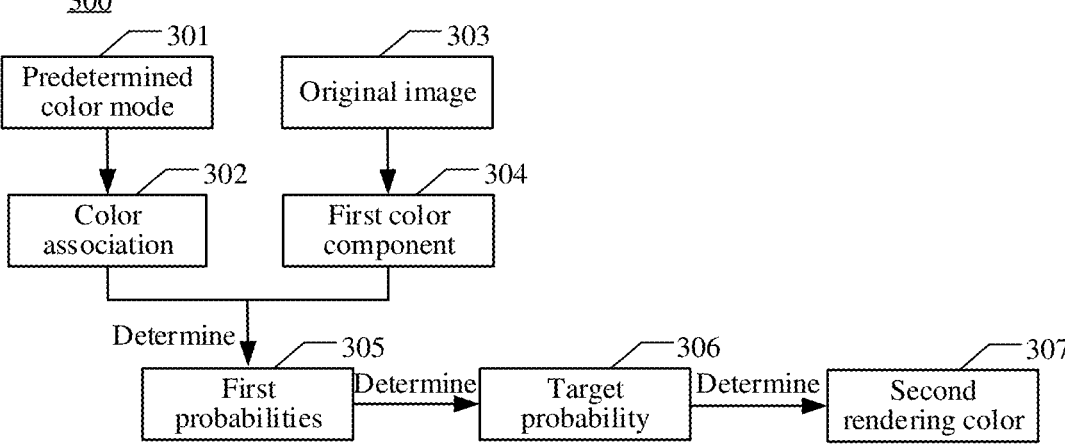
FIG. 3 schematically shows an example schematic diagram of a process of determining a second rendering color of one or more pixels of an original image according to a first color component of the one or more pixels of the original image based on a color association corresponding to a predetermined color mode according to embodiments of the present disclosure.

FIG. 3 schematically shows an example schematic diagram of a process of determining a second rendering color of one or more pixels of an original image according to a first color component of the one or more pixels of the original image based on a color association corresponding to a predetermined color mode, according to embodiments of the present disclosure.

As shown in FIG. 3, in 300, a plurality of first probabilities 305 corresponding to one or more pixels of an original image 303 may be determined according to a first color component 304 of the one or more pixels of the original image 303 based on a color association 302 corresponding to a predetermined color mode 301.

A target probability 306 corresponding to the one or more pixels may be determined according to the plurality of first probabilities 305 corresponding to the one or more pixels. A second rendering color 307 of the one or more pixels may be determined according to the target probability 306 corresponding to the one or more pixels.

According to embodiments of the present disclosure, determining the target probability corresponding to the one or more pixels according to the plurality of first probabilities corresponding to the one or more pixels may include the following operations.

An average probability corresponding to the one or more pixels is determined from the plurality of first probabilities corresponding to the one or more pixels. The average probability corresponding to the one or more pixels is determined as the target probability corresponding to the one or more pixels.

According to embodiments of the present disclosure, for a pixel among the one or more pixels, after obtaining a plurality of first probabilities corresponding to the pixel, it is possible to obtain an average probability corresponding to the pixel from the plurality of first probabilities corresponding to the pixel, and the average probability corresponding to the pixel may be determined as the target probability corresponding to the pixel.

According to embodiments of the present disclosure, determining the target probability corresponding to the one or more pixels according to the plurality of first probabilities corresponding to the one or more pixels may include the following operations.

A maximum probability corresponding to the one or more pixels is determined from the plurality of first probabilities corresponding to the one or more pixels. The maximum probability corresponding to the one or more pixels is determined as the target probability corresponding to the one or more pixels.

According to embodiments of the present disclosure, for a pixel among the one or more pixels, after obtaining a plurality of first probabilities corresponding to the pixel, it is possible to determine a maximum probability corresponding to the pixel from the plurality of first probabilities corresponding to the pixel, and the maximum probability corresponding to the pixel may be determined as the target probability corresponding to the pixel.

FIG. 4 schematically shows a flowchart of a method of determining a plurality of first probabilities corresponding to one or more pixels according to a first color component of the one or more pixels of the original image based on a color association corresponding to a predetermined color mode, according to embodiments of the present disclosure.

As shown in FIG. 4, a method 400 includes operations S411 to S412.

In operation S411, a plurality of second probabilities corresponding to one or more pixels of an original image are determined according to a first color component of the one or more pixels of the original image based on a color association corresponding to a predetermined color mode.

In operation S412, a plurality of first probabilities corresponding to the one or more pixels are determined according to the plurality of second probabilities corresponding to the one or more pixels and one or more first other color components.

According to embodiments of the present disclosure, the first other color component may represent any of other components than the first component in the first rendering color.

According to embodiments of the present disclosure, for each of the one or more pixels of the original image, after obtaining the first color component of the pixel, it is possible to determine a plurality of second probabilities corresponding to the pixel according to the first color component of the pixel based on the color association corresponding to the predetermined color mode. For example, the plurality of second probabilities corresponding to the pixel may be determined according to a position of the first color component on a hue circle.

According to embodiments of the present disclosure, after obtaining the first rendering color, it is possible to determine other components than the first component in the first rendering color, so as to obtain one or more first other color components. For example, in the HSV color space, the first component may be the hue component, and the one or more first other color components may include the saturation component and the value component. Alternatively, in the RGB color space, the first component may be the red component, and the one or more first other color components may include the green component and the blue component.

According to embodiments of the present disclosure, after obtaining the plurality of second probabilities corresponding to the one or more pixels and the one or more first other color components, for each of the one or more pixels, it is possible to process the plurality of second probabilities corresponding to the pixel and the one or more first other color components to obtain the plurality of first probabilities corresponding to the pixel.

According to embodiments of the present disclosure, operation S412 may include the following operations.

For a pixel among the one or more pixels, a first intermediate value corresponding to black is obtained according to the second color component of the pixel and the second probability corresponding to black. The first probability corresponding to black is obtained according to the third color component of the pixel and the first intermediate value corresponding to black, where the first probability corresponding to black represents a probability of the second rendering color of the pixel being black. A second intermediate value corresponding to white is obtained according to the second color component of the pixel and the second probability corresponding to white. The first probability corresponding to white is obtained according to the third color component of the pixel and the second intermediate value corresponding to white, where the first probability corresponding to white represents a probability of the second rendering color of the pixel being white. The first probability corresponding to at least one other color is obtained according to the second color component of the pixel, the third color component of the pixel, and the second probability corresponding to the at least one other color, where the first probability corresponding to any of the at least one other color represents a probability of the second rendering color of the pixel being the any of the at least one other color.

According to embodiments of the present disclosure, the plurality of predetermined colors may include black, white and at least one other color. The plurality of second probabilities may include a second probability corresponding to black, a second probability corresponding to white, and a second probability corresponding to at least one other color.

The one or more first other color components may include the second color component and the third color component.

According to embodiments of the present disclosure, taking the HSV color space as an example, if the first component is the hue component, the second color component may be the saturation component, and the third color component may be the value component.

According to embodiments of the present disclosure, the first probability corresponding to black may be determined using Equation (5) below according to the second color component, the third color component, and the second probability corresponding to black.

$$P'_{black} = 1 - (1 - P_{black} \times s) \times v \qquad (5)$$

According to embodiments of the present disclosure, $P_{black}$ may represent a second probability corresponding to black, s may represent a second color component, v may represent a third color component, $(1-P_{black} \times s)$ may represent a first intermediate value corresponding to black, and $P'_{black}$ may represent a first probability corresponding to black.

FIG. 5A schematically shows an example schematic diagram of a process of determining a plurality of first probabilities corresponding to one or more pixels according to a plurality of second probabilities corresponding to the one or more pixels and one or more first other color components according to embodiments of the present disclosure.

As shown in FIG. 5A, in 500A, a first intermediate value 503 corresponding to black may be obtained according to a second color component 502 of a pixel and a second probability 501 corresponding to black. A first probability 505 corresponding to black is obtained according to a third color component 504 of the pixel and the first intermediate value 503 corresponding to black.

According to embodiments of the present disclosure, the first probability corresponding to white may be determined using Equation (6) below according to the second color component, the third color component, and the second probability corresponding to white.

$$P'_{white} = (1 - (1 - P_{white}) \times s) \times v \qquad (6)$$

According to embodiments of the present disclosure, $P_{white}$ may represent a second probability corresponding to white, s may represent a second color component, v may represent a third color component, $(1-(1-P_{white}) \times s)$ may represent a first intermediate value corresponding to white, and $P'_{white}$ may represent a first probability corresponding to white.

Figure 5B:
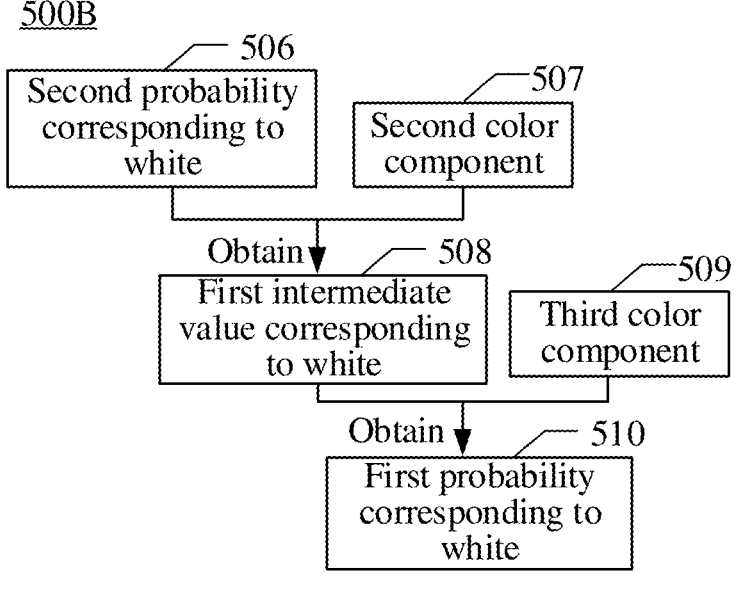
FIG. 5B schematically shows an example schematic diagram of a process of determining a plurality of first probabilities corresponding to one or more pixels according to a plurality of second probabilities corresponding to the one or more pixels and one or more first other color components according to other embodiments of the present disclosure.

FIG. 5B schematically shows an example schematic diagram of a process of determining a plurality of first probabilities corresponding to one or more pixels according to a plurality of second probabilities corresponding to the one or more pixels and one or more first other color components of the one or more pixels according to other embodiments of the present disclosure.

As shown in FIG. 5B, in 500B, a second intermediate value 508 corresponding to white may be obtained according to a second color component 507 of a pixel and a second probability 506 corresponding to white. A first probability 510 corresponding to white may be obtained according to a third color component 509 of the pixel and the second intermediate value 508 corresponding to white.

According to embodiments of the present disclosure, the at least one other color may include red, orange, yellow, green, and blue. The first probability corresponding to red may be determined using Equation (7) below according to the second color component, the third color component, and the second probability corresponding to red. The first probability corresponding to orange may be determined using Equation (8) below according to the second color component, the third color component, and the second probability corresponding to orange. The first probability corresponding to yellow may be determined using Equation (9) below according to the second color component, the third color component, and the second probability corresponding to yellow. The first probability corresponding to green may be determined using Equation (10) below according to the second color component, the third color component, and the second probability corresponding to green. The first probability corresponding to blue may be determined using Equation (11) below according to the second color component, the third color component, and the second probability corresponding to blue.

$$P'_{red} = P_{red} \times s \times v \tag{7}$$

$$P'_{orange} = P_{orange} \times s \times v \tag{8}$$

$$P'_{yellow} = P_{yellow} \times s \times v \tag{9}$$

$$P'_{green} = P_{green} \times s \times v \tag{10}$$

$$P'_{blue} = P_{blue} \times s \times v \tag{11}$$

According to embodiments of the present disclosure, s may represent a second color component, v may represent a third color component, $P_{red}$ may represent a second probability corresponding to red, $P'_{red}$ may represent a first probability corresponding to red, $P_{orange}$ may represent a second probability corresponding to orange, $P'_{orange}$ may represent a first probability corresponding to orange, $P_{yellow}$ may represent a second probability corresponding to yellow, $P'_{yellow}$ may represent a first probability corresponding to yellow, $P_{green}$ may represent a second probability corresponding to green, $P'_{green}$ may represent a first probability corresponding to green, $P_{blue}$ may represent a second probability corresponding to blue, and $P'_{blue}$ may represent a first probability corresponding to blue.

According to embodiments of the present disclosure, operation S411 may include the following operations.

The first color component of the one or more pixels of the original image is processed based on one or more periodic functions corresponding to the predetermined color mode, so as to obtain the plurality of second probabilities corresponding to the one or more pixels.

According to embodiments of the present disclosure, the one or more periodic functions corresponding to the predetermined color mode may be used to determine the color association corresponding to the predetermined color mode.

According to embodiments of the present disclosure, the first color component of the one or more pixels of the original image may be processed using the one or more periodic functions corresponding to the predetermined color mode, so as to obtain the plurality of second probabilities corresponding to the one or more pixels.

According to embodiments of the present disclosure, as the plurality of second probabilities are obtained by processing the first color component of the pixel of the original image according to the one or more periodic functions corresponding to the predetermined color mode, it is possible to achieve a universal adaptation of different hardware by defining the appearance probability of the predetermined color based on the periodic functions.

According to embodiments of the present disclosure, the periodic functions corresponding to the predetermined color mode may include one or more periodic functions corresponding to each of the plurality of predetermined colors.

According to embodiments of the present disclosure, processing the first color component of the one or more pixels of the original image based on the one or more periodic functions corresponding to the predetermined color mode so as to obtain the plurality of second probabilities corresponding to the one or more pixels may include the following operations.

For a pixel among the one or more pixels of the original image, it is possible to determine a value range corresponding to the first color component of the pixel, and determine a target periodic function corresponding to each of the plurality of predetermined colors from the one or more periodic functions corresponding to that predetermined color according to the value range. The first color component of the pixel may be processed based on the target periodic functions respectively corresponding to the plurality of predetermined colors, so as to obtain the plurality of second probabilities corresponding to the pixel.

According to embodiments of the present disclosure, for a pixel among the one or more pixels of the original image, it is possible to determine a value range corresponding to the first color component of the pixel, and determine the target periodic function corresponding to each of the plurality of predetermined colors from the one or more periodic functions corresponding to that predetermined color according to the value range corresponding to the first color component of the pixel. The first color component of the pixel may be input into the target periodic functions respectively corresponding to the plurality of predetermined colors to obtain the second probabilities respectively corresponding to the plurality of predetermined colors of the pixel. According to embodiments of the present disclosure, the plurality of predetermined colors may include black, white and red. The periodic functions corresponding to the predetermined color mode include a $1^{st}$ periodic function corresponding to black, a $2^{nd}$ periodic function corresponding to black, a $3^{rd}$ periodic function corresponding to white, a $4^{th}$ periodic function corresponding to red, and a $5^{th}$ periodic function corresponding to red.

According to embodiments of the present disclosure, determining the target periodic functions corresponding to the plurality of predetermined colors from the one or more periodic functions corresponding to the plurality of predetermined colors according to the value range may include the following operations.

When it is determined that the value range is a first predetermined range or a second predetermined range, the $1^{st}$ periodic function corresponding to black may be determine as the target periodic function corresponding to black from the $1^{st}$ periodic function corresponding to black and the $2^{nd}$ periodic function corresponding to black, the $3^{rd}$ periodic function corresponding to white may be determined as the target periodic function corresponding to white from the $3^{rd}$ periodic function corresponding to white, and the $4^{th}$ periodic function corresponding to red may be determined as the target periodic function corresponding to red from the $4^{th}$ periodic function corresponding to red and the $5^{th}$ periodic function corresponding to red. When it is determined that the value range is a third predetermined range, the $2^{nd}$ periodic function corresponding to black may be determined as the target periodic function corresponding to black from the $1^{st}$ periodic function corresponding to black and the $2^{nd}$ periodic function corresponding to black, the $3^{rd}$ periodic function corresponding to white may be determined as the target periodic function corresponding to white from the $3^{rd}$ periodic function corresponding to white, and the $5^{th}$ periodic function corresponding to red may be determined as the target periodic function corresponding to red from the $4^{th}$ periodic function corresponding to red and the $5^{th}$ periodic function corresponding to red.

According to embodiments of the present disclosure, the first predetermined range, the second predetermined range and the third predetermined range may be set according to actual service needs and are not limited here. For example, the first predetermined range, the second predetermined range and the third predetermined range may cooperate with each other to be greater than or equal to 0 and less than 180. The first predetermined range may be greater than or equal to 0 and less than 30. The second predetermined range may be greater than or equal to 150 and less than 180. The third predetermined range may be greater than or equal to 30 and less than 150.

According to embodiments of the present disclosure, when it is determined that the value range is the first predetermined range or the second predetermined range, the $1^{st}$ periodic function corresponding to black may be determined as the target periodic function corresponding to black, the $3^{rd}$ periodic function corresponding to white may be determined as the target periodic function corresponding to white, and the $4^{th}$ periodic function corresponding to red may be determined as the target periodic function corresponding to red.

According to embodiments of the present disclosure, when it is determined that the value range is the third predetermined range, the $2^{nd}$ periodic function corresponding to black may be determined as the target periodic function corresponding to black, the $3^{rd}$ periodic function corresponding to white may be determined as the target periodic function corresponding to white, and the $5^{th}$ periodic function corresponding to red may be determined as the target periodic function corresponding to red.

According to embodiments of the present disclosure, the plurality of predetermined colors may include black, white and red.

According to embodiments of the present disclosure, when the plurality of predetermined colors include black, white and red, the periodic functions corresponding to the predetermined color mode may be determined according to Equations (12) to (17) below.

When $0 \leq x < 30$ or $150 \leq x < 180$, the periodic functions corresponding to the predetermined color mode may be determined according to Equations (12) to (14) below.

$$p_{color1} = \frac{\cos\left[\left(\frac{x}{30}\right) * \pi\right] + B}{A} \tag{12}$$

$$p_{white1} = \frac{\cos\left[\left(\frac{x-30}{30}\right) * \pi\right] + B}{A} \tag{13}$$

$$p_{black1} = 0 \tag{14}$$

When $30 \leq x < 150$, the periodic functions corresponding to the predetermined color mode may be determined according to Equations (15) to (17) below.

$$p_{color1} = 0 \tag{15}$$

$$p_{white1} = \frac{\cos\left[\left(\frac{x-30}{30}\right) * \pi\right] + B}{A} \tag{16}$$

$$p_{color1} = \frac{\cos\left[\left(\frac{x}{30}\right) * \pi\right] + B}{A} \tag{17}$$

According to embodiments of the present disclosure, x may represent a first color component, $p_{color1}$ may represent a second probability corresponding to red, $p_{white1}$ may represent a second probability corresponding to white, $p_{black1}$ may represent a second probability corresponding to black, A may represent a first predetermined value, and B may represent a second predetermined value. A and B may cooperate with each other so that the second probability is greater than or equal to 0 and less than or equal to 1.

According to embodiments of the present disclosure, the first predetermined value and the second predetermined value may be set according to actual service needs and are not limited here. For example, the first predetermined value may be 2, and the second predetermined value may be 1.

According to embodiments of the present disclosure, the first predetermined range is $0 \leq x < 30$, the second predetermined range is $150 \leq x < 180$, and the third predetermined range is $30 \leq x < 150$. Equation (12) represents the $4^{th}$ periodic function. Equation (15) represents the $5^{th}$ periodic function. Equations (13) and (16) represent the $3^{rd}$ periodic function. Equation (14) represents the $1^{st}$ periodic function. Equation (17) represents the $2^{nd}$ periodic function.

The periodic functions corresponding to the predetermined color mode in a case of the plurality of predetermined colors including black, white and red will be described below with reference to FIG. 6A.

FIG. 6A schematically shows an example schematic diagram of a probability distribution corresponding to the predetermined color mode in a case of the plurality of predetermined colors including black, white and red according to embodiments of the present disclosure.

As shown in FIG. 6A, in 600A, a point on a ring 601 may represent a probability of 1, a point on a ring 602 may represent a probability of 0, and a point between the ring 601 and the ring 602 may represent a probability of (0, 1).

$O_1 A_1$-direction may represent that the first color component x is at 0 degrees, $O_1 B_1$-direction may represent that the first color component x is at 30 degrees, $O_1 C_1$-direction may represent that the first color component x is at 60 degrees, $O_1 D_1$-direction may represent that the first color component x is at 90 degrees, $O_1 E_1$-direction may represent that the first color component x is at 120 degrees, and $O_1 F_1$-direction may represent that the first color component x is at 150 degrees.

From $O_1 A_1$ to $O_1 B_1$, that is, when x belongs to [0, 30), the probability of the predetermined color being red is [1, 0), the probability of the predetermined color being white is [0, 1), and the probability of the predetermined color being black is 0.

From $O_1 B_1$ to $O_1 C_1$, that is, when x belongs to [30, 60), the probability of the predetermined color being red is 0, the probability of the predetermined color being white is [1, 0), and the probability of the predetermined color being black is [0, 1).

From $O_1C_1$ to $O_1D_1$, that is, when x belongs to [60, 90), the probability of the predetermined color being red is 0, the probability of the predetermined color being white is [0, 1), and the probability of the predetermined color being black is [1, 0).

From $O_1D_1$ to $O_1E_1$, that is, when x belongs to [90, 120), the probability of the predetermined color being red is 0, the probability of the predetermined color being white is [1, 0), and the probability of the predetermined color being black is [0, 1).

From $O_1E_1$ to $O_1F_1$, that is, when x belongs to [120, 150), the probability of the predetermined color being red is 0, the probability of the predetermined color being white is [0, 1), and the probability of the predetermined color being black is [1, 0).

From $O_1F_1$ to $O_1A_1$, that is, when x belongs to [150, 180), the probability of the predetermined color being red is [0, 1), the probability of the predetermined color being white is [1, 0), and the probability of the predetermined color being black is 0.

According to embodiments of the present disclosure, the plurality of predetermined colors include black, white and orange, or include black, white and yellow.

According to embodiments of the present disclosure, the periodic functions corresponding to the predetermined color mode include a $6^{th}$ periodic function corresponding to black, a $7^{th}$ periodic function corresponding to black, an $8^{th}$ periodic function corresponding to black, a $9^{th}$ periodic function corresponding to white, a $10^{th}$ periodic function corresponding to white, an $11^{st}$ periodic function corresponding to a common color, a $12^{th}$ periodic function corresponding to the common color, a $13^{th}$ periodic function corresponding to the common color, and a $14^{th}$ periodic function corresponding to the common color. The common color includes at least one of orange or yellow.

According to embodiments of the present disclosure, determining the target periodic functions corresponding to the plurality of predetermined colors from the one or more periodic functions corresponding to the plurality of predetermined colors according to the value range may include the following operations.

When it is determined that the value range is a fourth predetermined range, the $6^{th}$ periodic function corresponding to black is determined as the target periodic function corresponding to black from the $6^{th}$ periodic function corresponding to black, the $7^{th}$ periodic function corresponding to black and the $8^{th}$ periodic function corresponding to black, the $9^{th}$ periodic function corresponding to white is determined as the target periodic function corresponding to white from the $9^{th}$ periodic function corresponding to white and the $10^{th}$ periodic function corresponding to white, and the $11^{st}$ periodic function corresponding to the common color is determined as the target periodic function corresponding to the common color from the $11^{st}$ periodic function corresponding to the common color, the $12^{th}$ periodic function corresponding to the common color, the $13^{th}$ periodic function corresponding to the common color, and the $14^{th}$ periodic function corresponding to the common color.

When it is determined that the value range is a fifth predetermined range, the $7^{th}$ periodic function corresponding to black is determined as the target periodic function corresponding to black from the $6^{th}$ periodic function corresponding to black, the $7^{th}$ periodic function corresponding to black and the $8^{th}$ periodic function corresponding to black, the $9^{th}$ periodic function corresponding to white is determined as the target periodic function corresponding to white from the $9^{th}$ periodic function corresponding to white and the $10^{th}$ periodic function corresponding to white, and the $12^{th}$ periodic function corresponding to the common color is determined as the target periodic function corresponding to the common color from the $11^{st}$ periodic function corresponding to the common color, the $12^{th}$ periodic function corresponding to the common color, the $13^{th}$ periodic function corresponding to the common color, and the $14^{th}$ periodic function corresponding to the common color.

When it is determined that the value range is a sixth predetermined range, the $7^{th}$ periodic function corresponding to black is determined as the target periodic function corresponding to black from the $6^{th}$ periodic function corresponding to black, the $7^{th}$ periodic function corresponding to black and the $8^{th}$ periodic function corresponding to black, the $10^{th}$ periodic function corresponding to white is determined as the target periodic function corresponding to white from the $9^{th}$ periodic function corresponding to white and the $10^{th}$ periodic function corresponding to white, and the $13^{th}$ periodic function corresponding to the common color is determined as the target periodic function corresponding to the common color from the $11^{st}$ periodic function corresponding to the common color, the $12^{th}$ periodic function corresponding to the common color, the $13^{th}$ periodic function corresponding to the common color, and the $14^{th}$ periodic function corresponding to the common color.

When it is determined that the value range is a seventh predetermined range, the $8^{th}$ periodic function corresponding to black is determined as the target periodic function corresponding to black from the $6^{th}$ periodic function corresponding to black, the $7^{th}$ periodic function corresponding to black and the $8^{th}$ periodic function corresponding to black, the $10^{th}$ periodic function corresponding to white is determined as the target periodic function corresponding to white from the $9^{th}$ periodic function corresponding to white and the $10^{th}$ periodic function corresponding to white, and the $14^{th}$ periodic function corresponding to the common color is determined as the target periodic function corresponding to the common color from the $11^{st}$ periodic function corresponding to the common color, the $12^{th}$ periodic function corresponding to the common color, the $13^{th}$ periodic function corresponding to the common color, and the $14^{th}$ periodic function corresponding to the common color.

According to embodiments of the present disclosure, the fourth predetermined range, the fifth predetermined range, the sixth predetermined range and the seventh predetermined range may be determined according to actual service needs and are not limited here. For example, the fourth predetermined range, the fifth predetermined range, the sixth predetermined range and the seventh predetermined range may cooperate with each other to be greater than or equal to 0 and less than or equal to 180. The fourth predetermined range may be greater than or equal to 0 and less than 30. The fifth predetermined range may be greater than or equal to 30 and less than 60. The sixth predetermined range may be greater than or equal to 60 and less than 150. The seventh predetermined range may be greater than or equal to 150 and less than 180.

According to embodiments of the present disclosure, when it is determined that the value range is the fourth predetermined range, the $6^{th}$ periodic function may be determined as the target periodic function corresponding to black, the $9^{th}$ periodic function may be determined as the target periodic function corresponding to white, and the $11^{st}$ periodic function may be determined as the target periodic function corresponding to the common color.

According to embodiments of the present disclosure, when it is determined that the value range is the fifth predetermined range, the $7^{th}$ periodic function may be determined as the target periodic function corresponding to black, the $9^{th}$ periodic function may be determined as the target periodic function corresponding to white, and the $12^{th}$ periodic function may be determined as the target periodic function corresponding to the common color.

According to embodiments of the present disclosure, when it is determined that the value range is the sixth predetermined range, the $7^{th}$ periodic function may be determined as the target periodic function corresponding to black, the $10^{th}$ periodic function may be determined as the target periodic function corresponding to white, and the $13^{th}$ periodic function may be determined as the target periodic function corresponding to the common color.

According to embodiments of the present disclosure, when it is determined that the value range is the seventh predetermined range, the $8^{th}$ periodic function may be determined as the target periodic function corresponding to black, the $10^{th}$ periodic function may be determined as the target periodic function corresponding to white, and the $14^{th}$ periodic function may be determined as the target periodic function corresponding to the common color.

According to embodiments of the present disclosure, when the plurality of predetermined colors include black, white and orange or include black, white and yellow, the periodic functions corresponding to the predetermined color mode may be determined according to Equations (18) to (29) below.

According to embodiments of the present disclosure, when $0 \leq x < 30$, the periodic functions corresponding to the predetermined color mode may be determined according to Equations (18) to (20) below.

$$p_{color2} = 0.5 * \frac{\cos\left[\left(\frac{x}{30}\right)*\pi\right] + B}{A} + \frac{\cos\left[\left(\frac{x-30}{30}\right)*\pi\right] + B}{A} \quad (18)$$

$$p_{white2} = 0 \quad (19)$$

$$p_{black2} = 0 \quad (20)$$

According to embodiments of the present disclosure, when $30 \leq x < 60$, the periodic functions corresponding to the predetermined color mode may be determined according to Equations (21) to (23) below.

$$p_{color2} = \frac{\cos\left[\left(\frac{x-30}{30}\right)*\pi\right] + B}{A} \quad (21)$$

$$p_{white2} = 0 \quad (22)$$

$$p_{black2} = \frac{\cos\left[\left(\frac{x}{30}\right)*\pi\right] + B}{A} \quad (23)$$

According to embodiments of the present disclosure, when $60 \leq x < 150$, the periodic functions corresponding to the predetermined color mode may be determined according to Equations (24) to (26) below.

$$p_{color2} = 0 \quad (24)$$

$$p_{white2} = \frac{\cos\left[\left(\frac{x-30}{30}\right)*\pi\right] + B}{A} \quad (25)$$

-continued $$p_{black2} = \frac{\cos\left[\left(\frac{x}{30}\right)*\pi\right] + B}{A} \quad (26)$$

According to embodiments of the present disclosure, when $150 \leq x < 180$, the periodic functions corresponding to the predetermined color mode may be determined according to Equations (27) to (29) below.

$$p_{color2} = 0.5 * \frac{\cos\left[\left(\frac{x}{30}\right)*\pi\right] + B}{A} \quad (27)$$

$$p_{white2} = \frac{\cos\left[\left(\frac{x-30}{30}\right)*\pi\right] + B}{A} \quad (28)$$

$$p_{black2} = 0.5 * \frac{\cos\left[\left(\frac{x}{30}\right)*\pi\right] + B}{A} \quad (29)$$

According to embodiments of the present disclosure, x may represent a first color component, $p_{color2}$ may represent a second probability corresponding to yellow or orange, $p_{white2}$ may represent a second probability corresponding to white, $p_{black2}$ may represent a second probability corresponding to black, A may represent a first predetermined value, and B may represent a second predetermined value. A and B may cooperate with each other so that the second probability is greater than or equal to 0 and less than or equal to 1.

According to embodiments of the present disclosure, when x belongs to [0, 30), the probability of the predetermined color being black is 0, the probability of the predetermined color being white is 0, and the probability of the predetermined color being orange or yellow is [0.5, 1).

According to embodiments of the present disclosure, when x belongs to [30, 60), the probability of the predetermined color being black is [0, 1), the probability of the predetermined color being white is 0, and the probability of the predetermined color being orange or yellow is [1, 0).

According to embodiments of the present disclosure, when x belongs to [60, 90), the probability of the predetermined color being black is [1, 0), the probability of the predetermined color being white is [0, 1), and the probability of the predetermined color being orange or yellow is 0. When x belongs to [90, 120), the probability of the predetermined color being black is [0, 1), the probability of the predetermined color being white is [1, 0), and the probability of the predetermined color being orange or yellow is 0. When x belongs to [120, 150), the probability of the predetermined color being black is [1, 0), the probability of the predetermined color being white is [0, 1), and the probability of the predetermined color being orange or yellow is 0.

According to embodiments of the present disclosure, when x belongs to [150, 180), the probability of the predetermined color being black is [0, 0.5), the probability of the predetermined color being white is [1, 0), and the probability of the predetermined color being orange or yellow is [0, 0.5).

According to embodiments of the present disclosure, the fourth predetermined range is $0 \leq x < 30$, the fifth predetermined range is $30 \leq x < 60$, the sixth predetermined range is $60 \leq x < 150$, and the seventh predetermined range is $150 \leq x < 180$. Equation (20) represents the $6^{th}$ periodic function. Equations (23) and (26) represent the $7^{th}$ periodic function. Equation (29) represents the $8^{th}$ periodic function. Equations (19) and (22) represent the $9^{th}$ periodic function.

Equations (25) and (28) represent the $10^{th}$ periodic function. Equation (18) represents the $11^{st}$ periodic function. Equation (21) represents the $12^{th}$ periodic function. Equation (24) represents the $13^{th}$ periodic function. Equation (27) represents the $14^{th}$ periodic function.

According to embodiments of the present disclosure, the periodic functions corresponding to the predetermined color mode include a $15^{th}$ periodic function corresponding to black, a $16^{th}$ periodic function corresponding to black, a $17^{th}$ periodic function corresponding to black, an $18^{th}$ periodic function corresponding to white, a $19^{th}$ periodic function corresponding to green, a $20^{th}$ periodic function corresponding to green, and a $21^{st}$ periodic function corresponding to green.

According to embodiments of the present disclosure, determining the target periodic functions corresponding to the plurality of predetermined colors from the one or more periodic functions corresponding to the plurality of predetermined colors according to the value range may include the following operations.

When it is determined that the value range is an eighth predetermined range or a ninth predetermined range, the $15^{th}$ periodic function corresponding to black is determined as the target periodic function corresponding to black from the $15^{th}$ periodic function corresponding to black, the $16^{th}$ periodic function corresponding to black and the $17^{th}$ periodic function corresponding to black, the $18^{th}$ periodic function corresponding to white is determined as the target periodic function corresponding to white from the $18^{th}$ periodic function corresponding to white, and the $19^{th}$ periodic function corresponding to green is determined as the target periodic function corresponding to green from the $19^{th}$ periodic function corresponding to green, the $20^{th}$ periodic function corresponding to green and the $21^{st}$ periodic function corresponding to green.

When it is determined that the value range is a tenth predetermined range, the $16^{th}$ periodic function corresponding to black is determined as the target periodic function corresponding to black from the $15^{th}$ periodic function corresponding to black, the $16^{th}$ periodic function corresponding to black and the $17^{th}$ periodic function corresponding to black, the $18^{th}$ periodic function corresponding to white is determined as the target periodic function corresponding to white from the $18^{th}$ periodic function corresponding to white, and the $20^{th}$ periodic function corresponding to green is determined as the target periodic function corresponding to green from the $19^{th}$ periodic function corresponding to green, the $20^{th}$ periodic function corresponding to green and the $21^{st}$ periodic function corresponding to green.

When it is determined that the value range is an eleventh predetermined range, the $17^{th}$ periodic function corresponding to black is determined as the target periodic function corresponding to black from the $15^{th}$ periodic function corresponding to black, the $16^{th}$ periodic function corresponding to black and the $17^{th}$ periodic function corresponding to black, the $18^{th}$ periodic function corresponding to white is determined as the target periodic function corresponding to white from the $18^{th}$ periodic function corresponding to white, and the $21^{st}$ periodic function corresponding to green is determined as the target periodic function corresponding to green from the $19^{th}$ periodic function corresponding to green, the $20^{th}$ periodic function corresponding to green and the $21^{st}$ periodic function corresponding to green.

According to embodiments of the present disclosure, the eighth predetermined range, the ninth predetermined range, the tenth predetermined range and the eleventh predetermined range may be set according to actual service needs and are not limited here. For example, the eighth predetermined range, the ninth predetermined range, the tenth predetermined range and the eleventh predetermined range may cooperate with each other to be greater than or equal to 0 and less than or equal to 180. The eighth predetermined range may be greater than or equal to 0 and less than 30. The ninth predetermined range may be greater than or equal to 150 and less than 180. The tenth predetermined range may be greater than or equal to 30 and less than 90. The eleventh predetermined range may be greater than or equal to 90 and less than 150.

According to embodiments of the present disclosure, when it is determined that the value range is the eighth predetermined range or the ninth predetermined range, the $15^{th}$ periodic function may be determined as the target periodic function corresponding to black, the $18^{th}$ periodic function may be determined as the target periodic function corresponding to white, and the $19^{th}$ periodic function may be determined as the target periodic function corresponding to green.

According to embodiments of the present disclosure, when it is determined that the value range is the tenth predetermined range, the $16^{th}$ periodic function may be determined as the target periodic function corresponding to black, the $18^{th}$ periodic function may be determined as the target periodic function corresponding to white, and the $20^{th}$ periodic function may be determined as the target periodic function corresponding to green.

According to embodiments of the present disclosure, when it is determined that the value range is the eleventh predetermined range, the $17^{th}$ periodic function may be determined as the target periodic function corresponding to black, the $18^{th}$ periodic function may be determined as the target periodic function corresponding to white, and the $21^{st}$ periodic function may be determined as the target periodic function corresponding to green. The plurality of predetermined colors include black, white and green.

According to embodiments of the present disclosure, when the plurality of predetermined colors include black, white and green, the periodic functions corresponding to the predetermined color mode may be determined according to Equations (30) to (38) below.

According to embodiments of the present disclosure, when $0 \leq x < 30$ or $150 \leq x < 180$, the periodic functions corresponding to the predetermined color mode may be determined according to Equations (30) to (32) below.

$$p_{color3} = 0.5 * \frac{\cos\left[\left(\frac{x}{30}\right)*\pi\right] + B}{A} \tag{30}$$

$$p_{white3} = \frac{\cos\left[\left(\frac{x-30}{30}\right)*\pi\right] + B}{A} \tag{31}$$

$$p_{black3} = 0.5 * \frac{\cos\left[\left(\frac{x}{30}\right)*\pi\right] + B}{A} \tag{32}$$

According to embodiments of the present disclosure, when $30 \leq x < 90$, the periodic functions corresponding to the predetermined color mode may be determined according to Equations (33) to (35) below.

$$p_{color3} = \frac{\cos\left[\left(\frac{x}{30}\right)*\pi\right] + B}{A} \tag{33}$$

-continued $$p_{white3} = \frac{\cos\left[\left(\frac{x-30}{30}\right)*\pi\right] + B}{A} \quad (34)$$

$$p_{black3} = 0 \quad (35)$$

According to embodiments of the present disclosure, when 90 x<150, the periodic functions corresponding to the predetermined color mode may be determined according to Equations (36) to (38) below.

$$p_{color3} = 0 \quad (36)$$

$$p_{white3} = \frac{\cos\left[\left(\frac{x-30}{30}\right)*\pi\right] + B}{A} \quad (37)$$

$$p_{black3} = \frac{\cos\left[\left(\frac{x}{30}\right)*\pi\right] + B}{A} \quad (38)$$

According to embodiments of the present disclosure, x may represent a first color component, $p_{color3}$ may represent a second probability corresponding to green, $p_{white3}$ may represent a second probability corresponding to white, $p_{black3}$ may represent a second probability corresponding to black, A may represent a first predetermined value, and B may represent a second predetermined value. A and B may cooperate with each other so that the second probability is greater than or equal to 0 and less than or equal to 1.

According to embodiments of the present disclosure, when x belongs to [0, 30), the probability of the predetermined color being black is [0.5, 0), the probability of the predetermined color being white is [0, 1), and the probability of the predetermined color being green is [0.5, 0).

According to embodiments of the present disclosure, when x belongs to [30, 60), the probability of the predetermined color being black is 0, the probability of the predetermined color being white is [1, 0), and the probability of the predetermined color being green is [0, 1). When x belongs to [60, 90), the probability of the predetermined color being black is 0, the probability of the predetermined color being white is [0, 1), and the probability of the predetermined color being green is [1, 0).

According to embodiments of the present disclosure, when x belongs to [90, 120), the probability of the predetermined color being black is [0, 1), the probability of the predetermined color being white is [1, 0), and the probability of the predetermined color being green is 0. When x belongs to [120, 150), the probability of the predetermined color being black is [1, 0), the probability of the predetermined color being white is [0, 1), and the probability of the predetermined color being green is 0.

According to embodiments of the present disclosure, when x belongs to [150, 180), the probability of the predetermined color being black is [0, 0.5), the probability of the predetermined color being white is [1, 0), and the probability of the predetermined color being green is [0, 0.5).

According to embodiments of the present disclosure, the eighth predetermined range is $0 \leq x < 30$, the ninth predetermined range is $150 \leq x < 180$, the tenth predetermined range is $30 \leq x < 90$, and the eleventh predetermined range is $90 \leq x < 150$. Equation (32) represents the $15^{th}$ periodic function. Equation (35) represents the $16^{th}$ periodic function. Equation (38) represents the $17^{th}$ periodic function. Equations (31), (34) and (37) represent the $18^{th}$ periodic function.

Equation (30) represents the $19^{th}$ periodic function. Equation (33) represents the $20^{th}$ periodic function. Equation (36) represents the $21^{st}$ periodic function.

According to embodiments of the present disclosure, the periodic functions corresponding to the predetermined color mode may include a $22^{nd}$ periodic function corresponding to black, a $23^{rd}$ periodic function corresponding to black, a $24^{th}$ periodic function corresponding to black, a $25^{th}$ periodic function corresponding to white, a $26^{th}$ periodic function corresponding to blue, a $27^{th}$ periodic function corresponding to blue, and a $28^{th}$ periodic function corresponding to blue.

According to embodiments of the present disclosure, determining the target periodic functions corresponding to the plurality of predetermined colors from the one or more periodic functions corresponding to the plurality of predetermined colors according to the value range may include the following operations.

When it is determined that the value range is a twelfth predetermined range or a thirteenth predetermined range, the $22^{nd}$ periodic function corresponding to black is determined as the target periodic function corresponding to black from the $22^{nd}$ periodic function corresponding to black, the $23^{rd}$ periodic function corresponding to black and the $24^{th}$ periodic function corresponding to black, the $25^{th}$ periodic function corresponding to white is determined as the target periodic function corresponding to white from the $25^{th}$ periodic function corresponding to white, and the $26^{th}$ periodic function corresponding to blue is determined as the target periodic function corresponding to blue from the $26^{th}$ periodic function corresponding to blue, the $27^{th}$ periodic function corresponding to blue and the $28^{th}$ periodic function corresponding to blue.

When it is determined that the value range is a fourteenth predetermined range, the $23^{rd}$ periodic function corresponding to black is determined as the target periodic function corresponding to black from the $22^{nd}$ periodic function corresponding to black, the $23^{rd}$ periodic function corresponding to black and the $24^{th}$ periodic function corresponding to black, the $25^{th}$ periodic function corresponding to white is determined as the target periodic function corresponding to white from the $25^{th}$ periodic function corresponding to white, and the $27^{th}$ periodic function corresponding to blue is determined as the target periodic function corresponding to blue from the $26^{th}$ periodic function corresponding to blue, the $27^{th}$ periodic function corresponding to blue and the $28^{th}$ periodic function corresponding to blue.

When it is determined that the value range is a fifteenth predetermined range, the $24^{th}$ periodic function corresponding to black is determined as the target periodic function corresponding to black from the $22^{nd}$ periodic function corresponding to black, the $23^{rd}$ periodic function corresponding to black and the $24^{th}$ periodic function corresponding to black, the $25^{th}$ periodic function corresponding to white is determined as the target periodic function corresponding to white from the $25^{th}$ periodic function corresponding to white, and the $28^{th}$ periodic function corresponding to blue is determined as the target periodic function corresponding to blue from the $26^{th}$ periodic function corresponding to blue, the $27^{th}$ periodic function corresponding to blue and the $28^{th}$ periodic function corresponding to blue.

According to embodiments of the present disclosure, the twelfth predetermined range, the thirteenth predetermined range, the fourteenth predetermined range and the fifteenth predetermined range may be set according to actual service needs and are not limited here. For example, the twelfth predetermined range, the thirteenth predetermined range, the fourteenth predetermined range and the fifteenth predetermined range may cooperate with each other to be greater than or equal to 0 and less than or equal to 180. The twelfth predetermined range may be greater than or equal to 0 and less than 30. The thirteenth predetermined range may be greater than or equal to 150 and less than 180. The fourteenth predetermined range may be greater than or equal to 30 and less than 90. The fifteenth predetermined range may be greater than or equal to 90 and less than 150.

According to embodiments of the present disclosure, when it is determined that the value range is the twelfth predetermined range or the thirteenth predetermined range, the $22^{nd}$ periodic function may be determined as the target periodic function corresponding to black, the $25^{th}$ periodic function may be determined as the target periodic function corresponding to white, and the $26^{th}$ periodic function may be determined as the target periodic function corresponding to blue.

According to embodiments of the present disclosure, when it is determined that the value range is the fourteenth predetermined range, the $23^{rd}$ periodic function may be determined as the target periodic function corresponding to black, the $25^{th}$ periodic function may be determined as the target periodic function corresponding to white, and the $27^{th}$ periodic function may be determined as the target periodic function corresponding to blue.

According to embodiments of the present disclosure, when it is determined that the value range is the fifteenth predetermined range, the $24^{th}$ periodic function may be determined as the target periodic function corresponding to black, the $25^{th}$ periodic function may be determined as the target periodic function corresponding to white, and the $28^{th}$ periodic function may be determined as the target periodic function corresponding to blue.

According to embodiments of the present disclosure, the plurality of predetermined colors include black, white and blue.

According to embodiments of the present disclosure, when the plurality of predetermined colors include black, white and blue, the periodic functions corresponding to the predetermined color mode may be determined according to Equations (39) to (47) below.

According to embodiments of the present disclosure, when $0 \leq x < 30$ or $150 \leq x < 180$, the periodic functions corresponding to the predetermined color mode may be determined according to Equations (39) to (41) below.

$$p_{color3} = 0.5 * \frac{\cos\left[\left(\frac{x}{30}\right)*\pi\right] + B}{A} \tag{39}$$

$$p_{white4} = \frac{\cos\left[\left(\frac{x-30}{30}\right)*\pi\right] + B}{A} \tag{40}$$

$$p_{black4} = 0.5 * \frac{\cos\left[\left(\frac{x}{30}\right)*\pi\right] + B}{A} \tag{41}$$

According to embodiments of the present disclosure, when $30 \leq x < 90$, the periodic functions corresponding to the predetermined color mode may be determined according to Equations (42) to (44) below.

$$p_{color4} = 0 \tag{42}$$

$$p_{white4} = \frac{\cos\left[\left(\frac{x-30}{30}\right)*\pi\right] + B}{A} \tag{43}$$

$$p_{black4} = \frac{\cos\left[\left(\frac{x}{30}\right)*\pi\right] + B}{A} \tag{44}$$

According to embodiments of the present disclosure, when $90 \leq x < 150$, the periodic functions corresponding to the predetermined color mode may be determined according to Equations (45) to (47) below.

$$p_{color4} = \frac{\cos\left[\left(\frac{x}{30}\right)*\pi\right] + B}{A} \tag{45}$$

$$p_{white4} = \frac{\cos\left[\left(\frac{x-30}{30}\right)*\pi\right] + B}{A} \tag{46}$$

$$p_{black4} = 0 \tag{47}$$

According to embodiments of the present disclosure, x may represent a first color component, $p_{color4}$ may represent a second probability corresponding to blue, $p_{white4}$ may represent a second probability corresponding to white, $p_{black4}$ may represent a second probability corresponding to black, A may represent a first predetermined value, and B may represent a second predetermined value. A and B may cooperate with each other so that the second probability is greater than or equal to 0 and less than or equal to 1.

According to embodiments of the present disclosure, when x belongs to [0, 30), the probability of the predetermined color being black is [0.5, 0), the probability of the predetermined color being white is [0, 1), and the probability of the predetermined color being blue is [0.5, 0).

According to embodiments of the present disclosure, when x belongs to [30, 60), the probability of the predetermined color being black is [0, 1), the probability of the predetermined color being white is [1, 0), and the probability of the predetermined color being blue is 0. When x belongs to [60, 90), the probability of the predetermined color being black is [1, 0), the probability of the predetermined color being white is [0, 1), and the probability of the predetermined color being blue is 0.

According to embodiments of the present disclosure, when x belongs to [90, 120), the probability of the predetermined color being black is 0, the probability of the predetermined color being white is [1, 0), and the probability of the predetermined color being blue is [0, 1). When x belongs to [120, 150), the probability of the predetermined color being black is 0, the probability of the predetermined color being white is [0, 1), and the probability of the predetermined color being blue is [1, 0).

According to embodiments of the present disclosure, when x belongs to [150, 180), the probability of the predetermined color being black is [0, 0.5), the probability of the predetermined color being white is [1, 0), and the probability of the predetermined color being blue is [0, 0.5).

According to embodiments of the present disclosure, the twelfth predetermined range is $0 \leq x < 30$, the thirteenth predetermined range is $150 \leq x < 180$, the fourteenth predetermined range is $30 \leq x < 90$, and the fifteenth predetermined range is $90 \leq x < 150$. Equation (41) represents the $22^{nd}$ periodic function. Equation (44) represents the $23^{rd}$ periodic function. Equation (47) represents the $24^{th}$ periodic function. Equations (40), (43) and (46) represent the $25^{th}$ periodic function. Equation (39) represents the $26^{th}$ periodic function. Equation (42) represents the $27^{th}$ periodic function. Equation (45) represents the $28^{th}$ periodic function.

According to embodiments of the present disclosure, the periodic functions corresponding to the predetermined color mode may include a $29^{th}$ periodic function corresponding to black, a $30^{th}$ periodic function corresponding to black, a $31^{st}$ periodic function corresponding to white, a $32^{nd}$ periodic function corresponding to white, a $33^{rd}$ periodic function corresponding to red, a $34^{th}$ periodic function corresponding to red, a $35^{th}$ periodic function corresponding to yellow, and a $36^{th}$ periodic function corresponding to yellow.

According to embodiments of the present disclosure, determining the target periodic functions corresponding to the plurality of predetermined colors from the one or more periodic functions corresponding to the plurality of predetermined colors according to the value range may include the following operations.

When it is determined that the value range is a sixteenth predetermined range, the $29^{th}$ periodic function corresponding to black is determined as the target periodic function corresponding to black from the $29^{th}$ periodic function corresponding to black and the $30^{th}$ periodic function corresponding to black, the $31^{st}$ periodic function corresponding to white is determined as the target periodic function corresponding to white from the $31^{st}$ periodic function corresponding to white and the $32^{nd}$ periodic function corresponding to white, the $33^{rd}$ periodic function corresponding to red is determined as the target periodic function corresponding to red from the $33^{rd}$ periodic function corresponding to red and the $34^{th}$ periodic function corresponding to red, and the $35^{th}$ periodic function corresponding to yellow is determined as the target periodic function corresponding to yellow from the $35^{th}$ periodic function corresponding to yellow and the $36^{th}$ periodic function corresponding to yellow.

When it is determined that the value range is a seventeenth predetermined range, the $29^{th}$ periodic function corresponding to black is determined as the target periodic function corresponding to black from the $29^{th}$ periodic function corresponding to black and the $30^{th}$ periodic function corresponding to black, the $31^{st}$ periodic function corresponding to white is determined as the target periodic function corresponding to white from the $31^{st}$ periodic function corresponding to white and the $32^{nd}$ periodic function corresponding to white, the $34^{th}$ periodic function corresponding to red is determined as the target periodic function corresponding to red from the $33^{rd}$ periodic function corresponding to red and the $34^{th}$ periodic function corresponding to red, and the $35^{th}$ periodic function corresponding to yellow is determined as the target periodic function corresponding to yellow from the $35^{th}$ periodic function corresponding to yellow and the $36^{th}$ periodic function corresponding to yellow.

When it is determined that the value range is an eighteenth predetermined range, the $29^{th}$ periodic function corresponding to black is determined as the target periodic function corresponding to black from the $29^{th}$ periodic function corresponding to black and the $30^{th}$ periodic function corresponding to black, the $32^{nd}$ periodic function corresponding to white is determined as the target periodic function corresponding to white from the $31^{st}$ periodic function corresponding to white and the $32^{nd}$ periodic function corresponding to white, the $34^{th}$ periodic function corresponding to red is determined as the target periodic function corresponding to red from the $33^{rd}$ periodic function corresponding to red and the $34^{th}$ periodic function corresponding to red, and the $36^{th}$ periodic function corresponding to yellow is determined as the target periodic function corresponding to yellow from the $35^{th}$ periodic function corresponding to yellow and the $36^{th}$ periodic function corresponding to yellow.

When it is determined that the value range is a nineteenth predetermined range, the $30^{th}$ periodic function corresponding to black is determined as the target periodic function corresponding to black from the $29^{th}$ periodic function corresponding to black and the $30^{th}$ periodic function corresponding to black, the $32^{nd}$ periodic function corresponding to white is determined as the target periodic function corresponding to white from the $31^{st}$ periodic function corresponding to white and the $32^{nd}$ periodic function corresponding to white, the $33^{rd}$ periodic function corresponding to red is determined as the target periodic function corresponding to red from the $33^{rd}$ periodic function corresponding to red and the $34^{th}$ periodic function corresponding to red, and the $35^{th}$ periodic function corresponding to yellow is determined as the target periodic function corresponding to yellow from the $35^{th}$ periodic function corresponding to yellow and the $36^{th}$ periodic function corresponding to yellow.

According to embodiments of the present disclosure, the sixteenth predetermined range, the seventeenth predetermined range, the eighteenth predetermined range and the nineteenth predetermined range may be set according to actual service needs and are not limited here. For example, the sixteenth predetermined range, the seventeenth predetermined range, the eighteenth predetermined range and the nineteenth predetermined range may cooperate with each other to be greater than or equal to 0 and less than or equal to 180. The sixteenth predetermined range may be greater than or equal to 0 and less than 30. The seventeenth predetermined range may be greater than or equal to 30 and less than 60. The eighteenth predetermined range may be greater than or equal to 60 and less than 150. The nineteenth predetermined range may be greater than or equal to 150 and less than 180.

According to embodiments of the present disclosure, when it is determined that the value range is the sixteenth predetermined range, the $29^{th}$ periodic function may be determined as the target periodic function corresponding to black, the $31^{st}$ periodic function may be determined as the target periodic function corresponding to white, the $33^{rd}$ periodic function may be determined as the target periodic function corresponding to red, and the $35^{th}$ periodic function may be determined as the target periodic function corresponding to yellow.

According to embodiments of the present disclosure, when it is determined that the value range is the seventeenth predetermined range, the $29^{th}$ periodic function may be determined as the target periodic function corresponding to black, the $31^{st}$ periodic function may be determined as the target periodic function corresponding to white, the $34^{th}$ periodic function may be determined as the target periodic function corresponding to red, and the $35^{th}$ periodic function may be determined as the target periodic function corresponding to yellow.

According to embodiments of the present disclosure, when it is determined that the value range is the eighteenth predetermined range, the $29^{th}$ periodic function may be determined as the target periodic function corresponding to black, the $32^{nd}$ periodic function may be determined as the target periodic function corresponding to white, the $34^{th}$ periodic function may be determined as the target periodic function corresponding to red, and the $36^{th}$ periodic function may be determined as the target periodic function corresponding to yellow.

According to embodiments of the present disclosure, when it is determined that the value range is the nineteenth predetermined range, the $30^{th}$ periodic function may be determined as the target periodic function corresponding to black, the $32^{nd}$ periodic function may be determined as the target periodic function corresponding to white, the $33^{rd}$ periodic function may be determined as the target periodic function corresponding to red, and the $35^{th}$ periodic function may be determined as the target periodic function corresponding to yellow.

According to embodiments of the present disclosure, the plurality of predetermined colors include black, white, red and yellow.

According to embodiments of the present disclosure, when the plurality of predetermined colors include black, white, red and yellow, the periodic functions corresponding to the predetermined color mode may be determined according to Equations (48) to (63) below.

According to embodiments of the present disclosure, when $0 \leq x < 30$, the periodic functions corresponding to the predetermined color mode may be determined according to Equations (48) to (51) below.

$$p_{red1} = \frac{\cos\left[\left(\frac{x}{30}\right) * \pi\right] + B}{A} \tag{48}$$

$$p_{yellow1} = \frac{\cos\left[\left(\frac{x-30}{30}\right) * \pi\right] + B}{A} \tag{49}$$

$$p_{white5} = 0 \tag{50}$$

$$p_{black5} = \frac{\cos\left[\left(\frac{x}{30}\right) * \pi\right] + B}{A} \tag{51}$$

According to embodiments of the present disclosure, when $30 \leq x < 60$, the periodic functions corresponding to the predetermined color mode may be determined according to Equations (52) to (55) below.

$$p_{red1} = 0 \tag{52}$$

$$p_{yellow1} = \frac{\cos\left[\left(\frac{x-30}{30}\right) * \pi\right] + B}{A} \tag{53}$$

$$p_{white5} = 0 \tag{54}$$

$$p_{black5} = \frac{\cos\left[\left(\frac{x}{30}\right) * \pi\right] + B}{A} \tag{55}$$

According to embodiments of the present disclosure, when $60 \leq x < 150$, the periodic functions corresponding to the predetermined color mode may be determined according to Equations (56) to (59) below.

$$p_{red1} = 0 \tag{56}$$

$$p_{yellow1} = 0 \tag{57}$$

$$p_{white5} = \frac{\cos\left[\left(\frac{x-30}{30}\right) * \pi\right] + B}{A} \tag{58}$$

$$p_{black5} = \frac{\cos\left[\left(\frac{x}{30}\right) * \pi\right] + B}{A} \tag{59}$$

According to embodiments of the present disclosure, when $150 \leq x < 180$, the periodic functions corresponding to the predetermined color mode may be determined according to Equations (60) to (63) below.

$$p_{red1} = \frac{\cos\left[\left(\frac{x}{30}\right) * \pi\right] + B}{A} \tag{60}$$

$$p_{yellow1} = 0 \tag{61}$$

$$p_{white5} = \frac{\cos\left[\left(\frac{x-30}{30}\right) * \pi\right] + B}{A} \tag{62}$$

$$p_{black5} = 0 \tag{63}$$

According to embodiments of the present disclosure, x may represent a first color component, $p_{red1}$ may represent a second probability corresponding to red, $p_{yellow1}$ may represent a second probability corresponding to yellow, $p_{white5}$ may represent a second probability corresponding to white, $p_{black5}$ may represent a second probability corresponding to black, A may represent a first predetermined value, and B may represent a second predetermined value. A and B may cooperate with each other so that the second probability is greater than or equal to 0 and less than or equal to 1.

According to embodiments of the present disclosure, the first predetermined value and the second predetermined value may be set according to actual services needs and are not limited here. For example, the first predetermined value may be 2, and the second predetermined value may be 1.

According to embodiments of the present disclosure, the sixteenth predetermined range is $0 \leq x < 30$, the seventeenth predetermined range is $30 \leq x < 60$, the eighteenth predetermined range is $60 \leq x < 150$, and the nineteenth predetermined range is $150 \leq x < 180$. Equations (51), (55) and (59) represent the $29^{th}$ periodic function. Equation (63) represents the $30^{th}$ periodic function. Equations (50) and (54) represent the $31^{st}$ periodic function. Equations (58) and (62) represent the $32^{nd}$ periodic function. Equations (48) and (60) represent the $33^{rd}$ periodic function. Equations (52) and (56) represent the $34^{th}$ periodic function. Equations (49) and (53) represent the $35^{th}$ periodic function. Equations (57) and (61) represent the $36^{th}$ periodic function.

The periodic functions corresponding to the predetermined color mode in a case of the plurality of predetermined colors including black, white, red and yellow will be described below with reference to FIG. 6B.

FIG. 6B schematically shows an example schematic diagram of a probability distribution corresponding to the predetermined color mode in a case of the plurality of predetermined colors including black, white, red and yellow according to embodiments of the present disclosure.

As shown in FIG. 6B, in 600B, a point on a ring 603 may represent a probability of 1, a point on a ring 604 may represent a probability of 0, and a point between the ring 603 and the ring 604 may represent a probability of (0, 1).

$O_2A_2$-direction may represent that the first color component x is at 0 degrees, $O_2B_2$-direction may represent that the first color component x is at 30 degrees, $O_2C_2$-direction may represent that the first color component x is at 60 degrees, $O_2D_2$-direction may represent that the first color component x is at 90 degrees, $O_2E_2$-direction may represent that the first color component x is at 120 degrees, and $O_2F_2$-direction may represent that the first color component x is at 150 degrees.

From $O_2A_2$ to $O_2B_2$, that is, when x belongs to [0, 30), the probability of the predetermined color being red is [1, 0), the probability of the predetermined color being yellow is [1, 0), the probability of the predetermined color being white is [0, 1), and the probability of the predetermined color being black is 0.

From $O_2B_2$ to $O_2C_2$, that is, when x belongs to [30, 60), the probability of the predetermined color being red is 0, the probability of the predetermined color being yellow is 0, the probability of the predetermined color being white is 0, and the probability of the predetermined color being black is [0, 1).

From $O_2C_2$ to $O_2D_2$, that is, when x belongs to [60, 90), the probability of the predetermined color being red is 0, the probability of the predetermined color being yellow is 0, the probability of the predetermined color being white is [0, 1), and the probability of the predetermined color being black is [1, 0).

From $O_2D_2$ to $O_2E_2$, that is, when x belongs to [90, 120), the probability of the predetermined color being red is 0, the probability of the predetermined color being yellow is 0, the probability of the predetermined color being white is [1, 0), and the probability of the predetermined color being black is [0, 1).

From $O_2E_2$ to $O_2F_2$, that is, when x belongs to [120, 150), the probability of the predetermined color being red is 0, the probability of the predetermined color being yellow is 0, the probability of the predetermined color being white is [0, 1), and the probability of the predetermined color being black is [1, 0).

From $O_2F_2$ to $O_2A_2$, that is, when x belongs to [150, 180), the probability of the predetermined color being red is [0, 1), the probability of the predetermined color being yellow is 0, the probability of the predetermined color being white is [1, 0), and the probability of the predetermined color being black is 0.

According to embodiments of the present disclosure, the periodic functions corresponding to the predetermined color mode include a $37^{th}$ periodic function corresponding to black, a $38^{th}$ periodic function corresponding to black, a $39^{th}$ periodic function corresponding to white, a $40^{th}$ periodic function corresponding to red, a $41^{st}$ periodic function corresponding to red, a $42^{nd}$ periodic function corresponding to green, and a $43^{rd}$ periodic function corresponding to green.

According to embodiments of the present disclosure, determining the target periodic functions corresponding to the plurality of predetermined colors from the one or more periodic functions corresponding to the plurality of predetermined colors according to the value range may include the following operations.

When it is determined that the value range is a twentieth predetermined range, the $37^{th}$ periodic function corresponding to black is determined as the target periodic function corresponding to black from the $37^{th}$ periodic function corresponding to black and the $38^{th}$ periodic function corresponding to black, the $39^{th}$ periodic function corresponding to white is determined as the target periodic function corresponding to white from the $39^{th}$ periodic function corresponding to white, the $40^{th}$ periodic function corresponding to red is determined as the target periodic function corresponding to red from the $40^{th}$ periodic function corresponding to red and the $41^{st}$ periodic function corresponding to red, and the $42^{nd}$ periodic function corresponding to green is determined as the target periodic function corresponding to green from the $42^{nd}$ periodic function corresponding to green and the $43^{rd}$ periodic function corresponding to green.

When it is determined that the value range is a twenty-first predetermined range, the $37^{th}$ periodic function corresponding to black is determined as the target periodic function corresponding to black from the $37^{th}$ periodic function corresponding to black and the $38^{th}$ periodic function corresponding to black, the $39^{th}$ periodic function corresponding to white is determined as the target periodic function corresponding to white from the $39^{th}$ periodic function corresponding to white, the $41^{st}$ periodic function corresponding to red is determined as the target periodic function corresponding to red from the $40^{th}$ periodic function corresponding to red and the $41^{st}$ periodic function corresponding to red, and the $43^{rd}$ periodic function corresponding to green is determined as the target periodic function corresponding to green from the $42^{nd}$ periodic function corresponding to green and the $43^{rd}$ periodic function corresponding to green.

When it is determined that the value range is a twenty-second predetermined range, the $38^{th}$ periodic function corresponding to black is determined as the target periodic function corresponding to black from the $37^{th}$ periodic function corresponding to black and the $38^{th}$ periodic function corresponding to black, the $39^{th}$ periodic function corresponding to white is determined as the target periodic function corresponding to white from the $39^{th}$ periodic function corresponding to white, the $41^{st}$ periodic function corresponding to red is determined as the target periodic function corresponding to red from the $40^{th}$ periodic function corresponding to red and the $41^{st}$ periodic function corresponding to red, and the $42^{nd}$ periodic function corresponding to green is determined as the target periodic function corresponding to green from the $42^{nd}$ periodic function corresponding to green and the $43^{rd}$ periodic function corresponding to green.

When it is determined that the value range is a twenty-third predetermined range, the $37^{th}$ periodic function corresponding to black is determined as the target periodic function corresponding to black from the $37^{th}$ periodic function corresponding to black and the $38^{th}$ periodic function corresponding to black, the $39^{th}$ periodic function corresponding to white is determined as the target periodic function corresponding to white from the $39^{th}$ periodic function corresponding to white, the $40^{th}$ periodic function corresponding to red is determined as the target periodic function corresponding to red from the $40^{th}$ periodic function corresponding to red and the $41^{st}$ periodic function corresponding to red, and the $42^{nd}$ periodic function corresponding to green is determined as the target periodic function corresponding to green from the $42^{nd}$ periodic function corresponding to green and the $43^{rd}$ periodic function corresponding to green.

According to embodiments of the present disclosure, the twentieth predetermined range, the twenty-first predetermined range, the twenty-second predetermined range and the twenty-third predetermined range may be determined according to actual service needs and are not limited here. For example, the twentieth predetermined range, the twenty-first predetermined range, the twenty-second predetermined range and the twenty-third predetermined range may cooperate with each other to be greater than or equal to 0 and less than or equal to 180. The twentieth predetermined range may be greater than or equal to 0 and less than 30. The twenty-first predetermined range may be greater than or equal to 30 and less than 90. The twenty-second predetermined range may be greater than or equal to 90 and less than 150. The twenty-third predetermined range may be greater than or equal to 150 and less than 180.

According to embodiments of the present disclosure, when it is determined that the value range is the twentieth predetermined range, the $37^{th}$ periodic function may be determined as the target periodic function corresponding to black, the $39^{th}$ periodic function may be determined as the target periodic function corresponding to white, the $40^{th}$ periodic function may be determined as the target periodic function corresponding to red from the $40^{th}$ periodic function corresponding to red and the $41^{st}$ periodic function corresponding to red, and the $42^{nd}$ periodic function may be determined as the target periodic function corresponding to green from the $42^{nd}$ periodic function corresponding to green and the $43^{rd}$ periodic function corresponding to green.

When it is determined that the value range is the twenty-first predetermined range, the $37^{th}$ periodic function corresponding to black is determined as the target periodic function corresponding to black from the $37^{th}$ periodic function corresponding to black and the $38^{th}$ periodic function corresponding to black, the $39^{th}$ periodic function corresponding to white is determined as the target periodic function corresponding to white from the $39^{th}$ periodic function corresponding to white, the $41^{st}$ periodic function corresponding to red is determined as the target periodic function corresponding to red from the $40^{th}$ periodic function corresponding to red and the $41^{st}$ periodic function corresponding to red, and the $43^{rd}$ periodic function corresponding to green is determined as the target periodic function corresponding to green from the $42^{nd}$ periodic function corresponding to green and the $43^{rd}$ periodic function corresponding to green.

When it is determined that the value range is the twenty-second predetermined range, the $38^{th}$ periodic function corresponding to black is determined as the target periodic function corresponding to black from the $37^{th}$ periodic function corresponding to black and the $38^{th}$ periodic function corresponding to black, the $39^{th}$ periodic function corresponding to white is determined as the target periodic function corresponding to white from the $39^{th}$ periodic function corresponding to white, the $41^{st}$ periodic function corresponding to red is determined as the target periodic function corresponding to red from the $40^{th}$ periodic function corresponding to red and the $41^{st}$ periodic function corresponding to red, and the $42^{nd}$ periodic function corresponding to green is determined as the target periodic function corresponding to green from the $42^{nd}$ periodic function corresponding to green and the $43^{rd}$ periodic function corresponding to green.

When it is determined that the value range is the twenty-third predetermined range, the $37^{th}$ periodic function corresponding to black is determined as the target periodic function corresponding to black from the $37^{th}$ periodic function corresponding to black and the $38^{th}$ periodic function corresponding to black, the $39^{th}$ periodic function corresponding to white is determined as the target periodic function corresponding to white from the $39^{th}$ periodic function corresponding to white, the $40^{th}$ periodic function corresponding to red is determined as the target periodic function corresponding to red from the $40^{th}$ periodic function corresponding to red and the $41^{st}$ periodic function corresponding to red, and the $42^{nd}$ periodic function corresponding to green is determined as the target periodic function corresponding to green from the $42^{nd}$ periodic function corresponding to green and the $43^{rd}$ periodic function corresponding to green.

According to embodiments of the present disclosure, the plurality of predetermined colors include black, white, red and green.

According to embodiments of the present disclosure, when the plurality of predetermined colors include black, white, red and green, the periodic functions corresponding to the predetermined color mode may be determined according to Equations (64) to (79) below.

According to embodiments of the present disclosure, when $0 \leq x < 30$, the periodic functions corresponding to the predetermined color mode may be determined according to Equations (64) to (67) below.

$$P_{red2} = \frac{\cos\left[\left(\frac{x}{30}\right) * \pi\right] + B}{A} \tag{64}$$

$$P_{green1} = 0 \tag{65}$$

$$P_{white6} = \frac{\cos\left[\left(\frac{x-30}{30}\right) * \pi\right] + B}{A} \tag{66}$$

$$P_{black6} = 0 \tag{67}$$

According to embodiments of the present disclosure, when $30 \leq x < 90$, the periodic functions corresponding to the predetermined color mode may be determined according to Equations (68) to (71) below.

$$P_{red2} = 0 \tag{68}$$

$$P_{green1} = \frac{\cos\left[\left(\frac{x}{30}\right) * \pi\right] + B}{A} \tag{69}$$

$$P_{white6} = \frac{\cos\left[\left(\frac{x-30}{30}\right) * \pi\right] + B}{A} \tag{70}$$

$$P_{black6} = 0 \tag{71}$$

According to embodiments of the present disclosure, when $90 \leq x < 150$, the periodic functions corresponding to the predetermined color mode may be determined according to Equations (72) to (75) below.

$$P_{red2} = 0 \tag{72}$$

$$P_{green1} = 0 \tag{73}$$

$$P_{white6} = \frac{\cos\left[\left(\frac{x-30}{30}\right) * \pi\right] + B}{A} \tag{74}$$

$$P_{black6} = \frac{\cos\left[\left(\frac{x}{30}\right) * \pi\right] + B}{A} \tag{75}$$

According to embodiments of the present disclosure, when $150-x < 180$, the periodic functions corresponding to the predetermined color mode may be determined according to Equations (76) to (79) below.

$$p_{red2} = \frac{\cos\left[\left(\frac{x}{30}\right)*\pi\right] + B}{A} \tag{76}$$

$$p_{green1} = 0 \tag{77}$$

$$p_{white6} = \frac{\cos\left[\left(\frac{x-30}{30}\right)*\pi\right] + B}{A} \tag{78}$$

$$p_{black6} = 0 \tag{79}$$

According to embodiments of the present disclosure, x may represent a first color component, $p_{red2}$ may represent a second probability corresponding to red, $p_{green1}$ may represent a second probability corresponding to green, $p_{white6}$ may represent a second probability corresponding to white, $p_{black6}$ may represent a second probability corresponding to black, A may represent a first predetermined value, and B may represent a second predetermined value. A and B may cooperate with each other so that the second probability is greater than or equal to 0 and less than or equal to 1.

According to embodiments of the present disclosure, when x belongs to [0, 30), the probability of the predetermined color being black is 0, the probability of the predetermined color being white is [0, 1), the probability of the predetermined color being red is [1, 0), and the probability of the predetermined color being green is 0.

According to embodiments of the present disclosure, when x belongs to [30, 60), the probability of the predetermined color being black is 0, the probability of the predetermined color being white is [1, 0), the probability of the predetermined color being red is 0, and the probability of the predetermined color being green is [0, 1). When x belongs to [60, 90), the probability of the predetermined color being black is 0, the probability of the predetermined color being white is [0, 1), the probability of the predetermined color being red is 0, and the probability of the predetermined color being green is [1, 0).

According to embodiments of the present disclosure, when x belongs to [90, 120), the probability of the predetermined color being black is [0, 1), the probability of the predetermined color being white is [1, 0), the probability of the predetermined color being red is 0, and the probability of the predetermined color being green is 0. When x belongs to [120, 150), the probability of the predetermined color being black is [1, 0), the probability of the predetermined color being white is [0, 1), the probability of the predetermined color being red is 0, and the probability of the predetermined color being green is 0.

According to embodiments of the present disclosure, when x belongs to [150, 180), the probability of the predetermined color being black is 0, the probability of the predetermined color being white is [1, 0), the probability of the predetermined color being red is [0, 1), and the probability of the predetermined color being green is 0.

According to embodiments of the present disclosure, the twentieth predetermined range is $0 \le x < 30$, the twenty-first predetermined range is $30 \le x < 90$, the twenty-second predetermined range is $90 \le x < 150$, and the twenty-third predetermined range is $150 \le x < 180$. Equations (67), (71) and (79) represent the $37^{th}$ periodic function. Equation (75) represents the $38^{th}$ periodic function. Equations (66), (70), (74) and (78) represent the $39^{th}$ periodic function. Equations (64) and (76) represent the $40^{th}$ periodic function. Equations (68) and (72) represent the $41^{st}$ periodic function. Equations (65),

(73) and (77) represent the $42^{nd}$ periodic function. Equation (69) represents the $43^{rd}$ periodic function.

According to embodiments of the present disclosure, the periodic functions corresponding to the predetermined color mode may include a $44^{th}$ periodic function corresponding to black, a $45^{th}$ periodic function corresponding to black, a $46^{th}$ periodic function corresponding to white, a $47^{th}$ periodic function corresponding to red, a $48^{th}$ periodic function corresponding to red, a $49^{th}$ periodic function corresponding to blue, and a $50^{th}$ periodic function corresponding to blue.

According to embodiments of the present disclosure, determining the target periodic functions corresponding to the plurality of predetermined colors from the one or more periodic functions corresponding to the plurality of predetermined colors according to the value range may include the following operations.

When it is determined that the value range is a twenty-fourth predetermined range, the $44^{th}$ periodic function corresponding to black is determined as the target periodic function corresponding to black from the $44^{th}$ periodic function corresponding to black and the $45^{th}$ periodic function corresponding to black, the $46^{th}$ periodic function corresponding to white is determined as the target periodic function corresponding to white from the $46^{th}$ periodic function corresponding to white, the $47^{th}$ periodic function corresponding to red is determined as the target periodic function corresponding to red from the $47^{th}$ periodic function corresponding to red and the $48^{th}$ periodic function corresponding to red, and the $49^{th}$ periodic function corresponding to blue is determined as the target periodic function corresponding to blue from the $49^{th}$ periodic function corresponding to blue and the $50^{th}$ periodic function corresponding to blue.

When it is determined that the value range is a twenty-fifth predetermined range, the $45^{th}$ periodic function corresponding to black is determined as the target periodic function corresponding to black from the $44^{th}$ periodic function corresponding to black and the $45^{th}$ periodic function corresponding to black, the $46^{th}$ periodic function corresponding to white is determined as the target periodic function corresponding to white from the $46^{th}$ periodic function corresponding to white, the $48^{th}$ periodic function corresponding to red is determined as the target periodic function corresponding to red from the $47^{th}$ periodic function corresponding to red and the $48^{th}$ periodic function corresponding to red, and the $49^{th}$ periodic function corresponding to blue is determined as the target periodic function corresponding to blue from the $49^{th}$ periodic function corresponding to blue and the $50^{th}$ periodic function corresponding to blue.

When it is determined that the value range is a twenty-sixth predetermined range, the $44^{th}$ periodic function corresponding to black is determined as the target periodic function corresponding to black from the $44^{th}$ periodic function corresponding to black and the $45^{th}$ periodic function corresponding to black, the $46^{th}$ periodic function corresponding to white is determined as the target periodic function corresponding to white from the $46^{th}$ periodic function corresponding to white, the $48^{th}$ periodic function corresponding to red is determined as the target periodic function corresponding to red from the $47^{th}$ periodic function corresponding to red and the $48^{th}$ periodic function corresponding to red, and the $50^{th}$ periodic function corresponding to blue is determined as the target periodic function corresponding to blue from the $49^{th}$ periodic function corresponding to blue and the $50^{th}$ periodic function corresponding to blue.

When it is determined that the value range is a twenty-seventh predetermined range, the $44^{th}$ periodic function corresponding to black is determined as the target periodic function corresponding to black from the $44^{th}$ periodic function corresponding to black and the $45^{th}$ periodic function corresponding to black, the $46^{th}$ periodic function corresponding to white is determined as the target periodic function corresponding to white from the $46^{th}$ periodic function corresponding to white, the $47^{th}$ periodic function corresponding to red is determined as the target periodic function corresponding to red from the $47^{th}$ periodic function corresponding to red and the $48^{th}$ periodic function corresponding to red, and the $49^{th}$ periodic function corresponding to blue is determined as the target periodic function corresponding to blue from the $49^{th}$ periodic function corresponding to blue and the $50^{th}$ periodic function corresponding to blue.

According to embodiments of the present disclosure, the twenty-fourth predetermined range, the twenty-fifth predetermined range, the twenty-sixth predetermined range and the twenty-seventh predetermined range may be set according to actual service needs and are not limited here. For example, the twenty-fourth predetermined range, the twenty-fifth predetermined range, the twenty-sixth predetermined range and the twenty-seventh predetermined range may cooperate with each other to be greater than or equal to 0 and less than or equal to 180. The twenty-fourth predetermined range may be greater than or equal to 0 and less than 30. The twenty-fifth predetermined range may be greater than or equal to 30 and less than 90. The twenty-sixth predetermined range may be greater than or equal to 90 and less than 150. The twenty-seventh predetermined range may be greater than or equal to 150 and less than 180.

According to embodiments of the present disclosure, when it is determined that the value range is the twenty-fourth predetermined range, the $44^{th}$ periodic function may be determined as the target periodic function corresponding to black, the $46^{th}$ periodic function may be determined as the target periodic function corresponding to white, the $47^{th}$ periodic function may be determined as the target periodic function corresponding to red, and the $49^{th}$ periodic function may be determined as the target periodic function corresponding to blue.

According to embodiments of the present disclosure, when it is determined that the value range is the twenty-fifth predetermined range, the $45^{th}$ periodic function may be determined as the target periodic function corresponding to black, the $46^{th}$ periodic function may be determined as the target periodic function corresponding to white, the $48^{th}$ periodic function may be determined as the target periodic function corresponding to red, and the $49^{th}$ periodic function may be determined as the target periodic function corresponding to blue.

According to embodiments of the present disclosure, when it is determined that the value range is the twenty-sixth predetermined range, the $44^{th}$ periodic function may be determined as the target periodic function corresponding to black, the $46^{th}$ periodic function may be determined as the target periodic function corresponding to white, the $48^{th}$ periodic function may be determined as the target periodic function corresponding to red, and the $50^{th}$ periodic function may be determined as the target periodic function corresponding to blue.

According to embodiments of the present disclosure, when it is determined that the value range is the twenty-seventh predetermined range, the $44^{th}$ periodic function may be determined as the target periodic function corresponding to black, the $46^{th}$ periodic function may be determined as the target periodic function corresponding to white, the $47^{th}$ periodic function may be determined as the target periodic function corresponding to red, and the $49^{th}$ periodic function may be determined as the target periodic function corresponding to blue.

According to embodiments of the present disclosure, the plurality of predetermined colors include black, white, red and blue.

According to embodiments of the present disclosure, when the plurality of predetermined colors include black, white, red and blue, the periodic functions corresponding to the predetermined color mode may be determined according to Equations (80) to (95) below.

According to embodiments of the present disclosure, when $0 \leq x < 30$, the periodic functions corresponding to the predetermined color mode may be determined according to Equations (80) to (83) below.

$$p_{red3} = \frac{\cos\left[\left(\frac{x}{30}\right)*\pi\right] + B}{A} \tag{80}$$

$$p_{blue1} = 0 \tag{81}$$

$$p_{white7} = \frac{\cos\left[\left(\frac{x-30}{30}\right)*\pi\right] + B}{A} \tag{82}$$

$$p_{black7} = 0 \tag{83}$$

According to embodiments of the present disclosure, when $30 \leq x < 90$, the periodic functions corresponding to the predetermined color mode may be determined according to Equations (84) to (87) below.

$$p_{red3} = 0 \tag{84}$$

$$p_{blue1} = 0 \tag{85}$$

$$p_{white7} = \frac{\cos\left[\left(\frac{x-30}{30}\right)*\pi\right] + B}{A} \tag{86}$$

$$p_{black7} = \frac{\cos\left[\left(\frac{x}{30}\right)*\pi\right] + B}{A} \tag{87}$$

According to embodiments of the present disclosure, when $90 \leq x < 150$, the periodic functions corresponding to the predetermined color mode may be determined according to Equations (88) to (91) below.

$$p_{red3} = 0 \tag{88}$$

$$p_{blue1} = \frac{\cos\left[\left(\frac{x}{30}\right)*\pi\right] + B}{A} \tag{89}$$

$$p_{white7} = \frac{\cos\left[\left(\frac{x-30}{30}\right)*\pi\right] + B}{A} \tag{90}$$

$$p_{black7} = 0 \tag{91}$$

According to embodiments of the present disclosure, when $150 \leq x < 180$, the periodic functions corresponding to the predetermined color mode may be determined according to Equations (92) to (95) below.

$$p_{red3} = \frac{\cos\left[\left(\frac{x}{30}\right) * \pi\right] + B}{A} \tag{92}$$

$$p_{blue1} = 0 \tag{93}$$

$$p_{white7} = \frac{\cos\left[\left(\frac{x - 30}{30}\right) * \pi\right] + B}{A} \tag{94}$$

$$p_{black7} = 0 \tag{95}$$

According to embodiments of the present disclosure, x may represent a first color component, $p_{red3}$ may represent a second probability corresponding to red, $p_{blue1}$ may represent a second probability corresponding to blue, $p_{white7}$ may represent a second probability corresponding to white, $p_{black7}$ may represent a second probability corresponding to black, A may represent a first predetermined value, and B may represent a second predetermined value. A and B may cooperate with each other so that the second probability is greater than or equal to 0 and less than or equal to 1.

According to embodiments of the present disclosure, when x belongs to [0, 30), the probability of the predetermined color being black is 0, the probability of the predetermined color being white is [0, 1), the probability of the predetermined color being red is [1, 0), and the probability of the predetermined color being blue is 0.

According to embodiments of the present disclosure, when x belongs to [30, 60), the probability of the predetermined color being black is [0, 1), the probability of the predetermined color being white is [1, 0), the probability of the predetermined color being red is 0, and the probability of the predetermined color being blue is 0. When x belongs to [60, 90), the probability of the predetermined color being black is [1, 0), the probability of the predetermined color being white is [0, 1), the probability of the predetermined color being red is 0, and the probability of the predetermined color being blue is 0.

According to embodiments of the present disclosure, when x belongs to [90, 120), the probability of the predetermined color being black is 0, the probability of the predetermined color being white is [1, 0), the probability of the predetermined color being red is 0, and the probability of the predetermined color being blue is [0, 1). When x belongs to [120, 150), the probability of the predetermined color being black is 0, the probability of the predetermined color being white is [0, 1), the probability of the predetermined color being red is 0, and the probability of the predetermined color being blue is [1, 0).

According to embodiments of the present disclosure, when x belongs to [150, 180), the probability of the predetermined color being black is 0, the probability of the predetermined color being white is [1, 0), the probability of the predetermined color being red is [0, 1), and the probability of the predetermined color being blue is 0.

According to embodiments of the present disclosure, the twenty-fourth predetermined range is 0≤x<30, the twenty-fifth predetermined range is 30≤x<90, the twenty-sixth predetermined range is 90≤x<150, and the twenty-seventh predetermined range is 150≤x<180. Equations (83), (91) and (95) represent the $44^{th}$ periodic function. Equation (87) represents the $45^{th}$ periodic function. Equations (82), (86), (90) and (94) represent the $46^{th}$ periodic function. Equations (80) and (92) represent the $47^{th}$ periodic function. Equations (84) and (88) represent the $48^{th}$ periodic function. Equations (81), (85) and (93) represent the $49^{th}$ periodic function. Equation (89) represents the $50^{th}$ periodic function.

According to embodiments of the present disclosure, the periodic functions corresponding to the predetermined color mode may include a $51^{st}$ periodic function corresponding to black, a $52^{nd}$ periodic function corresponding to black, a $53^{rd}$ periodic function corresponding to black, a $54^{th}$ periodic function corresponding to white, a $55^{th}$ periodic function corresponding to white, a $56^{th}$ periodic function corresponding to yellow, a $57^{th}$ periodic function corresponding to yellow, a $58^{th}$ periodic function corresponding to yellow, a $59^{th}$ periodic function corresponding to yellow, a $60^{th}$ periodic function corresponding to green, and a $61^{st}$ periodic function corresponding to green.

According to embodiments of the present disclosure, determining the target periodic functions corresponding to the plurality of predetermined colors from the one or more periodic functions corresponding to the plurality of predetermined colors according to the value range may include the following operations.

When it is determined that the value range is a twenty-eighth predetermined range, the $51^{st}$ periodic function corresponding to black is determined as the target periodic function corresponding to black from the $51^{st}$ periodic function corresponding to black, the $52^{nd}$ periodic function corresponding to black and the $53^{rd}$ periodic function corresponding to black, the $54^{th}$ periodic function corresponding to white is determined as the target periodic function corresponding to white from the $54^{th}$ periodic function corresponding to white and the $55^{th}$ periodic function corresponding to white, the $56^{th}$ periodic function corresponding to yellow is determined as the target periodic function corresponding to yellow from the $56^{th}$ periodic function corresponding to yellow, the $57^{th}$ periodic function corresponding to yellow, the $58^{th}$ periodic function corresponding to yellow and the $59^{th}$ periodic function corresponding to yellow, and the $60^{th}$ periodic function corresponding to green is determined as the target periodic function corresponding to green from the $60^{th}$ periodic function corresponding to green and the $61^{st}$ periodic function corresponding to green.

When it is determined that the value range is a twenty-ninth predetermined range, the $52^{nd}$ periodic function corresponding to black is determined as the target periodic function corresponding to black from the $51^{st}$ periodic function corresponding to black, the $52^{nd}$ periodic function corresponding to black and the $53^{rd}$ periodic function corresponding to black, the $54^{th}$ periodic function corresponding to white is determined as the target periodic function corresponding to white from the $54^{th}$ periodic function corresponding to white and the $55^{th}$ periodic function corresponding to white, the $57^{th}$ periodic function corresponding to yellow is determined as the target periodic function corresponding to yellow from the $56^{th}$ periodic function corresponding to yellow, the $57^{th}$ periodic function corresponding to yellow, the $58^{th}$ periodic function corresponding to yellow and the $59^{th}$ periodic function corresponding to yellow, and the $61^{st}$ periodic function corresponding to green is determined as the target periodic function corresponding to green from the $60^{th}$ periodic function corresponding to green and the $61^{st}$ periodic function corresponding to green.

When it is determined that the value range is a thirtieth predetermined range, the $53^{rd}$ periodic function corresponding to black is determined as the target periodic function corresponding to black from the $51^{st}$ periodic function corresponding to black, the $52^{nd}$ periodic function corresponding to black and the $53^{rd}$ periodic function corresponding to black, the $55^{th}$ periodic function corresponding to white is determined as the target periodic function corresponding to white from the $54^{th}$ periodic function corresponding to white and the $55^{th}$ periodic function corresponding to white, the $58^{th}$ periodic function corresponding to yellow is determined as the target periodic function corresponding to yellow from the $56^{th}$ periodic function corresponding to yellow, the $57^{th}$ periodic function corresponding to yellow, the $58^{th}$ periodic function corresponding to yellow and the $59^{th}$ periodic function corresponding to yellow, and the $60^{th}$ periodic function corresponding to green is determined as the target periodic function corresponding to green from the $60^{th}$ periodic function corresponding to green and the $61^{st}$ periodic function corresponding to green.

When it is determined that the value range is a thirty-first predetermined range, the $51^{st}$ periodic function corresponding to black is determined as the target periodic function corresponding to black from the $51^{st}$ periodic function corresponding to black, the $52^{nd}$ periodic function corresponding to black and the $53^{rd}$ periodic function corresponding to black, the $55^{th}$ periodic function corresponding to white is determined as the target periodic function corresponding to white from the $54^{th}$ periodic function corresponding to white and the $55^{th}$ periodic function corresponding to white, the $59^{th}$ periodic function corresponding to yellow is determined as the target periodic function corresponding to yellow from the $56^{th}$ periodic function corresponding to yellow, the $57^{th}$ periodic function corresponding to yellow, the $58^{th}$ periodic function corresponding to yellow and the $59^{th}$ periodic function corresponding to yellow, and the $60^{th}$ periodic function corresponding to green is determined as the target periodic function corresponding to green from the $60^{th}$ periodic function corresponding to green and the $61^{st}$ periodic function corresponding to green.

According to embodiments of the present disclosure, the twenty-eighth predetermined range, the twenty-ninth predetermined range, the thirtieth predetermined range and the thirty-first predetermined range may be set according to actual service needs and are not limited here. For example, the twenty-eighth predetermined range, the twenty-ninth predetermined range, the thirtieth predetermined range and the thirty-first predetermined range may cooperate with each other to be greater than or equal to 0 and less than or equal to 180. The twenty-eighth predetermined range may be greater than or equal to 0 and less than 30. The twenty-ninth predetermined range may be greater than or equal to 30 and less than 90. The thirtieth predetermined range may be greater than or equal to 90 and less than 150. The thirty-first predetermined range may be greater than or equal to 150 and less than 180.

According to embodiments of the present disclosure, when it is determined that the value range is the twenty-eighth predetermined range, the $51^{st}$ periodic function may be determined as the target periodic function corresponding to black, the $54^{th}$ periodic function may be determined as the target periodic function corresponding to white, the $56^{th}$ periodic function may be determined as the target periodic function corresponding to yellow, and the $60^{th}$ periodic function may be determined as the target periodic function corresponding to green.

According to embodiments of the present disclosure, when it is determined that the value range is the twenty-ninth predetermined range, the $52^{nd}$ periodic function may be determined as the target periodic function corresponding to black, the $54^{th}$ periodic function may be determined as the target periodic function corresponding to white, the $57^{th}$ periodic function may be determined as the target periodic function corresponding to yellow, and the $61^{st}$ periodic function may be determined as the target periodic function corresponding to green.

According to embodiments of the present disclosure, when it is determined that the value range is the thirtieth predetermined range, the $53^{rd}$ periodic function may be determined as the target periodic function corresponding to black, the $55^{th}$ periodic function may be determined as the target periodic function corresponding to white, the $58^{th}$ periodic function may be determined as the target periodic function corresponding to yellow, and the $60^{th}$ periodic function may be determined as the target periodic function corresponding to green.

According to embodiments of the present disclosure, when it is determined that the value range is the thirty-first predetermined range, the $51^{st}$ periodic function may be determined as the target periodic function corresponding to black, the $55^{th}$ periodic function may be determined as the target periodic function corresponding to white, the $59^{th}$ periodic function may be determined as the target periodic function corresponding to yellow, and the $60^{th}$ periodic function may be determined as the target periodic function corresponding to green.

According to embodiments of the present disclosure, the plurality of predetermined colors include black, white, yellow and green.

According to embodiments of the present disclosure, when the plurality of predetermined colors include black, white, yellow and green, the periodic functions corresponding to the predetermined color mode may be determined according to Equations (96) to (111) below.

According to embodiments of the present disclosure, when $0 \leq x < 30$, the periodic functions corresponding to the predetermined color mode may be determined according to Equations (96) to (99) below.

$$p_{yellow2} = 0.5 * \frac{\cos\left[\left(\frac{x}{30}\right) * \pi\right] + B}{A} + \frac{\cos\left[\left(\frac{x-30}{30}\right) * \pi\right] + B}{A} \tag{96}$$

$$p_{green2} = 0 \tag{97}$$

$$p_{white8} = 0 \tag{98}$$

$$p_{black8} = 0.5 * \frac{\cos\left[\left(\frac{x}{30}\right) * \pi\right] + B}{A} \tag{99}$$

According to embodiments of the present disclosure, when $30 \leq x < 90$, the periodic functions corresponding to the predetermined color mode may be determined according to Equations (100) to (103) below.

$$p_{yellow2} = \frac{\cos\left[\left(\frac{x-30}{30}\right) * \pi\right] + B}{A} \tag{100}$$

$$p_{green2} = \frac{\cos\left[\left(\frac{x}{30}\right) * \pi\right] + B}{A} \tag{101}$$

$$p_{white8} = 0 \tag{102}$$

$$p_{black8} = 0 \tag{103}$$

According to embodiments of the present disclosure, when $90 \leq x < 150$, the periodic functions corresponding to the predetermined color mode may be determined according to Equations (104) to (107) below.

$$p_{yellow2} = 0 \tag{104}$$

$$p_{green2} = 0 \tag{105}$$

$$p_{white8} = \frac{\cos\left[\left(\frac{x-30}{30}\right)*\pi\right] + B}{A} \tag{106}$$

$$p_{black8} = \frac{\cos\left[\left(\frac{x}{30}\right)*\pi\right] + B}{A} \tag{107}$$

According to embodiments of the present disclosure, when 150≤x<180, the periodic functions corresponding to the predetermined color mode may be determined according to Equations (108) to (111) below.

$$p_{yellow2} = 0.5 * \frac{\cos\left[\left(\frac{x}{30}\right)*\pi\right] + B}{A} \tag{108}$$

$$p_{green2} = 0 \tag{109}$$

$$p_{white2} = \frac{\cos\left[\left(\frac{x-30}{30}\right)*\pi\right] + B}{A} \tag{110}$$

$$p_{black8} = 0.5 * \frac{\cos\left[\left(\frac{x}{30}\right)*\pi\right] + A}{B} \tag{111}$$

According to embodiments of the present disclosure, x may represent a first color component, $p_{yellow2}$ may represent a second probability corresponding to yellow, $p_{green2}$ may represent a second probability corresponding to green, $p_{white8}$ may represent a second probability corresponding to white, $p_{black8}$ may represent a second probability corresponding to black, A may represent a first predetermined value, and B may represent a second predetermined value. A and B may cooperate with each other so that the second probability is greater than or equal to 0 and less than or equal to 1.

According to embodiments of the present disclosure, when x belongs to [0, 30), the probability of the predetermined color being black is [0.5, 0), the probability of the predetermined color being white is 0, the probability of the predetermined color being yellow is [0.5, 1), and the probability of the predetermined color being green is 0.

According to embodiments of the present disclosure, when x belongs to [30, 60), the probability of the predetermined color being black is 0, the probability of the predetermined color being white is 0, the probability of the predetermined color being yellow is [1, 0), and the probability of the predetermined color being green is [0, 1). When x belongs to [60, 90), the probability of the predetermined color being black is 0, the probability of the predetermined color being white is 0, the probability of the predetermined color being yellow is [0, 1), and the probability of the predetermined color being green is [1, 0).

According to embodiments of the present disclosure, when x belongs to [90, 120), the probability of the predetermined color being black is [0, 1), the probability of the predetermined color being white is [1, 0), the probability of the predetermined color being yellow is 0, and the probability of the predetermined color being green is 0. When x belongs to [120, 150), the probability of the predetermined color being black is [1, 0), the probability of the predetermined color being white is [0, 1), the probability of the predetermined color being yellow is 0, and the probability of the predetermined color being green is 0.

According to embodiments of the present disclosure, when x belongs to [150, 180), the probability of the predetermined color being black is [0, 0.5), the probability of the predetermined color being white is [1, 0), the probability of the predetermined color being yellow is [0, 0.5), and the probability of the predetermined color being green is 0.

According to embodiments of the present disclosure, the twenty-eighth predetermined range is 0≤x<30, the twenty-ninth predetermined range is 30≤x<90, the thirtieth predetermined range is 90≤x<150, and the thirty-first predetermined range is 150≤x<180. Equations (99) and (111) represent the $51^{st}$ periodic function. Equation (103) represents the $52^{nd}$ periodic function. Equation (107) represents the $53^{rd}$ periodic function. Equations (98) and (102) represent the $54^{th}$ periodic function. Equations (106) and (110) represent the $55^{th}$ periodic function. Equation (96) represents the $56^{th}$ periodic function. Equation (100) represents the $57^{th}$ periodic function. Equation (104) represents the $58^{th}$ periodic function. Equation (108) represents the $59^{th}$ periodic function. Equations (97), (105) and (109) represent the $60^{th}$ periodic function. Equation (101) represents the $61^{st}$ periodic function.

According to embodiments of the present disclosure, the periodic functions corresponding to the predetermined color mode may include a $62^{nd}$ periodic function corresponding to black, a $63^{rd}$ periodic function corresponding to black, a $64^{th}$ periodic function corresponding to black, a $65^{th}$ periodic function corresponding to white, a $66^{th}$ periodic function corresponding to white, a $67^{th}$ periodic function corresponding to yellow, a $68^{th}$ periodic function corresponding to yellow, a $69^{th}$ periodic function corresponding to yellow, a $70^{th}$ periodic function corresponding to yellow, a $71^{st}$ periodic function corresponding to blue, a $72^{nd}$ periodic function corresponding to blue.

According to embodiments of the present disclosure, determining the target periodic functions corresponding to the plurality of predetermined colors from the one or more periodic functions corresponding to the plurality of predetermined colors according to the value range may include the following operations.

When it is determined that the value range is a thirty-second predetermined range, the $62^{nd}$ periodic function corresponding to black is determined as the target periodic function corresponding to black from the $62^{nd}$ periodic function corresponding to black, the $63^{rd}$ periodic function corresponding to black and the $64^{th}$ periodic function corresponding to black, the $65^{th}$ periodic function corresponding to white is determined as the target periodic function corresponding to white from the $65^{th}$ periodic function corresponding to white and the $66^{th}$ periodic function corresponding to white, the $67^{th}$ periodic function corresponding to yellow is determined as the target periodic function corresponding to yellow from the $67^{th}$ periodic function corresponding to yellow, the $68^{th}$ periodic function corresponding to yellow, the $69^{th}$ periodic function corresponding to yellow and the $70^{th}$ periodic function corresponding to yellow, and the $71^{st}$ periodic function corresponding to blue is determined as the target periodic function corresponding to blue from the $71^{st}$ periodic function corresponding to blue and the $72^{nd}$ periodic function corresponding to blue.

When it is determined that the value range is a thirty-third predetermined range, the $63^{rd}$ periodic function corresponding to black is determined as the target periodic function corresponding to black from the $62^{nd}$ periodic function corresponding to black, the $63^{rd}$ periodic function corresponding to black and the $64^{th}$ periodic function corresponding to black, the $65^{th}$ periodic function corresponding to white is determined as the target periodic function corresponding to white from the $65^{th}$ periodic function corresponding to white and the $66^{th}$ periodic function corresponding to white, the $68^{th}$ periodic function corresponding to yellow is determined as the target periodic function corresponding to yellow from the $67^{th}$ periodic function corresponding to yellow, the $68^{th}$ periodic function corresponding to yellow, the $69^{th}$ periodic function corresponding to yellow and the $70^{th}$ periodic function corresponding to yellow, and the $71^{st}$ periodic function corresponding to blue is determined as the target periodic function corresponding to blue from the $71^{st}$ periodic function corresponding to blue and the $72^{nd}$ periodic function corresponding to blue.

When it is determined that the value range is a thirty-fourth predetermined range, the $63^{rd}$ periodic function corresponding to black is determined as the target periodic function corresponding to black from the $62^{nd}$ periodic function corresponding to black, the $63^{rd}$ periodic function corresponding to black and the $64^{th}$ periodic function corresponding to black, the $66^{th}$ periodic function corresponding to white is determined as the target periodic function corresponding to white from the $65^{th}$ periodic function corresponding to white and the $66^{th}$ periodic function corresponding to white, the $69^{th}$ periodic function corresponding to yellow is determined as the target periodic function corresponding to yellow from the $67^{th}$ periodic function corresponding to yellow, the $68^{th}$ periodic function corresponding to yellow, the $69^{th}$ periodic function corresponding to yellow and the $70^{th}$ periodic function corresponding to yellow, and the $71^{st}$ periodic function corresponding to blue is determined as the target periodic function corresponding to blue from the $71^{st}$ periodic function corresponding to blue and the $72^{nd}$ periodic function corresponding to blue.

When it is determined that the value range is a thirty-fifth predetermined range, the $64^{th}$ periodic function corresponding to black is determined as the target periodic function corresponding to black from the $62^{nd}$ periodic function corresponding to black, the $63^{rd}$ periodic function corresponding to black and the $64^{th}$ periodic function corresponding to black, the $66^{th}$ periodic function corresponding to white is determined as the target periodic function corresponding to white from the $65^{th}$ periodic function corresponding to white and the $66^{th}$ periodic function corresponding to white, the $69^{th}$ periodic function corresponding to yellow is determined as the target periodic function corresponding to yellow from the $67^{th}$ periodic function corresponding to yellow, the $68^{th}$ periodic function corresponding to yellow, the $69^{th}$ periodic function corresponding to yellow and the $70^{th}$ periodic function corresponding to yellow, and the $72^{nd}$ periodic function corresponding to blue is determined as the target periodic function corresponding to blue from the $71^{st}$ periodic function corresponding to blue and the $72^{nd}$ periodic function corresponding to blue.

When it is determined that the value range is a thirty-sixth predetermined range, the $62^{nd}$ periodic function corresponding to black is determined as the target periodic function corresponding to black from the $62^{nd}$ periodic function corresponding to black, the $63^{rd}$ periodic function corresponding to black and the $64^{th}$ periodic function corresponding to black, the $66^{th}$ periodic function corresponding to white is determined as the target periodic function corresponding to white from the $65^{th}$ periodic function corresponding to white and the $66^{th}$ periodic function corresponding to white, the $70^{th}$ periodic function corresponding to yellow is determined as the target periodic function corresponding to yellow from the $67^{th}$ periodic function corresponding to yellow, the $68^{th}$ periodic function corresponding to yellow, the $69^{th}$ periodic function corresponding to yellow and the $70^{th}$ periodic function corresponding to yellow, and the $71^{st}$ periodic function corresponding to blue is determined as the target periodic function corresponding to blue from the $71^{st}$ periodic function corresponding to blue and the $72^{nd}$ periodic function corresponding to blue.

According to embodiments of the present disclosure, the thirty-second predetermined range, the thirty-third predetermined range, the thirty-fourth predetermined range, the thirty-fifth predetermined range and the thirty-sixth predetermined range may be set according to actual service needs and are not limited here. For example, the thirty-second predetermined range, the thirty-third predetermined range, the thirty-fourth predetermined range, the thirty-fifth predetermined range and the thirty-sixth predetermined range may cooperate with each other to be greater than or equal to 0 and less than or equal to 180. The thirty-second predetermined range may be greater than or equal to 0 and less than 30. The thirty-third predetermined range may be greater than or equal to 30 and less than 60. The thirty-fourth predetermined range may be greater than or equal to 60 and less than 90. The thirty-fifth predetermined range may be greater than or equal to 90 and less than 150. The thirty-sixth predetermined range may be greater than or equal to 150 and less than 180.

According to embodiments of the present disclosure, when it is determined that the value range is the thirty-second predetermined range, the $62^{nd}$ periodic function may be determined as the target periodic function corresponding to black, the $65^{th}$ periodic function may be determined as the target periodic function corresponding to white, the $67^{th}$ periodic function is determined as the target periodic function corresponding to yellow, and the $71^{st}$ periodic function may be determined as the target periodic function corresponding to blue.

According to embodiments of the present disclosure, when it is determined that the value range is the thirty-third predetermined range, the $63^{rd}$ periodic function may be determined as the target periodic function corresponding to black, the $65^{th}$ periodic function may be determined as the target periodic function corresponding to white, the 68 h periodic function is determined as the target periodic function corresponding to yellow, and the $71^{st}$ periodic function may be determined as the target periodic function corresponding to blue.

According to embodiments of the present disclosure, when it is determined that the value range is the thirty-fourth predetermined range, the $63^{rd}$ periodic function may be determined as the target periodic function corresponding to black, the $66^{th}$ periodic function may be determined as the target periodic function corresponding to white, the $69^{th}$ periodic function is determined as the target periodic function corresponding to yellow, and the $71^{st}$ periodic function may be determined as the target periodic function corresponding to blue.

According to embodiments of the present disclosure, when it is determined that the value range is the thirty-fifth predetermined range, the $64^{th}$ periodic function may be determined as the target periodic function corresponding to black, the $66^{th}$ periodic function may be determined as the target periodic function corresponding to white, the $69^{th}$ periodic function is determined as the target periodic function corresponding to yellow, and the $72^{nd}$ periodic function may be determined as the target periodic function corresponding to blue.

According to embodiments of the present disclosure, when it is determined that the value range is the thirty-sixth predetermined range, the $62^{nd}$ periodic function may be determined as the target periodic function corresponding to black, the $66^{th}$ periodic function may be determined as the target periodic function corresponding to white, the $70^{th}$ periodic function is determined as the target periodic function corresponding to yellow, and the $71^{st}$ periodic function may be determined as the target periodic function corresponding to blue.

According to embodiments of the present disclosure, the plurality of predetermined colors include black, white, yellow and blue.

According to embodiments of the present disclosure, when the plurality of predetermined colors include black, white, yellow and blue, the periodic functions corresponding to the predetermined color mode may be determined according to Equations (112) to (131) below.

According to embodiments of the present disclosure, when $0 \leq x < 30$, the periodic functions corresponding to the predetermined color mode may be determined according to Equations (112) to (115) below.

$$p_{yellow3} = 0.5 * \frac{\cos\left[\left(\frac{x}{30}\right)*\pi\right]+B}{A} + \frac{\cos\left[\left(\frac{x-30}{30}\right)*\pi\right]+B}{A} \quad (112)$$

$$p_{blue2} = 0 \quad (113)$$

$$p_{white9} = 0 \quad (114)$$

$$p_{black9} = 0.5 * \frac{\cos\left[\left(\frac{x}{30}\right)*\pi\right]+B}{A} \quad (115)$$

According to embodiments of the present disclosure, when $30 \leq x < 60$, the periodic functions corresponding to the predetermined color mode may be determined according to Equations (116) to (119).

$$p_{yellow3} = \frac{\cos\left[\left(\frac{x-30}{30}\right)*\pi\right]+B}{A} \quad (116)$$

$$p_{blue2} = 0 \quad (117)$$

$$p_{white9} = 0 \quad (118)$$

$$p_{black9} = \frac{\cos\left[\left(\frac{x}{30}\right)*\pi\right]+B}{A} \quad (119)$$

According to embodiments of the present disclosure, when $60 \leq x < 90$, the periodic functions corresponding to the predetermined color mode may be determined according to Equations (120) to (123) below.

$$p_{yellow3} = 0 \quad (120)$$

$$p_{blue2} = 0 \quad (121)$$

$$p_{white9} = \frac{\cos\left[\left(\frac{x-30}{30}\right)*\pi\right]+B}{A} \quad (122)$$

$$p_{black9} = \frac{\cos\left[\left(\frac{x}{30}\right)*\pi\right]+B}{A} \quad (123)$$

According to embodiments of the present disclosure, when $90 \leq x < 150$, the periodic functions corresponding to the predetermined color mode may be determined according to Equations (124) to (127) below.

$$p_{yellow3} = 0 \quad (124)$$

$$p_{blue2} = \frac{\cos\left[\left(\frac{x}{30}\right)*\pi\right]+1}{2} \quad (125)$$

$$p_{white9} = \frac{\cos\left[\left(\frac{x-30}{30}\right)*\pi\right]+B}{A} \quad (126)$$

$$p_{black9} = 0 \quad (127)$$

According to embodiments of the present disclosure, when $150 \leq x < 180$, the periodic functions corresponding to the predetermined color mode may be determined according to Equations (128) to (131) below.

$$p_{yellow3} = 0.5 * \frac{\cos\left[\left(\frac{x}{30}\right)*\pi\right]+B}{A} \quad (128)$$

$$p_{blue2} = 0 \quad (129)$$

$$p_{white9} = \frac{\cos\left[\left(\frac{x-30}{30}\right)*\pi\right]+B}{A} \quad (130)$$

$$p_{black9} = 0.5 * \frac{\cos\left[\left(\frac{x}{30}\right)*\pi\right]+B}{A} \quad (131)$$

According to embodiments of the present disclosure, x may represent a first color component, $p_{yellow3}$ may represent a second probability corresponding to yellow, $p_{blue2}$ may represent a second probability corresponding to blue, $p_{white9}$ may represent a second probability corresponding to white, $p_{black9}$ may represent a second probability corresponding to black, A may represent a first predetermined value, and B may represent a second predetermined value. A and B may cooperate with each other so that the second probability is greater than or equal to 0 and less than or equal to 1.

According to embodiments of the present disclosure, when x belongs to [0, 30), the probability of the predetermined color being black is [0.5, 0), the probability of the predetermined color being white is 0, the probability of the predetermined color being yellow is [0.5, 1), and the probability of the predetermined color being blue is 0.

According to embodiments of the present disclosure, when x belongs to [30, 60), the probability of the predetermined color being black is [0, 1), the probability of the predetermined color being white is 0, the probability of the predetermined color being yellow is [1, 0), and the probability of the predetermined color being blue is 0.

According to embodiments of the present disclosure, when x belongs to [60, 90), the probability of the predetermined color being black is [1, 0), the probability of the predetermined color being white is [0, 1), the probability of the predetermined color being yellow is 0, and the probability of the predetermined color being blue is 0.

According to embodiments of the present disclosure, when x belongs to [90, 120), the probability of the predetermined color being black is 0, the probability of the predetermined color being white is [1, 0), the probability of the predetermined color being yellow is 0, and the probability of the predetermined color being blue is [0, 1). When x belongs to [120, 150), the probability of the predetermined color being black is 0, the probability of the predetermined color being white is [0, 1), the probability of the predetermined color being yellow is 0, and the probability of the predetermined color being blue is [1, 0).

According to embodiments of the present disclosure, when x belongs to [150, 180), the probability of the predetermined color being black is [0, 0.5), the probability of the predetermined color being white is [1, 0), the probability of the predetermined color being yellow is [0, 0.5), and the probability of the predetermined color being blue is 0.

According to embodiments of the present disclosure, the thirty-second predetermined range is $0 \le x < 30$, the thirty-third predetermined range is $30 \le x < 60$, the thirty-fourth predetermined range is $60 \le x < 90$, the thirty-fifth predetermined range is $90 \le x < 150$, and the thirty-sixth predetermined range is $150 \le x < 180$. Equations (115) and (131) represent the $62^{nd}$ periodic function. Equations (119) and (123) represent the $63^{rd}$ periodic function. Equation (127) represents the $64^{th}$ periodic function. Equations (114) and (118) represent the $65^{th}$ periodic function. Equations (122) and (126) represent the $66^{th}$ periodic function. Equation (112) represents the $67^{th}$ periodic function. Equation (116) represents the $68^{th}$ periodic function. Equation (124) represents the $69^{th}$ periodic function. Equation (128) represents the $70^{th}$ periodic function. Equations (113), (117), (121) and (129) represent the $71^{st}$ periodic function. Equation (125) represents the $72^{nd}$ periodic function.

According to embodiments of the present disclosure, the periodic functions corresponding to the predetermined color mode may include a $73^{rd}$ periodic function corresponding to black, a $74^{th}$ periodic function corresponding to white, a $75^{th}$ periodic function corresponding to blue, a $76^{th}$ periodic function corresponding to blue, a $77^{th}$ periodic function corresponding to blue, a $78^{th}$ periodic function corresponding to green, a $79^{th}$ periodic function corresponding to green, and an $80^{th}$ periodic function corresponding to green.

According to embodiments of the present disclosure, determining the target periodic functions corresponding to the plurality of predetermined colors from the one or more periodic functions corresponding to the plurality of predetermined colors according to the value range may include the following operations.

When it is determined that the value range is a thirty-seventh predetermined range, the $73^{rd}$ periodic function corresponding to black is determined as the target periodic function corresponding to black from the $73^{rd}$ periodic function corresponding to black, the $74^{th}$ periodic function corresponding to white is determined as the target periodic function corresponding to white from the $74^{th}$ periodic function corresponding to white, the $75^{th}$ periodic function corresponding to blue is determined as the target periodic function corresponding to blue from the $75^{th}$ periodic function corresponding to blue, the $76^{th}$ periodic function corresponding to blue and the $77^{th}$ periodic function corresponding to blue, and the $78^{th}$ periodic function corresponding to green is determined as the target periodic function corresponding to green from the $78^{th}$ periodic function corresponding to green, the $79^{th}$ periodic function corresponding to green and the $80^{th}$ periodic function corresponding to green.

When it is determined that the value range is a thirty-eighth predetermined range, the $73^{rd}$ periodic function corresponding to black is determined as the target periodic function corresponding to black from the $73^{rd}$ periodic function corresponding to black, the $74^{th}$ periodic function corresponding to white is determined as the target periodic function corresponding to white from the $74^{th}$ periodic function corresponding to white, the $76^{th}$ periodic function corresponding to blue is determined as the target periodic function corresponding to blue from the $75^{th}$ periodic function corresponding to blue, the $76^{th}$ periodic function corresponding to blue and the $77^{th}$ periodic function corresponding to blue, and the $79^{th}$ periodic function corresponding to green is determined as the target periodic function corresponding to green from the $78^{th}$ periodic function corresponding to green, the $79^{th}$ periodic function corresponding to green and the $80^{th}$ periodic function corresponding to green.

When it is determined that the value range is a thirty-ninth predetermined range, the $73^{rd}$ periodic function corresponding to black is determined as the target periodic function corresponding to black from the $73^{rd}$ periodic function corresponding to black, the $74^{th}$ periodic function corresponding to white is determined as the target periodic function corresponding to white from the $74^{th}$ periodic function corresponding to white, the $77^{th}$ periodic function corresponding to blue is determined as the target periodic function corresponding to blue from the $75^{th}$ periodic function corresponding to blue, the $76^{th}$ periodic function corresponding to blue and the $77^{th}$ periodic function corresponding to blue, and the $80^{th}$ periodic function corresponding to green is determined as the target periodic function corresponding to green from the $78^{th}$ periodic function corresponding to green, the $79^{th}$ periodic function corresponding to green and the $80^{th}$ periodic function corresponding to green.

When it is determined that the value range is a fortieth predetermined range, the $73^{rd}$ periodic function corresponding to black is determined as the target periodic function corresponding to black from the $73^{rd}$ periodic function corresponding to black, the $74^{th}$ periodic function corresponding to white is determined as the target periodic function corresponding to white from the $74^{th}$ periodic function corresponding to white, the $75^{th}$ periodic function corresponding to blue is determined as the target periodic function corresponding to blue from the $75^{th}$ periodic function corresponding to blue, the $76^{th}$ periodic function corresponding to blue and the $77^{th}$ periodic function corresponding to blue, and the $78^{th}$ periodic function corresponding to green is determined as the target periodic function corresponding to green from the $78^{th}$ periodic function corresponding to green, the $79^{th}$ periodic function corresponding to green and the $80^{th}$ periodic function corresponding to green.

According to embodiments of the present disclosure, the thirty-seventh predetermined range, the thirty-eighth predetermined range, the thirty-ninth predetermined range and the fortieth predetermined range may be set according to actual service needs and are not limited here. For example, the thirty-seventh predetermined range, the thirty-eighth predetermined range, the thirty-ninth predetermined range and the fortieth predetermined range may cooperate with each other to be greater than or equal to 0 and less than or equal to 180. The thirty-seventh predetermined range may be greater than or equal to 0 and less than 30. The thirty-eighth predetermined range may be greater than or equal to 30 and less than 90. The thirty-ninth predetermined range may be greater than or equal to 90 and less than 150. The fortieth predetermined range may be greater than or equal to 150 and less than 180.

According to embodiments of the present disclosure, when it is determined that the value range is the thirty-seventh predetermined range, the $73^{rd}$ periodic function may be determined as the target periodic function corresponding to black, the $74^{th}$ periodic function may be determined as the target periodic function corresponding to white, the $75^{th}$ periodic function is determined as the target periodic function corresponding to blue, and the $78^{th}$ periodic function may be determined as the target periodic function corresponding to green.

According to embodiments of the present disclosure, when it is determined that the value range is the thirty-eighth predetermined range, the $73^{rd}$ periodic function may be determined as the target periodic function corresponding to black, the $74^{th}$ periodic function may be determined as the target periodic function corresponding to white, the $76^{th}$ periodic function is determined as the target periodic function corresponding to blue, and the $79^{th}$ periodic function may be determined as the target periodic function corresponding to green.

According to embodiments of the present disclosure, when it is determined that the value range is the thirty-ninth predetermined range, the $73^{rd}$ periodic function may be determined as the target periodic function corresponding to black, the $74^{th}$ periodic function may be determined as the target periodic function corresponding to white, the $77^{th}$ periodic function is determined as the target periodic function corresponding to blue, and the $80^{th}$ periodic function may be determined as the target periodic function corresponding to green.

According to embodiments of the present disclosure, when it is determined that the value range is the fortieth predetermined range, the $73^{rd}$ periodic function may be determined as the target periodic function corresponding to black, the $74^{th}$ periodic function may be determined as the target periodic function corresponding to white, the $75^{th}$ periodic function is determined as the target periodic function corresponding to blue, and the $78^{th}$ periodic function may be determined as the target periodic function corresponding to green.

According to embodiments of the present disclosure, the plurality of predetermined colors include black, white, blue and green.

According to embodiments of the present disclosure, when the plurality of predetermined colors include black, white, blue and green, the periodic functions corresponding to the predetermined color mode may be determined according to Equations (132) to (147) below.

According to embodiments of the present disclosure, when $0 \le x < 30$, the periodic functions corresponding to the predetermined color mode may be determined according to Equations (132) to (135) below.

$$p_{blue3} = 0.5 * \frac{\cos\left[\left(\frac{x}{30}\right) * \pi\right] + B}{A} \tag{132}$$

$$p_{green3} = 0.5 * \frac{\cos\left[\left(\frac{x}{30}\right) * \pi\right] + B}{A} \tag{133}$$

$$p_{white10} = \frac{\cos\left[\left(\frac{x-30}{30}\right) * \pi\right] + B}{A} \tag{134}$$

$$p_{black10} = 0 \tag{135}$$

According to embodiments of the present disclosure, when $3 \le x < 90$, the periodic functions corresponding to the predetermined color mode may be determined according to Equations (136) to (139) below.

$$p_{blue3} = 0 \tag{136}$$

$$p_{green3} = \frac{\cos\left[\left(\frac{x}{30}\right) * \pi\right] + B}{A} \tag{137}$$

$$p_{white10} = \frac{\cos\left[\left(\frac{x-30}{30}\right) * \pi\right] + B}{A} \tag{138}$$

$$p_{black10} = 0 \tag{139}$$

According to embodiments of the present disclosure, when $90 \le x < 150$, the periodic functions corresponding to the predetermined color mode may be determined according to Equations (140) to (143) below.

$$p_{blue3} = \frac{\cos\left[\left(\frac{x}{30}\right) * \pi\right] + B}{A} \tag{140}$$

$$p_{green3} = 0 \tag{141}$$

$$p_{white10} = \frac{\cos\left[\left(\frac{x-30}{30}\right) * \pi\right] + B}{A} \tag{142}$$

$$p_{black10} = 0 \tag{143}$$

According to embodiments of the present disclosure, when $150 \le x < 180$, the periodic functions corresponding to the predetermined color mode may be determined according to Equations (144) to (147) below.

$$P_{blue3} = 0.5 * \frac{\cos\left[\left(\frac{x}{30}\right) * \pi\right] + B}{A} \tag{144}$$

$$P_{green3} = 0.5 * \frac{\cos\left[\left(\frac{x}{30}\right) * \pi\right] + B}{A} \tag{145}$$

$$p_{white10} = \frac{\cos\left[\left(\frac{x-30}{30}\right) * \pi\right] + B}{A} \tag{146}$$

$$p_{black10} = 0 \tag{147}$$

According to embodiments of the present disclosure, x may represent a first color component, $p_{blue3}$ may represent a second probability corresponding to blue, $p_{green3}$ may represent a second probability corresponding to green, $p_{white10}$ may represent a second probability corresponding to white, $p_{black10}$ may represent a second probability corresponding to black, A may represent a first predetermined value, and B may represent a second predetermined value. A and B may cooperate with each other so that the second probability is greater than or equal to 0 and less than or equal to 1.

According to embodiments of the present disclosure, when x belongs to [0, 30), the probability of the predetermined color being black is 0, the probability of the predetermined color being white is [0, 1), the probability of the predetermined color being blue is [0.5, 0), and the probability of the predetermined color being green is [0.5, 0).

According to embodiments of the present disclosure, when x belongs to [30, 60), the probability of the predetermined color being black is 0, the probability of the predetermined color being white is [1, 0), the probability of the predetermined color being blue is 0, and the probability of the predetermined color being green is [0, 1). When x belongs to [60, 90), the probability of the predetermined color being black is 0, the probability of the predetermined color being white is [0, 1), the probability of the predetermined color being blue is 0, and the probability of the predetermined color being green is [1, 0).

According to embodiments of the present disclosure, when x belongs to [90, 120), the probability of the predetermined color being black is 0, the probability of the predetermined color being white is [1, 0), the probability of the predetermined color being blue is [0, 1), and the probability of the predetermined color being green is 0. When x belongs to [120, 150), the probability of the predetermined color being black is 0, the probability of the predetermined color being white is [0, 1), the probability of the predetermined color being blue is [1, 0), and the probability of the predetermined color being green is 0.

According to embodiments of the present disclosure, when x belongs to [150, 180), the probability of the predetermined color being black is 0, the probability of the predetermined color being white is [1, 0), the probability of the predetermined color being blue is [0.5, 1), and the probability of the predetermined color being green is [0, 0.5).

According to embodiments of the present disclosure, the thirty-seventh predetermined range is $0 \leq x < 30$, the thirty-eighth predetermined range is $30 \leq x < 90$, the thirty-ninth predetermined range is $90 \leq x < 150$, and the fortieth predetermined range is $150 \leq x < 180$. Equations (135), (139), (143) and (147) represent the $73^{rd}$ periodic function. Equations (134), (138), (142) and (146) represent the $74^{th}$ periodic function. Equations (132) and (144) represent the $75^{th}$ periodic function. Equation (136) represents the $76^{th}$ periodic function. Equation (140) represents the $77^{th}$ periodic function. Equations (133) and (145) represent the $78^{th}$ periodic function. Equation (137) represents the $79^{th}$ periodic function. Equation (141) represents the $80^{th}$ periodic function.

According to embodiments of the present disclosure, the periodic functions corresponding to the predetermined color mode may include an $81^{st}$ periodic function corresponding to black, an $82^{nd}$ periodic function corresponding to white, an $83^{rd}$ periodic function corresponding to red, an $84^{th}$ periodic function corresponding to red, an $85^{th}$ periodic function corresponding to green, an $86^{th}$ periodic function corresponding to green, an $87^{th}$ periodic function corresponding to blue, and an $88^{th}$ periodic function corresponding to blue.

According to embodiments of the present disclosure, determining the target periodic functions corresponding to the plurality of predetermined colors from the one or more periodic functions corresponding to the plurality of predetermined colors according to the value range may include the following operations.

When it is determined that the value range is a forty-first predetermined range, the $81^{st}$ periodic function corresponding to black is determined as the target periodic function corresponding to black from the $81^{st}$ periodic function corresponding to black, the $82^{nd}$ periodic function corresponding to white is determined as the target periodic function corresponding to white from the $82^{nd}$ periodic function corresponding to white, the $83^{rd}$ periodic function corresponding to red is determined as the target periodic function corresponding to red from the $83^{rd}$ periodic function corresponding to red and the $84^{th}$ periodic function corresponding to red, the $85^{th}$ periodic function corresponding to green is determined as the target periodic function corresponding to green from the $85^{th}$ periodic function corresponding to green and the $86^{th}$ periodic function corresponding to green, and the $87^{th}$ periodic function corresponding to blue is determined as the target periodic function corresponding to blue from the $87^{th}$ periodic function corresponding to blue and the $88^{th}$ periodic function corresponding to blue.

When it is determined that the value range is a forty-second predetermined range, the $81^{st}$ periodic function corresponding to black is determined as the target periodic function corresponding to black from the $81^{st}$ periodic function corresponding to black, the $82^{nd}$ periodic function corresponding to white is determined as the target periodic function corresponding to white from the $82^{nd}$ periodic function corresponding to white, the $84^{th}$ periodic function corresponding to red is determined as the target periodic function corresponding to red from the $83^{rd}$ periodic function corresponding to red and the $84^{th}$ periodic function corresponding to red, the $86^{th}$ periodic function corresponding to green is determined as the target periodic function corresponding to green from the $85^{th}$ periodic function corresponding to green and the $86^{th}$ periodic function corresponding to green, and the $87^{th}$ periodic function corresponding to blue is determined as the target periodic function corresponding to blue from the $87^{th}$ periodic function corresponding to blue and the $88^{th}$ periodic function corresponding to blue.

When it is determined that the value range is a forty-third predetermined range, the $81^{st}$ periodic function corresponding to black is determined as the target periodic function corresponding to black from the $81^{st}$ periodic function corresponding to black, the $82^{nd}$ periodic function corresponding to white is determined as the target periodic function corresponding to white from the $82^{nd}$ periodic function corresponding to white, the $84^{th}$ periodic function corresponding to red is determined as the target periodic function corresponding to red from the $83^{rd}$ periodic function corresponding to red and the $84^{th}$ periodic function corresponding to red, the $85^{th}$ periodic function corresponding to green is determined as the target periodic function corresponding to green from the $85^{th}$ periodic function corresponding to green and the $86^{th}$ periodic function corresponding to green, and the $88^{th}$ periodic function corresponding to blue is determined as the target periodic function corresponding to blue from the $87^{th}$ periodic function corresponding to blue and the $88^{th}$ periodic function corresponding to blue.

When it is determined that the value range is a forty-fourth predetermined range, the $81^{st}$ periodic function corresponding to black is determined as the target periodic function corresponding to black from the $81^{st}$ periodic function corresponding to black, the $82^{nd}$ periodic function corresponding to white is determined as the target periodic function corresponding to white from the $82^{nd}$ periodic function corresponding to white, the $83^{rd}$ periodic function corresponding to red is determined as the target periodic function corresponding to red from the $83^{rd}$ periodic function corresponding to red and the $84^{th}$ periodic function corresponding to red, the $85^{th}$ periodic function corresponding to green is determined as the target periodic function corresponding to green from the $85^{th}$ periodic function corresponding to green and the $86^{th}$ periodic function corresponding to green, and the $87^{th}$ periodic function corresponding to blue is determined as the target periodic function corresponding to blue from the $87^{th}$ periodic function corresponding to blue and the $88^{th}$ periodic function corresponding to blue.

According to embodiments of the present disclosure, the forty-first predetermined range, the forty-second predetermined range, the forty-third predetermined range and the forty-fourth predetermined range may be set according to actual service needs and are not limited here. For example, the forty-first predetermined range, the forty-second predetermined range, the forty-third predetermined range and the forty-fourth predetermined range may cooperate with each other to be greater than or equal to 0 and less than or equal to 180. The forty-first predetermined range may be greater than or equal to 0 and less than 30. The forty-second predetermined range may be greater than or equal to 30 and less than 90. The forty-third predetermined range may be greater than or equal to 90 and less than 150. The forty-fourth predetermined range may be greater than or equal to 150 and less than 180.

According to embodiments of the present disclosure, when it is determined that the value range is the forty-first predetermined range, the $81^{st}$ periodic function may be determined as the target periodic function corresponding to black, the $82^{nd}$ periodic function may be determined as the target periodic function corresponding to white, the $83^{rd}$ periodic function is determined as the target periodic function corresponding to red, the $85^{th}$ periodic function is determined as the target periodic function corresponding to green, and the $87^{th}$ periodic function may be determined as the target periodic function corresponding to blue.

According to embodiments of the present disclosure, when it is determined that the value range is the forty-second predetermined range, the $81^{st}$ periodic function may be determined as the target periodic function corresponding to black, the $82^{nd}$ periodic function may be determined as the target periodic function corresponding to white, the $84^{th}$ periodic function is determined as the target periodic function corresponding to red, the $86^{th}$ periodic function is determined as the target periodic function corresponding to green, and the $87^{th}$ periodic function may be determined as the target periodic function corresponding to blue.

According to embodiments of the present disclosure, when it is determined that the value range is the forty-third predetermined range, the $81^{st}$ periodic function may be determined as the target periodic function corresponding to black, the $82^{nd}$ periodic function may be determined as the target periodic function corresponding to white, the $84^{th}$ periodic function is determined as the target periodic function corresponding to red, the $85^{th}$ periodic function is determined as the target periodic function corresponding to green, and the $88^{th}$ periodic function may be determined as the target periodic function corresponding to blue.

According to embodiments of the present disclosure, when it is determined that the value range is the forty-fourth predetermined range, the $81^{st}$ periodic function may be determined as the target periodic function corresponding to black, the $82^{nd}$ periodic function may be determined as the target periodic function corresponding to white, the $83^{rd}$ periodic function is determined as the target periodic function corresponding to red, the $85^{th}$ periodic function is determined as the target periodic function corresponding to green, and the $87^{th}$ periodic function may be determined as the target periodic function corresponding to blue.

According to embodiments of the present disclosure, the plurality of predetermined colors include black, white, red, green and blue.

According to embodiments of the present disclosure, when the plurality of predetermined colors include black, white, red, green and blue, the periodic functions corresponding to the predetermined color mode may be determined according to Equations (148) to (167) below.

According to embodiments of the present disclosure, when $0 \leq x < 30$, the periodic functions corresponding to the predetermined color mode may be determined according to Equations (148) to (152) below.

$$P_{red4} = \frac{\cos\left[\left(\frac{x}{30}\right)*\pi\right] + B}{A} \tag{148}$$

$$P_{green4} = 0 \tag{149}$$

$$P_{blue4} = 0 \tag{150}$$

$$P_{white11} = \frac{\cos\left[\left(\frac{x-30}{30}\right)*\pi\right] + B}{A} \tag{151}$$

$$P_{black11} = 0 \tag{152}$$

According to embodiments of the present disclosure, when $30 \leq x < 90$, the periodic functions corresponding to the predetermined color mode may be determined according to Equations (153) to (157) below.

$$P_{red4} = 0 \tag{153}$$

$$P_{green4} = \frac{\cos\left[\left(\frac{x}{30}\right)*\pi\right] + B}{A} \tag{154}$$

$$P_{blue4} = 0 \tag{155}$$

$$P_{white11} = \frac{\cos\left[\left(\frac{x-30}{30}\right)*\pi\right] + B}{A} \tag{156}$$

$$P_{black11} = 0 \tag{157}$$

According to embodiments of the present disclosure, when $90 \leq x < 150$, the periodic functions corresponding to the predetermined color mode may be determined according to Equations (158) to (162) below.

$$P_{red4} = 0 \tag{158}$$

$$P_{green4} = 0 \tag{159}$$

$$P_{blue4} = \frac{\cos\left[\left(\frac{x}{30}\right)*\pi\right] + B}{A} \tag{160}$$

$$P_{white11} = \frac{\cos\left[\left(\frac{x-30}{30}\right)*\pi\right] + B}{A} \tag{161}$$

$$P_{black11} = 0 \tag{162}$$

According to embodiments of the present disclosure, when $150 \leq x < 180$, the periodic functions corresponding to the predetermined color mode may be determined according to Equations (163) to (167) below.

$$p_{red4} = \frac{\cos\left[\left(\frac{x}{30}\right)*\pi\right] + B}{A} \quad (163)$$

$$p_{green4} = 0 \quad (164)$$

$$p_{blue4} = 0 \quad (165)$$

$$p_{white11} = \frac{\cos\left[\left(\frac{x-30}{30}\right)*\pi\right] + B}{A} \quad (166)$$

$$p_{black11} = 0 \quad (167)$$

According to embodiments of the present disclosure, x may represent a first color component, $p_{red4}$ may represent a second probability corresponding to red, $p_{green4}$ may represent a second probability corresponding to green, $p_{blue4}$ may represent a second probability corresponding to blue, $p_{white11}$ may represent a second probability corresponding to white, $p_{black11}$ may represent a second probability corresponding to black, A may represent a first predetermined value, and B may represent a second predetermined value. A and B may cooperate with each other so that the second probability is greater than or equal to 0 and less than or equal to 1.

According to embodiments of the present disclosure, the first predetermined value and the second predetermined value may be set according to actual service needs and are not limited here. For example, the first predetermined value may be 2, and the second predetermined value may be 1. The periodic functions corresponding to the predetermined color mode in a case of the plurality of predetermined colors including black, white, red, green, and blue will be described below with reference to FIG. 6C.

FIG. 6C schematically shows an example schematic diagram of a probability distribution corresponding to the predetermined color mode in a case of the plurality of predetermined colors including black, white, red, green and blue according to embodiments of the present disclosure.

As shown in FIG. 6C, in 600C, a point on a ring 605 may represent a probability of 1, a point on a ring 606 may represent a probability of 0, and a point between the ring 605 and the ring 606 may represent a probability of (0, 1).

$O_3A_3$-direction may represent that the first color component x is at 0 degrees, $O_3B_3$-direction may represent that the first color component x is at 30 degrees, $O_3C_3$-direction may represent that the first color component x is at 60 degrees, $O_3D_3$-direction may represent that the first color component x is at 90 degrees, $O_3E_3$-direction may represent that the first color component x is at 120 degrees, and $O_3F_3$-direction may represent that the first color component x is at 150 degrees.

From $O_3A_3$ to $O_3B_3$, that is, when x belongs to [0, 30), the probability of the predetermined color being red is [1, 0), the probability of the predetermined color being blue is 0, the probability of the predetermined color being green is 0, the probability of the predetermined color being white is [0, 1), and the probability of the predetermined color being black is 0.

From $O_3B_3$ to $O_3C_3$, that is, when x belongs to [30, 60), the probability of the predetermined color being red is 0, the probability of the predetermined color being blue is 0, the probability of the predetermined color being green is [0, 1), the probability of the predetermined color being white is [1, 0), and the probability of the predetermined color being black is 0.

From $O_3C_3$ to $O_3D_3$, that is, when x belongs to [60, 90), the probability of the predetermined color being red is [1, 0), the probability of the predetermined color being blue is 0, the probability of the predetermined color being green is 0, the probability of the predetermined color being white is [0, 1), and the probability of the predetermined color being black is 0.

From $O_3D_3$ to $O_3E_3$, that is, when x belongs to [90, 120), the probability of the predetermined color being red is 0, the probability of the predetermined color being blue is [0, 1), the probability of the predetermined color being green is 0, the probability of the predetermined color being white is [1, 0), and the probability of the predetermined color being black is 0.

From $O_3E_3$ to $O_3F_3$, that is, when x belongs to [120, 150), the probability of the predetermined color being red is 0, the probability of the predetermined color being blue is [1, 0), the probability of the predetermined color being green is 0, the probability of the predetermined color being white is [0, 1), and the probability of the predetermined color being black is 0.

From $O_3F_3$ to $O_3A_3$, that is, when x belongs to [150, 180), the probability of the predetermined color being red is [0, 1), the probability of the predetermined color being blue is 0, the probability of the predetermined color being green is 0, the probability of the predetermined color being white is [1, 0), and the probability of the predetermined color being black is 0.

According to embodiments of the present disclosure, the forty-first predetermined range is 0≤x<30, the forty-second predetermined range is 30≤x<90, the forty-third predetermined range is 90≤x<150, and the forty-fourth predetermined range is 150≤x<180. Equations (152), (157), (162) and (167) represent the $81^{st}$ periodic function. Equations (151), (156), (161) and (166) represent the $82^{nd}$ periodic function. Equations (148) and (163) represent the $83^{rd}$ periodic function. Equations (153) and (158) represent the $84^{th}$ periodic function. Equations (149) and (159) represent the $85^{th}$ periodic function. Equation (154) represents the $86^{th}$ periodic function. Equations (150), (155) and (165) represent the $87^{th}$ periodic function. Equation (160) represents the $88^{th}$ periodic function.

According to embodiments of the present disclosure, the periodic functions corresponding to the predetermined color mode may include an $89^{th}$ periodic function corresponding to black, a $90^{th}$ periodic function corresponding to black, a $91^{st}$ periodic function corresponding to white, a $92^{nd}$ periodic function corresponding to white, a $93^{rd}$ periodic function corresponding to red, a $94^{th}$ periodic function corresponding to red, a $95^{th}$ periodic function corresponding to yellow, a $96^{th}$ periodic function corresponding to yellow, a $97^{th}$ periodic function corresponding to green, and a $98^{th}$ periodic function corresponding to green.

According to embodiments of the present disclosure, determining the target periodic functions corresponding to the plurality of predetermined colors from the one or more periodic functions corresponding to the plurality of predetermined colors according to the value range may include the following operations.

When it is determined that the value range is a forty-fifth predetermined range, the $89^{th}$ periodic function corresponding to black is determined as the target periodic function corresponding to black from the $89^{th}$ periodic function corresponding to black and the $90^{th}$ periodic function corresponding to black, the $91^{st}$ periodic function corresponding to white is determined as the target periodic function corresponding to white from the $91^{st}$ periodic function corresponding to white and the $92^{nd}$ periodic function corresponding to white, the $93^{rd}$ periodic function corresponding to red is determined as the target periodic function corresponding to red from the $93^{rd}$ periodic function corresponding to red and the $94^{th}$ periodic function corresponding to red, the $95^{th}$ periodic function corresponding to yellow is determined as the target periodic function corresponding to yellow from the $95^{th}$ periodic function corresponding to yellow and the $96^{th}$ periodic function corresponding to yellow, and the $97^{th}$ periodic function corresponding to green is determined as the target periodic function corresponding to green from the $97^{th}$ periodic function corresponding to green and the $98^{th}$ periodic function corresponding to green.

When it is determined that the value range is a forty-sixth predetermined range, the $89^{th}$ periodic function corresponding to black is determined as the target periodic function corresponding to black from the $89^{th}$ periodic function corresponding to black and the $90^{th}$ periodic function corresponding to black, the $91^{st}$ periodic function corresponding to white is determined as the target periodic function corresponding to white from the $91^{st}$ periodic function corresponding to white and the $92^{nd}$ periodic function corresponding to white, the $94^{th}$ periodic function corresponding to red is determined as the target periodic function corresponding to red from the $93^{rd}$ periodic function corresponding to red and the $94^{th}$ periodic function corresponding to red, the $95^{th}$ periodic function corresponding to yellow is determined as the target periodic function corresponding to yellow from the $95^{th}$ periodic function corresponding to yellow and the $96^{th}$ periodic function corresponding to yellow, and the $98^{th}$ periodic function corresponding to green is determined as the target periodic function corresponding to green from the $97^{th}$ periodic function corresponding to green and the $98^{th}$ periodic function corresponding to green.

When it is determined that the value range is a forty-seventh predetermined range, the $89^{th}$ periodic function corresponding to black is determined as the target periodic function corresponding to black from the $89^{th}$ periodic function corresponding to black and the $90^{th}$ periodic function corresponding to black, the $92^{nd}$ periodic function corresponding to white is determined as the target periodic function corresponding to white from the $91^{st}$ periodic function corresponding to white and the $92^{nd}$ periodic function corresponding to white, the $94^{th}$ periodic function corresponding to red is determined as the target periodic function corresponding to red from the $93^{rd}$ periodic function corresponding to red and the $94^{th}$ periodic function corresponding to red, the $96^{th}$ periodic function corresponding to yellow is determined as the target periodic function corresponding to yellow from the $95^{th}$ periodic function corresponding to yellow and the $96^{th}$ periodic function corresponding to yellow, and the $98^{th}$ periodic function corresponding to green is determined as the target periodic function corresponding to green from the $97^{th}$ periodic function corresponding to green and the $98^{th}$ periodic function corresponding to green.

When it is determined that the value range is a forty-eighth predetermined range, the $90^{th}$ periodic function corresponding to black is determined as the target periodic function corresponding to black from the $89^{th}$ periodic function corresponding to black and the $90^{th}$ periodic function corresponding to black, the $92^{nd}$ periodic function corresponding to white is determined as the target periodic function corresponding to white from the $91^{st}$ periodic function corresponding to white and the $92^{nd}$ periodic function corresponding to white, the $94^{th}$ periodic function corresponding to red is determined as the target periodic function corresponding to red from the $93^{rd}$ periodic function corresponding to red and the $94^{th}$ periodic function corresponding to red, the $96^{th}$ periodic function corresponding to yellow is determined as the target periodic function corresponding to yellow from the $95^{th}$ periodic function corresponding to yellow and the $96^{th}$ periodic function corresponding to yellow, and the $97^{th}$ periodic function corresponding to green is determined as the target periodic function corresponding to green from the $97^{th}$ periodic function corresponding to green and the $98^{th}$ periodic function corresponding to green.

When it is determined that the value range is a forty-ninth predetermined range, the $89^{th}$ periodic function corresponding to black is determined as the target periodic function corresponding to black from the $89^{th}$ periodic function corresponding to black and the $90^{th}$ periodic function corresponding to black, the $92^{nd}$ periodic function corresponding to white is determined as the target periodic function corresponding to white from the $91^{st}$ periodic function corresponding to white and the $92^{nd}$ periodic function corresponding to white, the $93^{rd}$ periodic function corresponding to red is determined as the target periodic function corresponding to red from the $93^{rd}$ periodic function corresponding to red and the $94^{th}$ periodic function corresponding to red, the $96^{th}$ periodic function corresponding to yellow is determined as the target periodic function corresponding to yellow from the $95^{th}$ periodic function corresponding to yellow and the $96^{th}$ periodic function corresponding to yellow, and the $97^{th}$ periodic function corresponding to green is determined as the target periodic function corresponding to green from the $97^{th}$ periodic function corresponding to green and the $98^{th}$ periodic function corresponding to green.

According to embodiments of the present disclosure, the forty-fifth predetermined range, the forty-sixth predetermined range, the forty-seventh predetermined range, the forty-eighth predetermined range and the forty-ninth predetermined range may be set according to actual service needs and are not limited here. For example, the forty-fifth predetermined range, the forty-sixth predetermined range, the forty-seventh predetermined range, the forty-eighth predetermined range and the forty-ninth predetermined range may cooperate with each other to be greater than or equal to 0 and less than or equal to 180. The forty-fifth predetermined range may be greater than or equal to 0 and less than 30. The forty-sixth predetermined range may be greater than or equal to 30 and less than 60. The forty-seventh predetermined range may be greater than or equal to 60 and less than 90. The forty-eighth predetermined range may be greater than or equal to 90 and less than 150. The forty-ninth predetermined range may be greater than or equal to 150 and less than 180.

According to embodiments of the present disclosure, when it is determined that the value range is the forty-fifth predetermined range, the $89^{th}$ periodic function may be determined as the target periodic function corresponding to black, the $91^{st}$ periodic function may be determined as the target periodic function corresponding to white, the $93^{rd}$ periodic function is determined as the target periodic function corresponding to red, the $95^{th}$ periodic function is determined as the target periodic function corresponding to yellow, and the $97^{th}$ periodic function may be determined as the target periodic function corresponding to green.

According to embodiments of the present disclosure, when it is determined that the value range is the forty-sixth predetermined range, the $89^{th}$ periodic function may be determined as the target periodic function corresponding to black, the $91^{st}$ periodic function may be determined as the target periodic function corresponding to white, the $94^{th}$ periodic function is determined as the target periodic function corresponding to red, the $95^{th}$ periodic function is determined as the target periodic function corresponding to yellow, and the $98^{th}$ periodic function may be determined as the target periodic function corresponding to green.

According to embodiments of the present disclosure, when it is determined that the value range is the forty-seventh predetermined range, the $89^{th}$ periodic function may be determined as the target periodic function corresponding to black, the $92^{nd}$ periodic function may be determined as the target periodic function corresponding to white, the $94^{th}$ periodic function is determined as the target periodic function corresponding to red, the $96^{th}$ periodic function is determined as the target periodic function corresponding to yellow, and the $98^{th}$ periodic function may be determined as the target periodic function corresponding to green.

According to embodiments of the present disclosure, when it is determined that the value range is the forty-eighth predetermined range, the $90^{th}$ periodic function may be determined as the target periodic function corresponding to black, the $92^{nd}$ periodic function may be determined as the target periodic function corresponding to white, the $94^{th}$ periodic function is determined as the target periodic function corresponding to red, the $96^{th}$ periodic function is determined as the target periodic function corresponding to yellow, and the $97^{th}$ periodic function may be determined as the target periodic function corresponding to green.

According to embodiments of the present disclosure, when it is determined that the value range is the forty-ninth predetermined range, the $89^{th}$ periodic function may be determined as the target periodic function corresponding to black, the $92^{nd}$ periodic function may be determined as the target periodic function corresponding to white, the $93^{rd}$ periodic function is determined as the target periodic function corresponding to red, the $96^{th}$ periodic function is determined as the target periodic function corresponding to yellow, and the $97^{th}$ periodic function may be determined as the target periodic function corresponding to green.

According to embodiments of the present disclosure, the plurality of predetermined colors include black, white, red, yellow and green.

According to embodiments of the present disclosure, when the plurality of predetermined colors include black, white, red, yellow and green, the periodic functions corresponding to the predetermined color mode may be determined according to Equations (168) to (192) below.

According to embodiments of the present disclosure, when $0 \leq x < 30$, the periodic functions corresponding to the predetermined color mode may be determined according to Equations (168) to (172) below.

$$p_{red5} = \frac{\cos\left[\left(\frac{x}{30}\right) * \pi\right] + B}{A} \quad (168)$$

$$p_{yellow4} = \frac{\cos\left[\left(\frac{x-30}{30}\right) * \pi\right] + B}{A} \quad (169)$$

$$p_{green5} = 0 \quad (170)$$

$$p_{white12} = 0 \quad (171)$$

$$p_{black12} = 0 \quad (172)$$

According to embodiments of the present disclosure, when $30 \leq x < 60$, the periodic functions corresponding to the predetermined color mode may be determined according to Equations (173) to (177) below.

$$p_{red5} = 0 \quad (173)$$

$$p_{yellow4} = \frac{\cos\left[\left(\frac{x-30}{30}\right) * \pi\right] + B}{A} \quad (174)$$

$$p_{green5} = \frac{\cos\left[\left(\frac{x}{30}\right) * \pi\right] + B}{A} \quad (175)$$

$$p_{white12} = 0 \quad (176)$$

$$p_{black12} = 0 \quad (177)$$

According to embodiments of the present disclosure, when $60 \leq x < 90$, the periodic functions corresponding to the predetermined color mode may be determined according to Equations (178) to (182) below.

$$p_{red5} = 0 \quad (178)$$

$$p_{yellow4} = 0 \quad (179)$$

$$p_{green5} = \frac{\cos\left[\left(\frac{x}{30}\right) * \pi\right] + B}{A} \quad (180)$$

$$p_{white12} = \frac{\cos\left[\left(\frac{x-30}{30}\right) * \pi\right] + B}{A} \quad (181)$$

$$p_{black12} = 0 \quad (182)$$

According to embodiments of the present disclosure, when $90 \leq x < 150$, the periodic functions corresponding to the predetermined color mode may be determined according to Equations (183) to (187) below.

$$p_{red5} = 0 \quad (183)$$

$$p_{yellow4} = 0 \quad (184)$$

$$p_{green5} = 0 \quad (185)$$

$$p_{white12} = \frac{\cos\left[\left(\frac{x-30}{30}\right) * \pi\right] + B}{A} \quad (186)$$

$$p_{black12} = \frac{\cos\left[\left(\frac{x}{30}\right) * \pi\right] + B}{A} \quad (187)$$

According to embodiments of the present disclosure, when $150 \leq x < 180$, the periodic functions corresponding to the predetermined color mode may be determined according to Equations (188) to (192) below.

$$p_{red5} = \frac{\cos\left[\left(\frac{x}{30}\right) * \pi\right] + B}{A} \quad (188)$$

$$p_{yellow4} = 0 \quad (189)$$

$$p_{green5} = 0 \quad (190)$$

-continued $$p_{white12} = \frac{\cos\left[\left(\frac{x-30}{30}\right)*\pi\right] + B}{A}$$ (191)

$$p_{black12} = 0$$ (192)

According to embodiments of the present disclosure, x may represent a first color component, $p_{red5}$ may represent a second probability corresponding to red, $p_{yellow4}$ may represent a second probability corresponding to yellow, $p_{green5}$ may represent a second probability corresponding to green, $p_{white12}$ may represent a second probability corresponding to white, $p_{black12}$ may represent a second probability corresponding to black, A may represent a first predetermined value, and B may represent a second predetermined value. A and B may cooperate with each other so that the second probability is greater than or equal to 0 and less than or equal to 1.

According to embodiments of the present disclosure, when x belongs to [0, 30), the probability of the predetermined color being black is 0, the probability of the predetermined color being white is 0, the probability of the predetermined color being red is [1, 0), the probability of the predetermined color being yellow is [0, 1), and the probability of the predetermined color being green is 0.

According to embodiments of the present disclosure, when x belongs to [30, 60), the probability of the predetermined color being black is 0, the probability of the predetermined color being white is 0, the probability of the predetermined color being red is 0, the probability of the predetermined color being yellow is [1, 0), and the probability of the predetermined color being green is [0, 1).

According to embodiments of the present disclosure, when x belongs to [60, 90), the probability of the predetermined color being black is 0, the probability of the predetermined color being white is [0, 1), the probability of the predetermined color being red is 0, the probability of the predetermined color being yellow is 0, and the probability of the predetermined color being green is [1, 0).

According to embodiments of the present disclosure, when x belongs to [90, 120), the probability of the predetermined color being black is [0, 1), the probability of the predetermined color being white is [1, 0), the probability of the predetermined color being red is 0, the probability of the predetermined color being yellow is 0, and the probability of the predetermined color being green is 0. When x belongs to [120, 150), the probability of the predetermined color being black is [1, 0), the probability of the predetermined color being white is [0, 1), the probability of the predetermined color being red is 0, the probability of the predetermined color being yellow is 0, and the probability of the predetermined color being green is 0.

According to embodiments of the present disclosure, when x belongs to [150, 180), the probability of the predetermined color being black is 0, the probability of the predetermined color being white is [1, 0), the probability of the predetermined color being red is [0, 1), the probability of the predetermined color being yellow is 0, and the probability of the predetermined color being green is 0.

According to embodiments of the present disclosure, the forty-fifth predetermined range is 0≤x<30, the forty-sixth predetermined range is 30≤x<60, the forty-seventh predetermined range is 60≤x<90, the forty-eighth predetermined range is 90≤x<150, and the forty-ninth predetermined range is 150≤x<180. Equations (172), (177), (182) and (192)

represent the 89th periodic function. Equation (187) represents the 90th periodic function. Equations (171) and (176) represent the 91st periodic function. Equations (181), (186) and (191) represent the 92nd periodic function. Equations (168) and (188) represent the 93rd periodic function. Equations (173), (178) and (183) represent the 94th periodic function. Equations (169) and (174) represent the 95th periodic function. Equations (179), (184) and (189) represent the 96th periodic function. Equations (170), (185) and (190) represent the 97th periodic function. Equations (175) and (180) represent the 98th periodic function.

According to embodiments of the present disclosure, the periodic functions corresponding to the predetermined color mode may include a 99th periodic function corresponding to black, a 100th periodic function corresponding to black, a 101st periodic function corresponding to white, a 102nd periodic function corresponding to white, a 103rd periodic function corresponding to red, a 104th periodic function corresponding to red, a 105th periodic function corresponding to yellow, a 106th periodic function corresponding to yellow, a 107th periodic function corresponding to blue, and a 108th periodic function corresponding to blue.

According to embodiments of the present disclosure, determining the target periodic functions corresponding to the plurality of predetermined colors from the one or more periodic functions corresponding to the plurality of predetermined colors according to the value range may include the following operations.

When it is determined that the value range is a fiftieth predetermined range, the 99th periodic function corresponding to black is determined as the target periodic function corresponding to black from the 99th periodic function corresponding to black and the 100th periodic function corresponding to black, the 101st periodic function corresponding to white is determined as the target periodic function corresponding to white from the 101st periodic function corresponding to white and the 102nd periodic function corresponding to white, the 103rd periodic function corresponding to red is determined as the target periodic function corresponding to red from the 103rd periodic function corresponding to red and the 104th periodic function corresponding to red, the 105th periodic function corresponding to yellow is determined as the target periodic function corresponding to yellow from the 105th periodic function corresponding to yellow and the 106th periodic function corresponding to yellow, and the 107th periodic function corresponding to blue is determined as the target periodic function corresponding to blue from the 107th periodic function corresponding to blue and the 108th periodic function corresponding to blue.

When it is determined that the value range is a fifty-first predetermined range, the 100th periodic function corresponding to black is determined as the target periodic function corresponding to black from the 99th periodic function corresponding to black and the 100th periodic function corresponding to black, the 101st periodic function corresponding to white is determined as the target periodic function corresponding to white from the 101st periodic function corresponding to white and the 102nd periodic function corresponding to white, the 104th periodic function corresponding to red is determined as the target periodic function corresponding to red from the 103rd periodic function corresponding to red and the 104th periodic function corresponding to red, the 105th periodic function corresponding to yellow is determined as the target periodic function corresponding to yellow from the 105th periodic function corresponding to yellow and the 106th periodic function corresponding to yellow, and the $107^{th}$ periodic function corresponding to blue is determined as the target periodic function corresponding to blue from the $107^{th}$ periodic function corresponding to blue and the $108^{th}$ periodic function corresponding to blue.

When it is determined that the value range is a fifty-second predetermined range, the $100^{th}$ periodic function corresponding to black is determined as the target periodic function corresponding to black from the $99^{th}$ periodic function corresponding to black and the $100^{th}$ periodic function corresponding to black, the $102^{nd}$ periodic function corresponding to white is determined as the target periodic function corresponding to white from the $101^{st}$ periodic function corresponding to white and the $102^{nd}$ periodic function corresponding to white, the $104^{th}$ periodic function corresponding to red is determined as the target periodic function corresponding to red from the $103^{rd}$ periodic function corresponding to red and the $104^{th}$ periodic function corresponding to red, the $106^{th}$ periodic function corresponding to yellow is determined as the target periodic function corresponding to yellow from the $105^{th}$ periodic function corresponding to yellow and the $106^{th}$ periodic function corresponding to yellow, and the $107^{th}$ periodic function corresponding to blue is determined as the target periodic function corresponding to blue from the $107^{th}$ periodic function corresponding to blue and the $108^{th}$ periodic function corresponding to blue.

When it is determined that the value range is a fifty-third predetermined range, the $99^{th}$ periodic function corresponding to black is determined as the target periodic function corresponding to black from the $99^{th}$ periodic function corresponding to black and the $100^{th}$ periodic function corresponding to black, the $102^{nd}$ periodic function corresponding to white is determined as the target periodic function corresponding to white from the $101^{st}$ periodic function corresponding to white and the $102^{nd}$ periodic function corresponding to white, the $104^{th}$ periodic function corresponding to red is determined as the target periodic function corresponding to red from the $103^{rd}$ periodic function corresponding to red and the $104^{th}$ periodic function corresponding to red, the $106^{th}$ periodic function corresponding to yellow is determined as the target periodic function corresponding to yellow from the $105^{th}$ periodic function corresponding to yellow and the $106^{th}$ periodic function corresponding to yellow, and the $108^{th}$ periodic function corresponding to blue is determined as the target periodic function corresponding to blue from the $107^{th}$ periodic function corresponding to blue and the $108^{th}$ periodic function corresponding to blue.

When it is determined that the value range is a fifty-fourth predetermined range, the $99^{th}$ periodic function corresponding to black is determined as the target periodic function corresponding to black from the $99^{th}$ periodic function corresponding to black and the $100^{th}$ periodic function corresponding to black, the $102^{nd}$ periodic function corresponding to white is determined as the target periodic function corresponding to white from the $101^{st}$ periodic function corresponding to white and the $102^{nd}$ periodic function corresponding to white, the $103^{rd}$ periodic function corresponding to red is determined as the target periodic function corresponding to red from the $103^{rd}$ periodic function corresponding to red and the $104^{th}$ periodic function corresponding to red, the $106^{th}$ periodic function corresponding to yellow is determined as the target periodic function corresponding to yellow from the $105^{th}$ periodic function corresponding to yellow and the $106^{th}$ periodic function corresponding to yellow, and the $107^{th}$ periodic function corresponding to blue is determined as the target periodic function corresponding to blue from the $107^{th}$ periodic function corresponding to blue and the $108^{th}$ periodic function corresponding to blue.

According to embodiments of the present disclosure, the fiftieth predetermined range, the fifty-first predetermined range, the fifty-second predetermined range, the fifty-third predetermined range and the fifty-fourth predetermined range may be set according to actual service needs and are not limited here. For example, the fiftieth predetermined range, the fifty-first predetermined range, the fifty-second predetermined range, the fifty-third predetermined range and the fifty-fourth predetermined range may cooperate with each other to be greater than or equal to 0 and less than or equal to 180. The fiftieth predetermined range may be greater than or equal to 0 and less than 30. The fifty-first predetermined range may be greater than or equal to 30 and less than 60. The fifty-second predetermined range may be greater than or equal to 60 and less than 90. The fifty-third predetermined range may be greater than or equal to 90 and less than 150. The fifty-fourth predetermined range may be greater than or equal to 150 and less than 180.

According to embodiments of the present disclosure, when it is determined that the value range is the fiftieth predetermined range, the $99^{th}$ periodic function may be determined as the target periodic function corresponding to black, the $101^{st}$ periodic function may be determined as the target periodic function corresponding to white, the $103^{rd}$ periodic function is determined as the target periodic function corresponding to red, the $105^{th}$ periodic function is determined as the target periodic function corresponding to yellow, and the $107^{th}$ periodic function may be determined as the target periodic function corresponding to blue.

According to embodiments of the present disclosure, when it is determined that the value range is the fifty-first predetermined range, the $100^{th}$ periodic function may be determined as the target periodic function corresponding to black, the $101^{st}$ periodic function may be determined as the target periodic function corresponding to white, the $104^{th}$ periodic function is determined as the target periodic function corresponding to red, the $105^{th}$ periodic function is determined as the target periodic function corresponding to yellow, and the $107^{th}$ periodic function may be determined as the target periodic function corresponding to blue.

According to embodiments of the present disclosure, when it is determined that the value range is the fifty-second predetermined range, the $100^{th}$ periodic function may be determined as the target periodic function corresponding to black, the $102^{nd}$ periodic function may be determined as the target periodic function corresponding to white, the $104^{th}$ periodic function is determined as the target periodic function corresponding to red, the $106^{th}$ periodic function is determined as the target periodic function corresponding to yellow, and the $107^{th}$ periodic function may be determined as the target periodic function corresponding to blue.

According to embodiments of the present disclosure, when it is determined that the value range is the fifty-third predetermined range, the $99^{th}$ periodic function may be determined as the target periodic function corresponding to black, the $102^{nd}$ periodic function may be determined as the target periodic function corresponding to white, the $104^{th}$ periodic function is determined as the target periodic function corresponding to red, the $106^{th}$ periodic function is determined as the target periodic function corresponding to yellow, and the $108^{th}$ periodic function may be determined as the target periodic function corresponding to blue.

According to embodiments of the present disclosure, when it is determined that the value range is the fifty-fourth predetermined range, the $99^{th}$ periodic function may be determined as the target periodic function corresponding to black, the $102^{nd}$ periodic function may be determined as the target periodic function corresponding to white, the $103^{rd}$ periodic function is determined as the target periodic function corresponding to red, the $106^{th}$ periodic function is determined as the target periodic function corresponding to yellow, and the $107^{th}$ periodic function may be determined as the target periodic function corresponding to blue.

According to embodiments of the present disclosure, the plurality of predetermined colors include black, white, red, yellow and blue.

According to embodiments of the present disclosure, when the plurality of predetermined colors include black, white, red, yellow and blue, the periodic functions corresponding to the predetermined color mode may be determined according to Equations (193) to (217) below.

According to embodiments of the present disclosure, when $0 \leq x < 30$, the periodic functions corresponding to the predetermined color mode may be determined according to Equations (193) to (197) below.

$$p_{red6} = \frac{\cos\left[\left(\frac{x}{30}\right) * \pi\right] + B}{A} \quad (193)$$

$$p_{yellow5} = \frac{\cos\left[\left(\frac{x - 30}{30}\right) * \pi\right] + B}{A} \quad (194)$$

$$p_{blue5} = 0 \quad (195)$$

$$p_{white13} = 0 \quad (196)$$

$$p_{black13} = 0 \quad (197)$$

According to embodiments of the present disclosure, when $30 \leq x < 60$, the periodic functions corresponding to the predetermined color mode may be determined according to Equations (198) to (202) below.

$$p_{red5} = 0 \quad (198)$$

$$p_{yellow5} = \frac{\cos\left[\left(\frac{x - 30}{30}\right) * \pi\right] + B}{A} \quad (199)$$

$$p_{blue5} = 0 \quad (200)$$

$$p_{white13} = 0 \quad (201)$$

$$p_{black13} = \frac{\cos\left[\left(\frac{x}{30}\right) * \pi\right] + B}{A} \quad (202)$$

According to embodiments of the present disclosure, when $60 \leq x < 90$, the periodic functions corresponding to the predetermined color mode may be determined according to Equations (203) to (207) below.

$$p_{red6} = 0 \quad (203)$$

$$p_{yellow5} = 0 \quad (204)$$

$$p_{blue5} = 0 \quad (205)$$

-continued $$p_{white13} = \frac{\cos\left[\left(\frac{x - 30}{30}\right) * \pi\right] + B}{A} \quad (206)$$

$$p_{black13} = \frac{\cos\left[\left(\frac{x}{30}\right) * \pi\right] + B}{A} \quad (207)$$

According to embodiments of the present disclosure, when $90 \leq x < 150$, the periodic functions corresponding to the predetermined color mode may be determined according to Equations (208) to (212) below.

$$p_{red6} = 0 \quad (208)$$

$$p_{yellow5} = 0 \quad (209)$$

$$p_{blue5} = \frac{\cos\left[\left(\frac{x}{30}\right) * \pi\right] + B}{A} \quad (210)$$

$$p_{white13} = \frac{\cos\left[\left(\frac{x - 30}{30}\right) * \pi\right] + B}{A} \quad (211)$$

$$p_{black13} = 0 \quad (212)$$

According to embodiments of the present disclosure, when $150 \leq x < 180$, the periodic functions corresponding to the predetermined color mode may be determined according to Equations (213) to (217) below.

$$p_{red6} = \frac{\cos\left[\left(\frac{x}{30}\right) * \pi\right] + B}{A} \quad (213)$$

$$p_{yellow5} = 0 \quad (214)$$

$$p_{blue5} = 0 \quad (215)$$

$$p_{white13} = \frac{\cos\left[\left(\frac{x - 30}{30}\right) * \pi\right] + B}{A} \quad (216)$$

$$p_{black13} = 0 \quad (217)$$

According to embodiments of the present disclosure, x may represent a first color component, $p_{red6}$ may represent a second probability corresponding to red, $p_{yellow5}$ may represent a second probability corresponding to yellow, $p_{blue5}$ may represent a second probability corresponding to blue, $p_{white13}$ may represent a second probability corresponding to white, $p_{black13}$ may represent a second probability corresponding to black, A may represent a first predetermined value, and B may represent a second predetermined value. A and B may cooperate with each other so that the second probability is greater than or equal to 0 and less than or equal to 1.

According to embodiments of the present disclosure, when x belongs to [0, 30), the probability of the predetermined color being black is 0, the probability of the predetermined color being white is 0, the probability of the predetermined color being red is [1, 0), the probability of the predetermined color being yellow is [0, 1), and the probability of the predetermined color being blue is 0.

According to embodiments of the present disclosure, when x belongs to [30, 60), the probability of the predetermined color being black is [0, 1), the probability of the predetermined color being white is 0, the probability of the predetermined color being red is 0, the probability of the predetermined color being yellow is [1, 0), and the probability of the predetermined color being blue is 0.

According to embodiments of the present disclosure, when x belongs to [60, 90), the probability of the predetermined color being black is [1, 0), the probability of the predetermined color being white is [0, 1), the probability of the predetermined color being red is 0, the probability of the predetermined color being yellow is 0, and the probability of the predetermined color being blue is 0.

According to embodiments of the present disclosure, when x belongs to [90, 120), the probability of the predetermined color being black is 0, the probability of the predetermined color being white is [1, 0), the probability of the predetermined color being red is 0, the probability of the predetermined color being yellow is 0, and the probability of the predetermined color being blue is [0, 1). When x belongs to [120, 150), the probability of the predetermined color being black is 0, the probability of the predetermined color being white is [0, 1), the probability of the predetermined color being red is 0, the probability of the predetermined color being yellow is 0, and the probability of the predetermined color being blue is [1, 0).

According to embodiments of the present disclosure, when x belongs to [150, 180), the probability of the predetermined color being black is 0, the probability of the predetermined color being white is [1, 0), the probability of the predetermined color being red is [0, 1), the probability of the predetermined color being yellow is 0, and the probability of the predetermined color being blue is 0.

According to embodiments of the present disclosure, the fiftieth predetermined range is $0 \leq x < 30$, the fifty-first predetermined range is $30 \leq x < 60$, the fifty-second predetermined range is $60 \leq x < 90$, the fifty-third predetermined range is $90 \leq x < 150$, and the fifty-fourth predetermined range is $150 \leq x < 180$. Equations (197), (212) and (217) represent the $99^{th}$ periodic function. Equations (202) and (207) represent the $100^{th}$ periodic function. Equations (196) and (201) represent the $101^{st}$ periodic function. Equations (206), (211) and (216) represent the $102^{nd}$ periodic function. Equations (193) and (213) represent the $103^{rd}$ periodic function. Equations (198), (203) and (208) represent the $104^{th}$ periodic function. Equations (194) and (199) represent the $105^{th}$ periodic function. Equations (204), (209) and (214) represent the $106^{th}$ periodic function. Equations (195), (200), (205) and (215) represent the $107^{th}$ periodic function. Equation (210) represents the $108^{th}$ periodic function.

According to embodiments of the present disclosure, the periodic functions corresponding to the predetermined color mode may include a $109^{th}$ periodic function corresponding to black, a $110^{th}$ periodic function corresponding to black, a $111^{st}$ periodic function corresponding to white, a $112^{th}$ periodic function corresponding to white, a $113^{th}$ periodic function corresponding to yellow, a $114^{th}$ periodic function corresponding to yellow, a $115^{th}$ periodic function corresponding to yellow, a $116^{th}$ periodic function corresponding to yellow, a $117^{th}$ periodic function corresponding to green, a $118^{th}$ periodic function corresponding to green, a $119^{th}$ periodic function corresponding to blue, and a $120^{th}$ periodic function corresponding to blue.

According to embodiments of the present disclosure, determining the target periodic functions corresponding to the plurality of predetermined colors from the one or more periodic functions corresponding to the plurality of predetermined colors according to the value range may include the following operations.

When it is determined that the value range is a fifty-fifth predetermined range, the $109^{th}$ periodic function corresponding to black is determined as the target periodic function corresponding to black from the $109^{th}$ periodic function corresponding to black and the $110^{th}$ periodic function corresponding to black, the $111^{st}$ periodic function corresponding to white is determined as the target periodic function corresponding to white from the $111^{st}$ periodic function corresponding to white and the $112^{th}$ periodic function corresponding to white, the $113^{th}$ periodic function corresponding to yellow is determined as the target periodic function corresponding to yellow from the $113^{th}$ periodic function corresponding to yellow, the $114^{th}$ periodic function corresponding to yellow, the $115^{th}$ periodic function corresponding to yellow and the $116^{th}$ periodic function corresponding to yellow, the $117^{th}$ periodic function corresponding to green is determined as the target periodic function corresponding to green from the $117^{th}$ periodic function corresponding to green and the $118^{th}$ periodic function corresponding to green, and the $119^{th}$ periodic function corresponding to blue is determined as the target periodic function corresponding to blue from the $119^{th}$ periodic function corresponding to blue and the $120^{th}$ periodic function corresponding to blue.

When it is determined that the value range is a fifty-sixth predetermined range, the $110^{th}$ periodic function corresponding to black is determined as the target periodic function corresponding to black from the $109^{th}$ periodic function corresponding to black and the $110^{th}$ periodic function corresponding to black, the $111^{st}$ periodic function corresponding to white is determined as the target periodic function corresponding to white from the $111^{st}$ periodic function corresponding to white and the $112^{th}$ periodic function corresponding to white, the $114^{th}$ periodic function corresponding to yellow is determined as the target periodic function corresponding to yellow from the $113^{th}$ periodic function corresponding to yellow, the $114^{th}$ periodic function corresponding to yellow, the $115^{th}$ periodic function corresponding to yellow and the $116^{th}$ periodic function corresponding to yellow, the $118^{th}$ periodic function corresponding to green is determined as the target periodic function corresponding to green from the $117^{th}$ periodic function corresponding to green and the $118^{th}$ periodic function corresponding to green, and the $119^{th}$ periodic function corresponding to blue is determined as the target periodic function corresponding to blue from the $119^{th}$ periodic function corresponding to blue and the $120^{th}$ periodic function corresponding to blue.

When it is determined that the value range is a fifty-seventh predetermined range, the $110^{th}$ periodic function corresponding to black is determined as the target periodic function corresponding to black from the $109^{th}$ periodic function corresponding to black and the $110^{th}$ periodic function corresponding to black, the $112^{th}$ periodic function corresponding to white is determined as the target periodic function corresponding to white from the $111^{st}$ periodic function corresponding to white and the $112^{th}$ periodic function corresponding to white, the $115^{th}$ periodic function corresponding to yellow is determined as the target periodic function corresponding to yellow from the $113^{th}$ periodic function corresponding to yellow, the $114^{th}$ periodic function corresponding to yellow, the $115^{th}$ periodic function corresponding to yellow and the $116^{th}$ periodic function corresponding to yellow, the $118^{th}$ periodic function corresponding to green is determined as the target periodic function corresponding to green from the $117^{th}$ periodic function corresponding to green and the $118^{th}$ periodic function corresponding to green, and the $119^{th}$ periodic function corresponding to blue is determined as the target periodic function corresponding to blue from the $119^{th}$ periodic function corresponding to blue and the $120^{th}$ periodic function corresponding to blue.

When it is determined that the value range is a fifty-eighth predetermined range, the $110^{th}$ periodic function corresponding to black is determined as the target periodic function corresponding to black from the $109^{th}$ periodic function corresponding to black and the $110^{th}$ periodic function corresponding to black, the $112^{th}$ periodic function corresponding to white is determined as the target periodic function corresponding to white from the $111^{st}$ periodic function corresponding to white and the $112^{th}$ periodic function corresponding to white, the $115^{th}$ periodic function corresponding to yellow is determined as the target periodic function corresponding to yellow from the $113^{th}$ periodic function corresponding to yellow, the $114^{th}$ periodic function corresponding to yellow, the $115^{th}$ periodic function corresponding to yellow and the $116^{th}$ periodic function corresponding to yellow, the $117^{th}$ periodic function corresponding to green is determined as the target periodic function corresponding to green from the $117^{th}$ periodic function corresponding to green and the $118^{th}$ periodic function corresponding to green, and the $120^{th}$ periodic function corresponding to blue is determined as the target periodic function corresponding to blue from the $119^{th}$ periodic function corresponding to blue and the $120^{th}$ periodic function corresponding to blue.

When it is determined that the value range is a fifty-ninth predetermined range, the $109^{th}$ periodic function corresponding to black is determined as the target periodic function corresponding to black from the $109^{th}$ periodic function corresponding to black and the $110^{th}$ periodic function corresponding to black, the $112^{th}$ periodic function corresponding to white is determined as the target periodic function corresponding to white from the $111^{st}$ periodic function corresponding to white and the $112^{th}$ periodic function corresponding to white, the $116^{th}$ periodic function corresponding to yellow is determined as the target periodic function corresponding to yellow from the $113^{th}$ periodic function corresponding to yellow, the $114^{th}$ periodic function corresponding to yellow, the $115^{th}$ periodic function corresponding to yellow and the $116^{th}$ periodic function corresponding to yellow, the $117^{th}$ periodic function corresponding to green is determined as the target periodic function corresponding to green from the $117^{th}$ periodic function corresponding to green and the $118^{th}$ periodic function corresponding to green, and the $119^{th}$ periodic function corresponding to blue is determined as the target periodic function corresponding to blue from the $119^{th}$ periodic function corresponding to blue and the $120^{th}$ periodic function corresponding to blue.

According to embodiments of the present disclosure, the fifty-fifth predetermined range, the fifty-sixth predetermined range, the fifty-seventh predetermined range, the fifty-eighth predetermined range and the fifty-ninth predetermined range may be set according to actual service needs and are not limited here. For example, the fifty-fifth predetermined range, the fifty-sixth predetermined range, the fifty-seventh predetermined range, the fifty-eighth predetermined range and the fifty-ninth predetermined range may cooperate with each other to be greater than or equal to 0 and less than or equal to 180. The fifty-fifth predetermined range may be greater than or equal to 0 and less than 30. The fifty-sixth predetermined range may be greater than or equal to 30 and less than 60. The fifty-seventh predetermined range may be greater than or equal to 60 and less than 90. The fifty-eighth predetermined range may be greater than or equal to 90 and less than 150. The fifty-ninth predetermined range may be greater than or equal to 150 and less than 180.

According to embodiments of the present disclosure, when it is determined that the value range is the fifty-fifth predetermined range, the $109^{th}$ periodic function may be determined as the target periodic function corresponding to black, the $11^{st}$ periodic function may be determined as the target periodic function corresponding to white, the $113^{th}$ periodic function is determined as the target periodic function corresponding to yellow, the $117^{th}$ periodic function is determined as the target periodic function corresponding to green, and the $119^{th}$ periodic function may be determined as the target periodic function corresponding to blue.

According to embodiments of the present disclosure, when it is determined that the value range is the fifty-sixth predetermined range, the $110^{th}$ periodic function may be determined as the target periodic function corresponding to black, the $111^{st}$ periodic function may be determined as the target periodic function corresponding to white, the $114^{th}$ periodic function is determined as the target periodic function corresponding to yellow, the $118^{th}$ periodic function is determined as the target periodic function corresponding to green, and the $119^{th}$ periodic function may be determined as the target periodic function corresponding to blue.

According to embodiments of the present disclosure, when it is determined that the value range is the fifty-seventh predetermined range, the $110^{th}$ periodic function may be determined as the target periodic function corresponding to black, the $112^{th}$ periodic function may be determined as the target periodic function corresponding to white, the $115^{th}$ periodic function is determined as the target periodic function corresponding to yellow, the $118^{th}$ periodic function is determined as the target periodic function corresponding to green, and the $119^{th}$ periodic function may be determined as the target periodic function corresponding to blue.

According to embodiments of the present disclosure, when it is determined that the value range is the fifty-eighth predetermined range, the $110^{th}$ periodic function may be determined as the target periodic function corresponding to black, the $112^{th}$ periodic function may be determined as the target periodic function corresponding to white, the $115^{th}$ periodic function is determined as the target periodic function corresponding to yellow, the $117^{th}$ periodic function is determined as the target periodic function corresponding to green, and the $120^{th}$ periodic function may be determined as the target periodic function corresponding to blue.

According to embodiments of the present disclosure, when it is determined that the value range is the fifty-ninth predetermined range, the $109^{th}$ periodic function may be determined as the target periodic function corresponding to black, the $112^{th}$ periodic function may be determined as the target periodic function corresponding to white, the $116^{th}$ periodic function is determined as the target periodic function corresponding to yellow, the $117^{th}$ periodic function is determined as the target periodic function corresponding to green, and the $119^{th}$ periodic function may be determined as the target periodic function corresponding to blue.

According to embodiments of the present disclosure, the plurality of predetermined colors include black, white, yellow, green and blue According to embodiments of the present disclosure, when the plurality of predetermined colors include black, white, yellow, green and blue, the periodic functions corresponding to the predetermined color mode may be determined according to Equations (218) to (242) below.

According to embodiments of the present disclosure, when $0 \leq x < 30$, the periodic functions corresponding to the predetermined color mode may be determined according to Equations (218) to (222) below.

$$p_{yellow6} = 0.5 * \frac{\cos\left[\left(\frac{x}{30}\right) * \pi\right] + B}{A} + \frac{\cos\left[\left(\frac{x-30}{30}\right) * \pi\right] + B}{A} \tag{218}$$

$$p_{green6} = 0 \tag{219}$$

$$p_{blue6} = 0 \tag{220}$$

$$p_{white14} = 0 \tag{221}$$

$$p_{black14} = 0.5 * \frac{\cos\left[\left(\frac{x}{30}\right) * \pi\right] + B}{A} \tag{222}$$

According to embodiments of the present disclosure, when $30 \leq x < 60$, the periodic functions corresponding to the predetermined color mode may be determined according to Equations (223) to (227) below.

$$p_{yellow6} = \frac{\cos\left[\left(\frac{x-30}{30}\right) * \pi\right] + B}{A} \tag{223}$$

$$p_{green6} = \frac{\cos\left[\left(\frac{x}{30}\right) * \pi\right] + B}{A} \tag{224}$$

$$p_{blue6} = 0 \tag{225}$$

$$p_{white14} = 0 \tag{226}$$

$$p_{black14} = 0 \tag{227}$$

According to embodiments of the present disclosure, when $60 \leq x < 90$, the periodic functions corresponding to the predetermined color mode may be determined according to Equations (228) to (232) below.

$$p_{yellow6} = 0 \tag{228}$$

$$p_{green6} = \frac{\cos\left[\left(\frac{x}{30}\right) * \pi\right] + B}{A} \tag{229}$$

$$p_{blue6} = 0 \tag{230}$$

$$p_{white14} = \frac{\cos\left[\left(\frac{x-30}{30}\right) * \pi\right] + B}{A} \tag{231}$$

$$p_{black14} = 0 \tag{232}$$

According to embodiments of the present disclosure, when $90 \leq x < 150$, the periodic functions corresponding to the predetermined color mode may be determined according to Equations (233) to (237) below.

$$p_{yellow6} = 0 \tag{233}$$

$$p_{green6} = 0 \tag{234}$$

$$p_{blue6} = \frac{\cos\left[\left(\frac{x}{30}\right) * \pi\right] + A}{B} \tag{235}$$

-continued $$p_{white14} = \frac{\cos\left[\left(\frac{x-30}{30}\right) * \pi\right] + B}{A} \tag{236}$$

$$p_{black14} = 0 \tag{237}$$

According to embodiments of the present disclosure, when $150 \leq x < 180$, the periodic functions corresponding to the predetermined color mode may be determined according to Equations (238) to (242) below.

$$p_{yellow6} = 0.5 * \frac{\cos\left[\left(\frac{x}{30}\right) * \pi\right] + B}{A} \tag{238}$$

$$p_{green6} = 0 \tag{239}$$

$$p_{blue6} = 0 \tag{240}$$

$$p_{white14} = \frac{\cos\left[\left(\frac{x-30}{30}\right) * \pi\right] + B}{A} \tag{241}$$

$$p_{black14} = 0.5 * \frac{\cos\left[\left(\frac{x}{30}\right) * \pi\right] + B}{A} \tag{242}$$

According to embodiments of the present disclosure, x may represent a first color component, $p_{yellow6}$ may represent a second probability corresponding to yellow, $p_{green6}$ may represent a second probability corresponding to green, $p_{blue6}$ may represent a second probability corresponding to blue, $p_{white14}$ may represent a second probability corresponding to white, $p_{black14}$ may represent a second probability corresponding to black, A may represent a first predetermined value, and B may represent a second predetermined value. A and B may cooperate with each other so that the second probability is greater than or equal to 0 and less than or equal to 1.

According to embodiments of the present disclosure, when x belongs to [0, 30), the probability of the predetermined color being black is [0.5, 0), the probability of the predetermined color being white is 0, the probability of the predetermined color being yellow is [0.5, 1), the probability of the predetermined color being green is 0, and the probability of the predetermined color being blue is 0.

According to embodiments of the present disclosure, when x belongs to [30, 60), the probability of the predetermined color being black is 0, the probability of the predetermined color being white is 0, the probability of the predetermined color being yellow is [1, 0), the probability of the predetermined color being green is [0, 1), and the probability of the predetermined color being blue is 0.

According to embodiments of the present disclosure, when x belongs to [60, 90), the probability of the predetermined color being black is 0, the probability of the predetermined color being white is [0, 1), the probability of the predetermined color being yellow is 0, the probability of the predetermined color being green is [1, 0), and the probability of the predetermined color being blue is 0.

According to embodiments of the present disclosure, when x belongs to [90, 120), the probability of the predetermined color being black is 0, the probability of the predetermined color being white is [1, 0), the probability of the predetermined color being yellow is 0, the probability of the predetermined color being green is 0, and the probability of the predetermined color being blue is [0, 1). When x belongs to [120, 150), the probability of the predetermined color being black is 0, the probability of the predetermined color being white is [0, 1), the probability of the predetermined color being yellow is 0, the probability of the predetermined color being green is 0, and the probability of the predetermined color being blue is [1, 0).

According to embodiments of the present disclosure, when x belongs to [150, 180), the probability of the predetermined color being black is [0, 0.5), the probability of the predetermined color being white is [1, 0), the probability of the predetermined color being yellow is [0, 0.5), the probability of the predetermined color being green is 0, and the probability of the predetermined color being blue is 0.

According to embodiments of the present disclosure, the fifty-fifth predetermined range is $0 \leq x < 30$, the fifty-sixth predetermined range is $30 \leq x < 60$, the fifty-seventh predetermined range is $60 \leq x < 90$, the fifty-eighth predetermined range is $90 \leq x < 150$, and the fifty-ninth predetermined range is $150 \leq x < 180$. Equations (222) and (242) represent the $109^{th}$ periodic function. Equations (227), (232) and (237) represent the $110^{th}$ periodic function. Equations (221) and (226) represent the $111^{st}$ periodic function. Equations (231), (236) and (241) represent the $112^{th}$ periodic function. Equation (218) represents the $113^{th}$ periodic function. Equation (223) represents the $114^{th}$ periodic function. Equations (228) and (233) represent the $115^{th}$ periodic function. Equation (238) represents the $116^{th}$ periodic function. Equation (219), (234) and (239) represent the $117^{th}$ periodic function. Equations (224) and (229) represent the $118^{th}$ periodic function. Equations (220), (225), (230) and (240) represent the $119^{th}$ periodic function. Equation (235) represents the $120^{th}$ periodic function.

According to embodiments of the present disclosure, the periodic functions corresponding to the predetermined color mode may include a $121^{st}$ periodic function corresponding to black, a $122^{nd}$ periodic function corresponding to white, a $123^{rd}$ periodic function corresponding to white, a $124^{th}$ periodic function corresponding to red, a $125^{th}$ periodic function corresponding to red, a $126^{th}$ periodic function corresponding to yellow, a $127^{th}$ periodic function corresponding to yellow, a $128^{th}$ periodic function corresponding to green, a $129^{th}$ periodic function corresponding to green, a $130^{th}$ periodic function corresponding to blue, and a $131^{st}$ periodic function corresponding to blue.

According to embodiments of the present disclosure, determining the target periodic functions corresponding to the plurality of predetermined colors from the one or more periodic functions corresponding to the plurality of predetermined colors according to the value range may include the following operations.

When it is determined that the value range is a sixtieth predetermined range, the $121^{st}$ periodic function corresponding to black is determined as the target periodic function corresponding to black from the $121^{st}$ periodic function corresponding to black, the $122^{nd}$ periodic function corresponding to white is determined as the target periodic function corresponding to white from the $122^{nd}$ periodic function corresponding to white and the $123^{rd}$ periodic function corresponding to white, the $124^{th}$ periodic function corresponding to red is determined as the target periodic function corresponding to red from the $124^{th}$ periodic function corresponding to red and the $125^{th}$ periodic function corresponding to red, the $126^{th}$ periodic function corresponding to yellow is determined as the target periodic function corresponding to yellow from the $126^{th}$ periodic function corresponding to yellow and the $127^{th}$ periodic function corresponding to yellow, the $128^{th}$ periodic function corresponding to green is determined as the target periodic function corresponding to green from the $128^{th}$ periodic function corresponding to green and the $129^{th}$ periodic function corresponding to green, and the $130^{th}$ periodic function corresponding to blue is determined as the target periodic function corresponding to blue from the $130^{th}$ periodic function corresponding to blue and the $131^{st}$ periodic function corresponding to blue.

When it is determined that the value range is a sixty-first predetermined range, the $121^{st}$ periodic function corresponding to black is determined as the target periodic function corresponding to black from the $121^{st}$ periodic function corresponding to black, the $122^{nd}$ periodic function corresponding to white is determined as the target periodic function corresponding to white from the $122^{nd}$ periodic function corresponding to white and the $123^{rd}$ periodic function corresponding to white, the $125^{th}$ periodic function corresponding to red is determined as the target periodic function corresponding to red from the $124^{th}$ periodic function corresponding to red and the $125^{th}$ periodic function corresponding to red, the $126^{th}$ periodic function corresponding to yellow is determined as the target periodic function corresponding to yellow from the $126^{th}$ periodic function corresponding to yellow and the $127^{th}$ periodic function corresponding to yellow, the $129^{th}$ periodic function corresponding to green is determined as the target periodic function corresponding to green from the $128^{th}$ periodic function corresponding to green and the $129^{th}$ periodic function corresponding to green, and the $130^{th}$ periodic function corresponding to blue is determined as the target periodic function corresponding to blue from the $130^{th}$ periodic function corresponding to blue and the $131^{st}$ periodic function corresponding to blue.

When it is determined that the value range is a sixty-second predetermined range, the $121^{st}$ periodic function corresponding to black is determined as the target periodic function corresponding to black from the $121^{st}$ periodic function corresponding to black, the $123^{rd}$ periodic function corresponding to white is determined as the target periodic function corresponding to white from the $122^{nd}$ periodic function corresponding to white and the $123^{rd}$ periodic function corresponding to white, the $125^{th}$ periodic function corresponding to red is determined as the target periodic function corresponding to red from the $124^{th}$ periodic function corresponding to red and the $125^{th}$ periodic function corresponding to red, the $127^{th}$ periodic function corresponding to yellow is determined as the target periodic function corresponding to yellow from the $126^{th}$ periodic function corresponding to yellow and the $127^{th}$ periodic function corresponding to yellow, the $129^{th}$ periodic function corresponding to green is determined as the target periodic function corresponding to green from the $128^{th}$ periodic function corresponding to green and the $129^{th}$ periodic function corresponding to green, and the $130^{th}$ periodic function corresponding to blue is determined as the target periodic function corresponding to blue from the $130^{th}$ periodic function corresponding to blue and the $131^{st}$ periodic function corresponding to blue.

When it is determined that the value range is a sixty-third predetermined range, the $121^{st}$ periodic function corresponding to black is determined as the target periodic function corresponding to black from the $121^{st}$ periodic function corresponding to black, the $123^{rd}$ periodic function corresponding to white is determined as the target periodic function corresponding to white from the $122^{nd}$ periodic function corresponding to white and the $123^{rd}$ periodic function corresponding to white, the $125^{th}$ periodic function corresponding to red is determined as the target periodic function corresponding to red from the $124^{th}$ periodic function corresponding to red and the $125^{th}$ periodic function corresponding to red, the $127^{th}$ periodic function corresponding to yellow is determined as the target periodic function corresponding to yellow from the $126^{th}$ periodic function corresponding to yellow and the $127^{th}$ periodic function corresponding to yellow, the $128^{th}$ periodic function corresponding to green is determined as the target periodic function corresponding to green from the $128^{th}$ periodic function corresponding to green and the $129^{th}$ periodic function corresponding to green, and the $131^{st}$ periodic function corresponding to blue is determined as the target periodic function corresponding to blue from the $130^{th}$ periodic function corresponding to blue and the $131^{st}$ periodic function corresponding to blue When it is determined that the value range is a sixty-fourth predetermined range, the $121^{st}$ periodic function corresponding to black is determined as the target periodic function corresponding to black from the $121^{st}$ periodic function corresponding to black, the $123^{rd}$ periodic function corresponding to white is determined as the target periodic function corresponding to white from the $122^{nd}$ periodic function corresponding to white and the $123^{rd}$ periodic function corresponding to white, the $124^{th}$ periodic function corresponding to red is determined as the target periodic function corresponding to red from the $124^{th}$ periodic function corresponding to red and the $125^{th}$ periodic function corresponding to red, the $127^{th}$ periodic function corresponding to yellow is determined as the target periodic function corresponding to yellow from the $126^{th}$ periodic function corresponding to yellow and the $127^{th}$ periodic function corresponding to yellow, the $128^{th}$ periodic function corresponding to green is determined as the target periodic function corresponding to green from the $128^{th}$ periodic function corresponding to green and the $129^{th}$ periodic function corresponding to green, and the $130^{th}$ periodic function corresponding to blue is determined as the target periodic function corresponding to blue from the $130^{th}$ periodic function corresponding to blue and the $131^{st}$ periodic function corresponding to blue According to embodiments of the present disclosure, the sixtieth predetermined range, the sixty-first predetermined range, the sixty-second predetermined range, the sixty-third predetermined range and the sixty-fourth predetermined range may be set according to actual service needs and are not limited here. For example, the sixtieth predetermined range, the sixty-first predetermined range, the sixty-second predetermined range, the sixty-third predetermined range and the sixty-fourth predetermined range may cooperate with each other to be greater than or equal to 0 and less than or equal to 180. The sixtieth predetermined range may be greater than or equal to 0 and less than 30. The sixty-first predetermined range may be greater than or equal to 30 and less than 60. The sixty-second predetermined range may be greater than or equal to 60 and less than 90. The sixty-third predetermined range may be greater than or equal to 90 and less than 150. The sixty-fourth predetermined range may be greater than or equal to 150 and less than 180.

According to embodiments of the present disclosure, when it is determined that the value range is the sixtieth predetermined range, the $121^{st}$ periodic function may be determined as the target periodic function corresponding to black, the $122^{nd}$ periodic function may be determined as the target periodic function corresponding to white, the $124^{th}$ periodic function is determined as the target periodic function corresponding to red, the $126^{th}$ periodic function is determined as the target periodic function corresponding to yellow, the $128^{th}$ periodic function may be determined as the target periodic function corresponding to green, and the $130^{th}$ periodic function may be determined as the target periodic function corresponding to blue.

According to embodiments of the present disclosure, when it is determined that the value range is the sixty-first predetermined range, the $121^{st}$ periodic function may be determined as the target periodic function corresponding to black, the $122^{nd}$ periodic function may be determined as the target periodic function corresponding to white, the $125^{th}$ periodic function is determined as the target periodic function corresponding to red, the $126^{th}$ periodic function is determined as the target periodic function corresponding to yellow, the $129^{th}$ periodic function may be determined as the target periodic function corresponding to green, and the $130^{th}$ periodic function may be determined as the target periodic function corresponding to blue.

According to embodiments of the present disclosure, when it is determined that the value range is the sixty-second predetermined range, the $121^{st}$ periodic function may be determined as the target periodic function corresponding to black, the $123^{rd}$ periodic function may be determined as the target periodic function corresponding to white, the $125^{th}$ periodic function is determined as the target periodic function corresponding to red, the $127^{th}$ periodic function is determined as the target periodic function corresponding to yellow, the $129^{th}$ periodic function may be determined as the target periodic function corresponding to green, and the $130^{th}$ periodic function may be determined as the target periodic function corresponding to blue.

According to embodiments of the present disclosure, when it is determined that the value range is the sixty-third predetermined range, the $121^{st}$ periodic function may be determined as the target periodic function corresponding to black, the $123^{rd}$ periodic function may be determined as the target periodic function corresponding to white, the $125^{th}$ periodic function is determined as the target periodic function corresponding to red, the $127^{th}$ periodic function is determined as the target periodic function corresponding to yellow, the $128^{th}$ periodic function may be determined as the target periodic function corresponding to green, and the $131^{st}$ periodic function may be determined as the target periodic function corresponding to blue.

According to embodiments of the present disclosure, when it is determined that the value range is the sixty-fourth predetermined range, the $121^{st}$ periodic function may be determined as the target periodic function corresponding to black, the $123^{rd}$ periodic function may be determined as the target periodic function corresponding to white, the $124^{th}$ periodic function is determined as the target periodic function corresponding to red, the $127^{th}$ periodic function is determined as the target periodic function corresponding to yellow, the $128^{th}$ periodic function may be determined as the target periodic function corresponding to green, and the $130^{th}$ periodic function may be determined as the target periodic function corresponding to blue.

According to embodiments of the present disclosure, the plurality of predetermined colors include black, white, red, yellow, green and blue.

According to embodiments of the present disclosure, when the plurality of predetermined colors include black, white, red, yellow, green and blue, the periodic functions corresponding to the predetermined color mode may be determined according to Equations (243) to (271) below.

According to embodiments of the present disclosure, when $0 \leq x < 30$, the periodic functions corresponding to the predetermined color mode may be determined according to Equations (243) to (248) below.

$$p_{red7} = \frac{\cos\left[\left(\frac{x}{30}\right)*\pi\right] + B}{A} \tag{243}$$

$$p_{yellow7} = \frac{\cos\left[\left(\frac{x-30}{30}\right)*\pi\right] + B}{A} \tag{244}$$

$$p_{green7} = 0 \tag{245}$$

$$p_{blue7} = 0 \tag{246}$$

$$p_{white15} = 0 \tag{247}$$

$$p_{black15} = 0 \tag{248}$$

According to embodiments of the present disclosure, when $30 \leq x < 60$, the periodic functions corresponding to the predetermined color mode may be determined according to Equations (249) to (253) below.

$$p_{yellow7} = \frac{\cos\left[\left(\frac{x-30}{30}\right)*\pi\right] + B}{A} \tag{249}$$

$$p_{green7} = \frac{\cos\left[\left(\frac{x}{30}\right)*\pi\right] + B}{A} \tag{250}$$

$$p_{blue7} = 0 \tag{251}$$

$$p_{white15} = 0 \tag{252}$$

$$p_{black15} = 0 \tag{253}$$

According to embodiments of the present disclosure, when $60 \leq x < 90$, the periodic functions corresponding to the predetermined color mode may be determined according to Equations (254) to (259) below.

$$p_{red7} = 0 \tag{254}$$

$$p_{yellow7} = 0 \tag{255}$$

$$p_{green7} = \frac{\cos\left[\left(\frac{x}{30}\right)*\pi\right] + B}{A} \tag{256}$$

$$p_{blue7} = 0 \tag{257}$$

$$p_{white15} = \frac{\cos\left[\left(\frac{x-30}{30}\right)*\pi\right] + B}{A} \tag{258}$$

$$p_{black15} = 0 \tag{259}$$

According to embodiments of the present disclosure, when $90 \leq x < 150$, the periodic functions corresponding to the predetermined color mode may be determined according to Equations (260) to (265) below.

$$p_{red7} = 0 \tag{260}$$

$$p_{yellow7} = 0 \tag{261}$$

$$p_{green7} = 0 \tag{262}$$

-continued $$p_{blue7} = \frac{\cos\left[\left(\frac{x}{30}\right)*\pi\right] + B}{A} \tag{263}$$

$$p_{white15} = \frac{\cos\left[\left(\frac{x-30}{30}\right)*\pi\right] + B}{A} \tag{264}$$

$$p_{black15} = 0 \tag{265}$$

According to embodiments of the present disclosure, when $150 \leq x < 180$, the periodic functions corresponding to the predetermined color mode may be determined according to Equations (266) to (271) below.

$$p_{blue7} = \frac{\cos\left[\left(\frac{x}{30}\right)*\pi\right] + B}{A} \tag{266}$$

$$p_{yellow7} = 0 \tag{267}$$

$$p_{green7} = 0 \tag{268}$$

$$p_{blue7} = 0 \tag{269}$$

$$p_{white15} = \frac{\cos\left[\left(\frac{x-30}{30}\right)*\pi\right] + B}{A} \tag{270}$$

$$p_{black15} = 0 \tag{271}$$

According to embodiments of the present disclosure, x may represent a first color component, $p_{red7}$ may represent a second probability corresponding to red, $p_{yellow7}$ may represent a second probability corresponding to yellow, $p_{green7}$ may represent a second probability corresponding to green, $p_{blue7}$ may represent a second probability corresponding to blue, $p_{white15}$ may represent a second probability corresponding to white, $p_{black15}$ may represent a second probability corresponding to black, A may represent a first predetermined value, and B may represent a second predetermined value. A and B may cooperate with each other so that the second probability is greater than or equal to 0 and less than or equal to 1.

According to embodiments of the present disclosure, the first predetermined value and the second predetermined value may be set according to actual service needs and are not limited here. For example, the first predetermined value may be 2, and the second predetermined value may be 1. The periodic functions corresponding to the predetermined color mode in a case of the plurality of predetermined colors including black, white, red, yellow, green, and blue will be described below with reference to FIG. 6D.

FIG. 6D schematically shows an example schematic diagram of a probability distribution corresponding to the predetermined color mode in a case of the plurality of predetermined colors including black, white, red, yellow, green and blue according to embodiments of the present disclosure.

As shown in FIG. 6D, in 600D, a point on a ring 607 may represent a probability of 1, a point on a ring 608 may represent a probability of 0, and a point between the ring 607 and the ring 608 may represent a probability of (0, 1).

$O_4A_4$-direction may represent that the first color component x is at 0 degrees, $O_4B_4$-direction may represent that the first color component x is at 30 degrees, $O_4C_4$-direction may represent that the first color component x is at 60 degrees, $O_4D_4$-direction may represent that the first color component x is at 90 degrees, $O_4E_4$-direction may represent that the first color component x is at 120 degrees, and $O_4F_4$-direction may represent that the first color component x is at 150 degrees.

From $O_4A_4$ to $O_4B_4$, that is, when x belongs to [0, 30), the probability of the predetermined color being red is [1, 0), the probability of the predetermined color being yellow is [0, 1), the probability of the predetermined color being blue is 0, the probability of the predetermined color being green is 0, the probability of the predetermined color being white is 0, and the probability of the predetermined color being black is 0.

From $O_4B_4$ to $O_4C_4$, that is, when x belongs to [30, 60), the probability of the predetermined color being red is 0, the probability of the predetermined color being yellow is [1, 0), the probability of the predetermined color being blue is 0, the probability of the predetermined color being green is [0, 1), the probability of the predetermined color being white is 0, and the probability of the predetermined color being black is 0.

From $O_4C_4$ to $O_4D_4$, that is, when x belongs to [60, 90), the probability of the predetermined color being red is 0, the probability of the predetermined color being yellow is 0, the probability of the predetermined color being blue is 0, the probability of the predetermined color being green is [1, 0), the probability of the predetermined color being white is [0, 1), and the probability of the predetermined color being black is 0.

From $O_4D_4$ to $O_4E_4$, that is, when x belongs to [90, 120), the probability of the predetermined color being red is 0, the probability of the predetermined color being yellow is 0, the probability of the predetermined color being blue is [0, 1), the probability of the predetermined color being green is 0, the probability of the predetermined color being white is [1, 0), and the probability of the predetermined color being black is 0.

From $O_4E_4$ to $O_4F_4$, that is, when x belongs to [120, 150), the probability of the predetermined color being red is 0, the probability of the predetermined color being yellow is 0, the probability of the predetermined color being blue is [1, 0), the probability of the predetermined color being green is 0, the probability of the predetermined color being white is [0, 1), and the probability of the predetermined color being black is 0.

From $O_4F_4$ to $O_4A_4$, that is, when x belongs to [150, 180), the probability of the predetermined color being red is [0, 1), the probability of the predetermined color being yellow is 0, the probability of the predetermined color being blue is 0, the probability of the predetermined color being green is 0, the probability of the predetermined color being white is [1, 0), and the probability of the predetermined color being black is 0.

According to embodiments of the present disclosure, the sixtieth predetermined range is $0 \le x < 30$, the sixty-first predetermined range is $30 \le x < 60$, the sixty-second predetermined range is $60 \le x < 90$, the sixty-third predetermined range is $90 \le x < 150$, and the sixty-fourth predetermined range is $150 \le x < 180$. Equations (248), (253), (259), (265) and (271) represent the $121^{st}$ periodic function. Equations (247) and (252) represent the $122^{nd}$ periodic function. Equations (258), (264) and (270) represent the $123^{rd}$ periodic function. Equations (243) and (266) represent the $124^{th}$ periodic function. Equations (254) and (260) represent the $125^{th}$ periodic function. Equations (244) and (249) represent the $126^{th}$ periodic function. Equations (255), (261) and (267) represent the $127^{th}$ periodic function. Equations (245), (262) and (268) represent the $128^{th}$ periodic function. Equations (250) and (256) represent the $129^{th}$ periodic function. Equations (246), (251), (257) and (269) represent the $130^{th}$ periodic function. Equation (263) represents the $131^{st}$ periodic function.

According to embodiments of the present disclosure, the periodic functions corresponding to the predetermined color mode may include $132^{nd}$ periodic function corresponding to black, a $133^{rd}$ periodic function corresponding to white, a $134^{th}$ periodic function corresponding to white, a $135^{th}$ periodic function corresponding tor ed, a $136^{th}$ periodic function corresponding to red, a $137^{th}$ periodic function corresponding to orange, a $138^{th}$ periodic function corresponding to orange, a $139^{th}$ periodic function corresponding to yellow, a $140^{th}$ periodic function corresponding to yellow, a $141^{st}$ periodic function corresponding to yellow, a $142^{nd}$ periodic function corresponding to green, a $143^{rd}$ periodic function corresponding to green, a $144^{th}$ periodic function corresponding to blue, and a $145^{th}$ periodic function corresponding to blue.

According to embodiments of the present disclosure, determining the target periodic functions corresponding to the plurality of predetermined colors from the one or more periodic functions corresponding to the plurality of predetermined colors according to the value range may include the following operations.

When it is determined that the value range is a sixty-fifth predetermined range, the $132^{nd}$ periodic function corresponding to black is determined as the target periodic function corresponding to black from the $132^{nd}$ periodic function corresponding to black, the $133^{rd}$ periodic function corresponding to white is determined as the target periodic function corresponding to white from the $133^{rd}$ periodic function corresponding to white and the $134^{th}$ periodic function corresponding to white, the $135^{th}$ periodic function corresponding to red is determined as the target periodic function corresponding to red from the $135^{th}$ periodic function corresponding to red and the $136^{th}$ periodic function corresponding to red, the $137^{th}$ periodic function corresponding to orange is determined as the target periodic function corresponding to orange from the $137^{th}$ periodic function corresponding to orange and the $138^{th}$ periodic function corresponding to orange, the $139^{th}$ periodic function corresponding to yellow is determined as the target periodic function corresponding to yellow from the $139^{th}$ periodic function corresponding to yellow, the $140^{th}$ periodic function corresponding to yellow and the $141^{st}$ periodic function corresponding to yellow, the $142^{nd}$ periodic function corresponding to green is determined as the target periodic function corresponding to green from the $142^{nd}$ periodic function corresponding to green and the $143^{rd}$ periodic function corresponding to green, and the $144^{th}$ periodic function corresponding to blue is determined as the target periodic function corresponding to blue from the $144^{th}$ periodic function corresponding to blue and the $145^{th}$ periodic function corresponding to blue.

When it is determined that the value range is a sixty-sixth predetermined range, the $132^{nd}$ periodic function corresponding to black is determined as the target periodic function corresponding to black from the $132^{nd}$ periodic function corresponding to black, the $133^{rd}$ periodic function corresponding to white is determined as the target periodic function corresponding to white from the $133^{rd}$ periodic function corresponding to white and the $134^{th}$ periodic function corresponding to white, the $136^{th}$ periodic function corresponding to red is determined as the target periodic function corresponding to red from the $135^{th}$ periodic function corresponding to red and the $136^{th}$ periodic function corresponding to red, the $137^{th}$ periodic function corresponding to orange is determined as the target periodic function corresponding to orange from the $137^{th}$ periodic function corresponding to orange and the $138^{th}$ periodic function corresponding to orange, the $140^{th}$ periodic function corresponding to yellow is determined as the target periodic function corresponding to yellow from the $139^{th}$ periodic function corresponding to yellow, the $140^{th}$ periodic function corresponding to yellow and the $141^{st}$ periodic function corresponding to yellow, the $142^{nd}$ periodic function corresponding to green is determined as the target periodic function corresponding to green from the $142^{nd}$ periodic function corresponding to green and the $143^{rd}$ periodic function corresponding to green, and the $144^{th}$ periodic function corresponding to blue is determined as the target periodic function corresponding to blue from the $144^{th}$ periodic function corresponding to blue and the $145^{th}$ periodic function corresponding to blue.

When it is determined that the value range is a sixty-seventh predetermined range, the $132^{nd}$ periodic function corresponding to black is determined as the target periodic function corresponding to black from the $132^{nd}$ periodic function corresponding to black, the $133^{rd}$ periodic function corresponding to white is determined as the target periodic function corresponding to white from the $133^{rd}$ periodic function corresponding to white and the $134^{th}$ periodic function corresponding to white, the $136^{th}$ periodic function corresponding to red is determined as the target periodic function corresponding to red from the $135^{th}$ periodic function corresponding to red and the $136^{th}$ periodic function corresponding to red, the $138^{th}$ periodic function corresponding to orange is determined as the target periodic function corresponding to orange from the $137^{th}$ periodic function corresponding to orange and the $138^{th}$ periodic function corresponding to orange, the $141^{st}$ periodic function corresponding to yellow is determined as the target periodic function corresponding to yellow from the $139^{th}$ periodic function corresponding to yellow, the $140^{th}$ periodic function corresponding to yellow and the $141^{st}$ periodic function corresponding to yellow, the $143^{rd}$ periodic function corresponding to green is determined as the target periodic function corresponding to green from the $142^{nd}$ periodic function corresponding to green and the $143^{rd}$ periodic function corresponding to green, and the $144^{th}$ periodic function corresponding to blue is determined as the target periodic function corresponding to blue from the $144^{th}$ periodic function corresponding to blue and the $145^{th}$ periodic function corresponding to blue.

When it is determined that the value range is a sixty-eighth predetermined range, the $132^{nd}$ periodic function corresponding to black is determined as the target periodic function corresponding to black from the $132^{nd}$ periodic function corresponding to black, the $134^{th}$ periodic function corresponding to white is determined as the target periodic function corresponding to white from the $133^{rd}$ periodic function corresponding to white and the $134^{th}$ periodic function corresponding to white, the $136^{th}$ periodic function corresponding to red is determined as the target periodic function corresponding to red from the $135^{th}$ periodic function corresponding to red and the $136^{th}$ periodic function corresponding to red, the $138^{th}$ periodic function corresponding to orange is determined as the target periodic function corresponding to orange from the $137^{th}$ periodic function corresponding to orange and the $138^{th}$ periodic function corresponding to orange, the $139^{th}$ periodic function corresponding to yellow is determined as the target periodic function corresponding to yellow from the $139^{th}$ periodic function corresponding to yellow, the $140^{th}$ periodic function corresponding to yellow and the $141^{st}$ periodic function corresponding to yellow, the $143^{rd}$ periodic function corresponding to green is determined as the target periodic function corresponding to green from the $142^{nd}$ periodic function corresponding to green and the $143^{rd}$ periodic function corresponding to green, and the $144^{th}$ periodic function corresponding to blue is determined as the target periodic function corresponding to blue from the $144^{th}$ periodic function corresponding to blue and the $145^{th}$ periodic function corresponding to blue.

When it is determined that the value range is a sixty-ninth predetermined range, the $132^{nd}$ periodic function corresponding to black is determined as the target periodic function corresponding to black from the $132^{nd}$ periodic function corresponding to black, the $134^{th}$ periodic function corresponding to white is determined as the target periodic function corresponding to white from the $133^{rd}$ periodic function corresponding to white and the $134^{th}$ periodic function corresponding to white, the $136^{th}$ periodic function corresponding to red is determined as the target periodic function corresponding to red from the $135^{th}$ periodic function corresponding to red and the $136^{th}$ periodic function corresponding to red, the $138^{th}$ periodic function corresponding to orange is determined as the target periodic function corresponding to orange from the $137^{th}$ periodic function corresponding to orange and the $138^{th}$ periodic function corresponding to orange, the $139^{th}$ periodic function corresponding to yellow is determined as the target periodic function corresponding to yellow from the $139^{th}$ periodic function corresponding to yellow, the $140^{th}$ periodic function corresponding to yellow and the $141^{st}$ periodic function corresponding to yellow, the $142^{nd}$ periodic function corresponding to green is determined as the target periodic function corresponding to green from the $142^{nd}$ periodic function corresponding to green and the $143^{rd}$ periodic function corresponding to green, and the $145^{th}$ periodic function corresponding to blue is determined as the target periodic function corresponding to blue from the $144^{th}$ periodic function corresponding to blue and the $145^{th}$ periodic function corresponding to blue.

When it is determined that the value range is a seventieth predetermined range, the $132^{nd}$ periodic function corresponding to black is determined as the target periodic function corresponding to black from the $132^{nd}$ periodic function corresponding to black, the $134^{th}$ periodic function corresponding to white is determined as the target periodic function corresponding to white from the $133^{rd}$ periodic function corresponding to white and the $134^{th}$ periodic function corresponding to white, the $135^{th}$ periodic function corresponding to red is determined as the target periodic function corresponding to red from the $135^{th}$ periodic function corresponding to red and the $136^{th}$ periodic function corresponding to red, the $138^{th}$ periodic function corresponding to orange is determined as the target periodic function corresponding to orange from the $137^{th}$ periodic function corresponding to orange and the $138^{th}$ periodic function corresponding to orange, the $139^{th}$ periodic function corresponding to yellow is determined as the target periodic function corresponding to yellow from the $139^{th}$ periodic function corresponding to yellow, the $140^{th}$ periodic function corresponding to yellow and the $141^{st}$ periodic function corresponding to yellow, the $142^{nd}$ periodic function corresponding to green is determined as the target periodic function corresponding to green from the $142^{nd}$ periodic function corresponding to green and the $143^{rd}$ periodic function corresponding to green, and the $144^{th}$ periodic function corresponding to blue is determined as the target periodic function corresponding to blue from the 144$^{th}$ periodic function corresponding to blue and the 145$^{th}$ periodic function corresponding to blue.

According to embodiments of the present disclosure, the sixty-fifth predetermined range, the sixty-sixth predetermined range, the sixty-seventh predetermined range, the sixty-eighth predetermined range, the sixty-ninth predetermined range and the seventieth predetermined range may be set according to actual service needs and are not limited here. For example, the sixty-fifth predetermined range, the sixty-sixth predetermined range, the sixty-seventh predetermined range, the sixty-eighth predetermined range, the sixty-ninth predetermined range and the seventieth predetermined range may cooperate with each other to be greater than or equal to 0 and less than or equal to 180. The sixty-fifth predetermined range may be greater than or equal to 0 and less than 15. The forty-sixth predetermined range may be greater than or equal to 15 and less than 30. The sixty-seventh predetermined range may be greater than or equal to 30 and less than 60. The sixty-eighth predetermined range may be greater than or equal to 60 and less than 90. The sixty-ninth predetermined range may be greater than or equal to 90 and less than 150. The seventieth predetermined range may be greater than or equal to 150 and less than 180.

According to embodiments of the present disclosure, when it is determined that the value range is the sixty-fifth predetermined range, the 132$^{nd}$ periodic function may be determined as the target periodic function corresponding to black, the 133$^{rd}$ periodic function may be determined as the target periodic function corresponding to white, the 135$^{th}$ periodic function is determined as the target periodic function corresponding to red, the 137$^{th}$ periodic function is determined as the target periodic function corresponding to orange, the 139$^{th}$ periodic function is determined as the target periodic function corresponding to yellow, the 142$^{nd}$ periodic function may be determined as the target periodic function corresponding to green, and the 144$^{th}$ periodic function is determined as the target periodic function corresponding to blue.

According to embodiments of the present disclosure, when it is determined that the value range is the sixty-sixth predetermined range, the 132$^{nd}$ periodic function may be determined as the target periodic function corresponding to black, the 133$^{rd}$ periodic function may be determined as the target periodic function corresponding to white, the 136$^{th}$ periodic function is determined as the target periodic function corresponding to red, the 137$^{th}$ periodic function is determined as the target periodic function corresponding to orange, the 140$^{th}$ periodic function is determined as the target periodic function corresponding to yellow, the 142$^{nd}$ periodic function may be determined as the target periodic function corresponding to green, and the 144$^{th}$ periodic function is determined as the target periodic function corresponding to blue.

According to embodiments of the present disclosure, when it is determined that the value range is the sixty-seventh predetermined range, the 132$^{nd}$ periodic function may be determined as the target periodic function corresponding to black, the 133$^{rd}$ periodic function may be determined as the target periodic function corresponding to white, the 136$^{th}$ periodic function is determined as the target periodic function corresponding to red, the 138$^{th}$ periodic function is determined as the target periodic function corresponding to orange, the 141$^{st}$ periodic function is determined as the target periodic function corresponding to yellow, the 143$^{rd}$ periodic function may be determined as the target periodic function corresponding to green, and the 144$^{th}$ periodic function is determined as the target periodic function corresponding to blue.

According to embodiments of the present disclosure, when it is determined that the value range is the sixty-eighth predetermined range, the 132$^{nd}$ periodic function may be determined as the target periodic function corresponding to black, the 134$^{th}$ periodic function may be determined as the target periodic function corresponding to white, the 136$^{th}$ periodic function is determined as the target periodic function corresponding to red, the 138$^{th}$ periodic function is determined as the target periodic function corresponding to orange, the 139$^{th}$ periodic function is determined as the target periodic function corresponding to yellow, the 143$^{rd}$ periodic function may be determined as the target periodic function corresponding to green, and the 144$^{th}$ periodic function is determined as the target periodic function corresponding to blue.

According to embodiments of the present disclosure, when it is determined that the value range is the sixty-ninth predetermined range, the 132$^{nd}$ periodic function may be determined as the target periodic function corresponding to black, the 134$^{th}$ periodic function may be determined as the target periodic function corresponding to white, the 136$^{th}$ periodic function is determined as the target periodic function corresponding to red, the 138$^{th}$ periodic function is determined as the target periodic function corresponding to orange, the 139$^{th}$ periodic function is determined as the target periodic function corresponding to yellow, the 142$^{nd}$ periodic function may be determined as the target periodic function corresponding to green, and the 145$^{th}$ periodic function is determined as the target periodic function corresponding to blue.

According to embodiments of the present disclosure, when it is determined that the value range is the seventieth predetermined range, the 132$^{nd}$ periodic function may be determined as the target periodic function corresponding to black, the 134$^{th}$ periodic function may be determined as the target periodic function corresponding to white, the 135$^{th}$ periodic function is determined as the target periodic function corresponding to red, the 138$^{th}$ periodic function is determined as the target periodic function corresponding to orange, the 139$^{th}$ periodic function is determined as the target periodic function corresponding to yellow, the 142$^{nd}$ periodic function may be determined as the target periodic function corresponding to green, and the 144$^{th}$ periodic function is determined as the target periodic function corresponding to blue.

According to embodiments of the present disclosure, the plurality of predetermined colors include black, white, red, orange, yellow, green and blue.

According to embodiments of the present disclosure, when the plurality of predetermined colors include black, white, red, orange, yellow, green and blue, the periodic functions corresponding to the predetermined color mode may be determined according to Equations (272) to (313) below.

According to embodiments of the present disclosure, when $0 \leq x < 15$, the periodic functions corresponding to the predetermined color mode may be determined according to Equations (272) to (278) below.

$$p_{red8} = \frac{\cos\left[\left(\frac{x}{15}\right) * \pi\right] + B}{A} \tag{272}$$

-continued $$p_{orange8} = \frac{\cos\left[\left(\frac{x-15}{15}\right) * \pi\right] + A}{B} \tag{273}$$

$$p_{yellow8} = 0 \tag{274}$$

$$p_{green8} = 0 \tag{275}$$

$$p_{blue8} = 0 \tag{276}$$

$$p_{white16} = 0 \tag{277}$$

$$p_{black16} = 0 \tag{278}$$

According to embodiments of the present disclosure, when $15 \leq x < 30$, the periodic functions corresponding to the predetermined color mode may be determined according to Equations (279) to (285) below.

$$p_{red8} = 0 \tag{279}$$

$$p_{orange8} = \frac{\cos\left[\left(\frac{x-15}{15}\right) * \pi\right] + A}{B} \tag{280}$$

$$p_{yellow8} = \frac{\cos\left[\left(\frac{x}{15}\right) * \pi\right] + B}{A} \tag{281}$$

$$p_{green8} = 0 \tag{282}$$

$$p_{blue8} = 0 \tag{283}$$

$$p_{white16} = 0 \tag{284}$$

$$p_{black16} = 0 \tag{285}$$

According to embodiments of the present disclosure, when $30 \leq x < 60$, the periodic functions corresponding to the predetermined color mode may be determined according to Equations (286) to (292) below.

$$p_{red8} = 0 \tag{286}$$

$$p_{orange8} = 0 \tag{287}$$

$$p_{yellow8} = \frac{\cos\left[\left(\frac{x-30}{30}\right) * \pi\right] + B}{A} \tag{288}$$

$$p_{green8} = \frac{\cos\left[\left(\frac{x}{30}\right) * \pi\right] + B}{A} \tag{289}$$

$$p_{blue8} = 0 \tag{290}$$

$$p_{white16} = 0 \tag{291}$$

$$p_{black16} = 0 \tag{292}$$

According to embodiments of the present disclosure, when $60 \leq x < 90$, the periodic functions corresponding to the predetermined color mode may be determined according to Equations (293) to (299) below.

$$p_{red8} = 0 \tag{293}$$

$$p_{orange8} = 0 \tag{294}$$

$$p_{yellow8} = 0 \tag{295}$$

-continued $$p_{green8} = \frac{\cos\left[\left(\frac{x}{30}\right) * \pi\right] + B}{A} \tag{296}$$

$$p_{blue8} = 0 \tag{297}$$

$$p_{white16} = \frac{\cos\left[\left(\frac{x-30}{30}\right) * \pi\right] + B}{A} \tag{298}$$

$$p_{black16} = 0 \tag{299}$$

According to embodiments of the present disclosure, when $90 \leq x < 150$, the periodic functions corresponding to the predetermined color mode may be determined according to Equations (300) to (306) below.

$$p_{red8} = 0 \tag{300}$$

$$p_{orange8} = 0 \tag{301}$$

$$p_{yellow8} = 0 \tag{302}$$

$$p_{green8} = 0 \tag{303}$$

$$p_{blue8} = \frac{\cos\left[\left(\frac{x}{30}\right) * \pi\right] + B}{A} \tag{304}$$

$$p_{white16} = \frac{\cos\left[\left(\frac{x-30}{30}\right) * \pi\right] + B}{A} \tag{305}$$

$$p_{black16} = 0 \tag{306}$$

According to embodiments of the present disclosure, when $150 \leq x < 180$, the periodic functions corresponding to the predetermined color mode may be determined according to Equations (307) to (313) below.

$$p_{red8} = \frac{\cos\left[\left(\frac{x}{30}\right) * \pi\right] + B}{A} \tag{307}$$

$$p_{orange8} = 0 \tag{308}$$

$$p_{yellow8} = 0 \tag{309}$$

$$p_{green8} = 0 \tag{310}$$

$$p_{blue8} = 0 \tag{311}$$

$$p_{white16} = \frac{\cos\left[\left(\frac{x-30}{30}\right) * \pi\right] + B}{A} \tag{312}$$

$$p_{black16} = 0 \tag{313}$$

According to embodiments of the present disclosure, x may represent a first color component, $p_{red8}$ may represent a second probability corresponding to red, $p_{orange8}$ may represent a second probability corresponding to orange, $p_{yellow8}$ may represent a second probability corresponding to yellow, $p_{green8}$, may represent a second probability corresponding to green, $p_{blue8}$ may represent a second probability corresponding to blue, $p_{white16}$ may represent a second probability corresponding to white, $p_{black16}$ may represent a second probability corresponding to black, A may represent a first predetermined value, and B may represent a second predetermined value. A and B may cooperate with each other so that the second probability is greater than or equal to 0 and less than or equal to 1.

According to embodiments of the present disclosure, the first predetermined value and the second predetermined value may be set according to actual service needs and are not limited here. For example, the first predetermined value may be 2, and the second predetermined value may be 1. The periodic functions corresponding to the predetermined color mode in a case of the plurality of predetermined colors including black, white, red, orange, yellow, green, and blue will be described below with reference to FIG. 6E.

FIG. 6E schematically shows an example schematic diagram of a probability distribution corresponding to the predetermined color mode in a case of the plurality of predetermined colors including black, white, red, orange, yellow, green, and blue according to embodiments of the present disclosure.

As shown in FIG. 6E, in 600E, a point on a ring 609 may represent a probability of 1, a point on a ring 610 may represent a probability of 0, and a point between the ring 609 and the ring 610 may represent a probability of (0, 1).

$O_5A_5$-direction may represent that the first color component x is at 0 degrees, $O_5G_5$-direction may represent that the first color component x is at 15 degrees, $O_5B_5$-direction may represent that the first color component x is at 30 degrees, $O_5C_5$-direction may represent that the first color component x is at 60 degrees, $O_5D_5$-direction may represent that the first color component x is at 90 degrees, $O_5E_5$-direction may represent that the first color component x is at 120 degrees, and $O_5F_5$-direction may represent that the first color component x is at 150 degrees.

From $O_5A_5$ to $O_5G_5$, that is, when x belongs to [0, 15), the probability of the predetermined color being red is [1, 0), the probability of the predetermined color being orange is [0, 1), the probability of the predetermined color being yellow is 0, the probability of the predetermined color being blue is 0, the probability of the predetermined color being green is 0, the probability of the predetermined color being white is 0, and the probability of the predetermined color being black is 0.

From $O_5G_5$ to $O_5B_5$, that is, when x belongs to [15, 30), the probability of the predetermined color being red is 0, the probability of the predetermined color being orange is [1, 0), the probability of the predetermined color being yellow is [0, 1), the probability of the predetermined color being blue is 0, the probability of the predetermined color being green is 0, the probability of the predetermined color being white is 0, and the probability of the predetermined color being black is 0.

From $O_5B_5$ to $O_5C_5$, that is, when x belongs to [30, 60), the probability of the predetermined color being red is 0, the probability of the predetermined color being orange is 0, the probability of the predetermined color being yellow is [1, 0), the probability of the predetermined color being blue is 0, the probability of the predetermined color being green is [0, 1), the probability of the predetermined color being white is 0, and the probability of the predetermined color being black is 0.

From $O_5C_5$ to $O_5D_5$, that is, when x belongs to [60, 90), the probability of the predetermined color being red is 0, the probability of the predetermined color being orange is 0, the probability of the predetermined color being yellow is 0, the probability of the predetermined color being blue is 0, the probability of the predetermined color being green is [1, 0), the probability of the predetermined color being white is [0, 1), and the probability of the predetermined color being black is 0.

From $O_5D_5$ to $O_5E_5$, that is, when x belongs to [90, 120), the probability of the predetermined color being red is 0, the probability of the predetermined color being orange is 0, the probability of the predetermined color being yellow is 0, the probability of the predetermined color being blue is [0, 1), the probability of the predetermined color being green is 0, the probability of the predetermined color being white is [1, 0), and the probability of the predetermined color being black is 0.

From $O_5E_5$ to $O_5F_5$, that is, when x belongs to [120, 150), the probability of the predetermined color being red is 0, the probability of the predetermined color being orange is 0, the probability of the predetermined color being yellow is 0, the probability of the predetermined color being blue is [1, 0), the probability of the predetermined color being green is 0, the probability of the predetermined color being white is [0, 1), and the probability of the predetermined color being black is 0.

From $O_5F_5$ to $O_5A_5$, that is, when x belongs to [150, 180), the probability of the predetermined color being red is [0, 1), the probability of the predetermined color being orange is 0, the probability of the predetermined color being yellow is 0, the probability of the predetermined color being blue is 0, the probability of the predetermined color being green is 0, the probability of the predetermined color being white is [1, 0), and the probability of the predetermined color being black is 0.

According to embodiments of the present disclosure, the sixty-fifth predetermined range is $0 \leq x < 15$, the sixty-sixth predetermined range is $15 \leq x < 30$, the sixty-seventh predetermined range is $30 \leq x < 60$, the sixty-eighth predetermined range is $60 \leq x < 90$, the sixty-ninth predetermined range is $90 \leq x < 150$, and the seventieth predetermined range is $150 \leq x < 180$. Equations (278), (285), (292), (299), (306) and (313) represent the $132^{nd}$ periodic function. Equations (277), (284) and (291) represent the $133^{rd}$ periodic function. Equations (298), (305) and (312) represent the $134^{th}$ periodic function. Equations (272) and (307) represent the $135^{th}$ periodic function. Equations (279), (286), (293) and (300) represent the $136^{th}$ periodic function. Equations (273) and (280) represent the $137^{th}$ periodic function. Equations (287), (294), (301) and (308) represent the $138^{th}$ periodic function. Equations (274), (295), (302) and (309) represent the $139^{th}$ periodic function. Equation (281) represents the $140^{th}$ periodic function. Equation (288) represents the $141^{st}$ periodic function. Equation (282), (303) and (310) represent the $142^{nd}$ periodic function. Equations (289) and (296) represent the $143^{rd}$ periodic function. Equations (276), (283), (290), (297) and (311) represent the $144^{th}$ periodic function. Equation (304) represent the $145^{th}$ periodic function.

According to embodiments of the present disclosure, operation S220 may include the following operations.

For a pixel among the one or more pixels, a difference value between the second rendering color of the pixel and the original rendering color of the pixel is determined, so as to obtain a difference value corresponding to the pixel. The second rendering color of the pixel is adjusted according to the difference value corresponding to the pixel, so as to obtain the third rendering color of the pixel.

According to embodiments of the present disclosure, after the second rendering color of the one or more pixels is obtained, for a pixel among the one or more pixels, the second rendering color of the pixel may be adjusted according to the second rendering color and the original rendering color of the pixel based on an error diffusion algorithm, so as to obtain the third rendering color of the pixel. The error diffusion algorithm may include at least one of Floyd-Steinberg error diffusion algorithm or Jarris Judice-Ninke error diffusion algorithm.

According to embodiments of the present disclosure, the one or more pixels may be traversed. A traversal trajectory may include at least one of: a row by row traversal, a column by column traversal, or a "⌐" shaped traversal. In the row by row traversal, a traversal in a row is performed in an ascending order of column numbers. In the column by column traversal, a traversal in a column is performed in an ascending order of row numbers. In the "⌐" shaped traversal, a traversal is performed along "⌐" shaped trajectory.

According to embodiments of the present disclosure, an initial difference value between the second rendering color of the pixel and the original rendering color of the pixel may be determined using Equations (314) to (316) as follows.

$$ErrorR = R_0 - R_0' \tag{314}$$

$$ErrorG = G_0 - G_0' \tag{315}$$

$$ErrorB = B_0 - B_0' \tag{316}$$

According to embodiments of the present disclosure, $R_0$ may represent a red component of the original rendering color of the pixel, $R_0'$ may represent a red component of the second rendering color of the pixel, ErrorR may represent an initial difference value of red components of the pixel, $G_0$ may represent a green component of the original rendering color of the pixel, $G_0'$ may represent a green component of the second rendering color of the pixel, ErrorG may represent an initial difference value of green components of the pixel, $B_0$ may represent a blue component of the original rendering color of the pixel, $B_0'$ may represent a blue component of the second rendering color of the pixel, ErrorB may represent an initial difference value of blue components of the pixel, According to embodiments of the present disclosure, after obtaining the initial difference value of red components, the initial difference value of green components and the initial difference value of blue components of the pixel, it is possible to truncate an accuracy of a difference value of red components, an accuracy of a difference value of green components and an accuracy of a difference value of blue components through Norm by using Equations (317) to (319) below, so as to obtain the difference value of red components, the difference value of green components and the difference value of blue components of the pixel.

$$ErrorR' = \frac{floor(ErrorR * Norm)}{Norm} \tag{317}$$

$$ErrorG' = \frac{floor(ErrorG * Norm)}{Norm} \tag{318}$$

$$ErrorB' = \frac{floor(ErrorB * Norm)}{Norm} \tag{319}$$

According to embodiments of the present disclosure, floor( ) may represent a flooring function, ErrorR' may represent a difference value of red components, ErrorG' may represent a difference value of green components, ErrorB' may represent a difference value of blue components, Norm may represent an integer between a first predetermined threshold and a second predetermined threshold. The first predetermined threshold and the second predetermined threshold may be set according to actual service needs and are not limited here. For example, the first predetermined threshold may be 40, and the second predetermined threshold may be 128.

According to embodiments of the present disclosure, after the difference value corresponding to the pixel is obtained, the second rendering color of the pixel may be adjusted according to the difference value corresponding to the pixel, so as to obtain the third rendering color of the pixel. For example, it is possible to diffuse the difference value corresponding to the pixel using a 5×5 diffusion window. ErrorR' may be diffused in an R channel, ErrorG' may be diffused in a G channel, and ErrorB' may be diffused in a B channel. A process of adjusting the second rendering color of the pixel according to the difference value corresponding to the pixel to obtain the third rendering color of the pixel will be described below with reference to FIG. 7.

According to embodiments of the present disclosure, the third rendering color is obtained by adjusting the second rendering color of the pixel according to the difference value corresponding to the pixel, and the difference value corresponding to the pixel is determined according to the second rendering color and the original rendering color of the pixel, so that a range of color jitter may be reduced, a graininess of a mapped image may be improved, and a color saturation may be increased.

FIG. 7 schematically shows an example schematic diagram of a process of adjusting a second rendering color of one or more pixels to obtain a third rendering color of the one or more pixels according to the second rendering color and an original rendering color of the one or more pixels, according to embodiments of the present disclosure.

As shown in FIG. 7, in 700, M may represent a pixel currently being processed. A diffusion window of the Jarris Judice-Ninke error diffusion algorithm may be set according to actual service needs and is not limited here. For example, the diffusion window may be set as shown in Expression (320) below.

$$\frac{1}{48}\begin{bmatrix} & M & 75 \\ 35 & 7 & 53 \\ 13 & 5 & 31 \end{bmatrix} \tag{320}$$

In this case, an error diffusion may be performed on display data of unconverted pixels around the pixel M based on the diffusion window in Expression (320).

For example, if twelve pixels around the pixel M are not converted, then for a first pixel on a right side of the pixel M, the second rendering color of that first pixel may be adjusted by diffusing 7/48ErrorR' in the R channel, diffusing 7/48ErrorG' in the G channel, and diffusing 7/48ErrorB' in the B channel. For a second pixel on the right side of the pixel M, the second rendering color of that second pixel may be adjusted by diffusing 5/48ErrorR' in the R channel, diffusing 5/48ErrorG' in the G channel, and diffusing 5/48ErrorB' in the B channel.

For a first pixel on a lower side of the pixel M, the second rendering color of that first pixel may be adjusted by diffusing 7/48ErrorR' in the R channel, diffusing 7/48ErrorG' in the G channel, and diffusing 7/48ErrorB' in the B channel. For a second pixel on the lower side of the pixel M, the second rendering color of that second pixel may be adjusted by diffusing 5/48ErrorR' in the R channel, diffusing 5/48ErrorG' in the G channel, and diffusing 5/48ErrorB' in the B channel.

Similarly, an error diffusion may be performed on the display data of unconverted pixels around the pixel M based on the diffusion window in Expression (320).

FIG. 8 schematically shows an example schematic diagram of an original image and a target image according to embodiments of the present disclosure.

As shown in FIG. 8, in 800, an original image 801 may be processed using the method of processing the image provided in embodiments of the present disclosure, so as to obtain a target image 802. The method of processing the image provided in embodiments of the present disclosure may enhance an image boundary of the original image 801 and improve a visual effect of the original image 801.

The above are just exemplary embodiments. The present disclosure is not limited to the above and may further include other image processing methods known in the art, as long as the color richness of the target image and the display quality of the target image are improved.

FIG. 9 schematically shows a block diagram of an apparatus of processing an image according to embodiments of the present disclosure.

As shown in FIG. 9, an apparatus 900 of processing an image may include a determination module 910, an adjustment module 920, and an obtaining module 930.

The determination module 910 is used to determine, based on a predetermined color mode, a second rendering color of one or more pixels of an original image according to a first rendering color of the one or more pixels of the original image. The first rendering color corresponds to a first color space, and the second rendering color corresponds to a second color space.

The adjustment module 920 is used to adjust the second rendering color of the one or more pixels according to the second rendering color of the one or more pixels and an original rendering color of the one or more pixels, so as to obtain a third rendering color of the one or more pixels. The original rendering color and the third rendering color correspond to the second color space, and the first rendering color is obtained by performing a color space conversion on the original rendering color.

The obtaining module 930 is used to obtain a target image according to the third rendering color of the one or more pixels. A region corresponding to a visual saliency region of the original image in the target image has a color corresponding to the predetermined color mode.

According to embodiments of the present disclosure, the determination module 910 may include a first determination sub-module.

The first determination sub-module is used to determine, based on a color association corresponding to the predetermined color mode, the second rendering color of the one or more pixels of the original image according to a first color component of the one or more pixels of the original image. The first color component represents a first component of the first rendering color, and the color association represents an association between the first color component and the second rendering color.

According to embodiments of the present disclosure, the determination module 910 may include a second determination sub-module and a third determination sub-module.

The second determination sub-module is used to determine a region to be adjusted in the original image.

The third determination sub-module is used to determine, based on the predetermined color mode, the second rendering color of one or more pixels in the region to be adjusted according to the first rendering color of the one or more pixels in the region to be adjusted.

According to embodiments of the present disclosure, the predetermined color mode corresponds to a plurality of predetermined colors; and According to embodiments of the present disclosure, the first determination sub-module may include a first determination unit, a second determination unit, and a third determination unit.

The first determination unit is used to determine, based on the color association corresponding to the predetermined color mode, a plurality of first probabilities corresponding to the one or more pixels according to the first color component of the one or more pixels of the original image. The first probability represents a probability of the second rendering color of the pixel being the predetermined color.

The second determination unit is used to determine a target probability corresponding to the one or more pixels according to the plurality of first probabilities corresponding to the one or more pixels.

The third determination unit is used to determine the second rendering color of the one or more pixels according to the target probability corresponding to the one or more pixels.

According to embodiments of the present disclosure, the second determination unit may include a first determination sub-unit and a second determination sub-unit.

The first determination sub-unit is used to determine an average probability corresponding to the one or more pixels from the plurality of first probabilities corresponding to the one or more pixels.

The second determination sub-unit is used to determine the average probability corresponding to the one or more pixels as the target probability corresponding to the one or more pixels.

According to embodiments of the present disclosure, the second determination unit may include a third determination sub-unit and a fourth determination sub-unit.

The third determination sub-unit is used to determine a maximum probability corresponding to the one or more pixels from the plurality of first probabilities corresponding to the one or more pixels.

The fourth determination sub-unit is used to determine the maximum probability corresponding to the one or more pixels as the target probability corresponding to the one or more pixels.

According to embodiments of the present disclosure, the first determination unit may include a fifth determination sub-unit and a sixth determination sub-unit.

The fifth determination sub-unit is used to determine, based on the color association corresponding to the predetermined color mode, a plurality of second probabilities corresponding to the one or more pixels according to the first color component of the one or more pixels of the original image.

The sixth determination sub-unit is used to determine the plurality of first probabilities corresponding to the one or more pixels according to the plurality of second probabilities corresponding to the one or more pixels and one or more first other color components, where the first other color component represents any of other components than the first component in the first rendering color.

According to embodiments of the present disclosure, the plurality of predetermined colors include black, white and at least one other color. The plurality of second probabilities may include a second probability corresponding to black, a second probability corresponding to white, and a second probability corresponding to the at least one other color. The one or more first other color components may include a second color component and a third color component.

According to embodiments of the present disclosure, the sixth determination sub-unit may be used to: for a pixel among the one or more pixels, obtain a first intermediate value corresponding to black according to the second color component of the pixel and the second probability corresponding to black; obtain the first probability corresponding to black according to the third color component of the pixel and the first intermediate value corresponding to black, where the first probability corresponding to black represents a probability of the second rendering color of the pixel being black; obtain a second intermediate value corresponding to white according to the second color component of the pixel and the second probability corresponding to white; obtain the first probability corresponding to white according to the third color component of the pixel and the second intermediate value corresponding to white, where the first probability corresponding to white represents a probability of the second rendering color of the pixel being white; and obtain the first probability corresponding to the at least one other color according to the second color component of the pixel, the third color component of the pixel, and the second probability corresponding to the at least one other color, where the first probability corresponding to any of the at least one other color represents a probability of the second rendering color of the pixel being the any of the at least one other color.

According to embodiments of the present disclosure, the fifth determination sub-unit may be used to: process the first color component of the one or more pixels of the original image based on one or more periodic functions corresponding to the predetermined color mode, so as to obtain the plurality of second probabilities corresponding to the one or more pixels. The one or more periodic functions corresponding to the predetermined color mode is used to determine the color association corresponding to the predetermined color mode.

According to embodiments of the present disclosure, the periodic functions corresponding to the predetermined color mode may include one or more periodic functions corresponding to each of the plurality of predetermined colors.

According to embodiments of the present disclosure, the processing the first color component of the one or more pixels of the original image based on one or more periodic functions corresponding to the predetermined color mode so as to obtain the plurality of second probabilities corresponding to the one or more pixels may include: for a pixel among the one or more pixels of the original image, determining a value range corresponding to the first color component of the pixel; determining, from the one or more periodic functions corresponding to each of the plurality of predetermined colors, a target periodic function corresponding to that of the plurality of predetermined colors according to the value range; and processing the first color component of the pixel based on the target periodic function corresponding to that of the plurality of predetermined colors, so as to obtain the plurality of second probabilities corresponding to the pixel.

According to embodiments of the present disclosure, the adjustment module 920 may include a fourth determination sub-module and an adjustment sub-module.

The fourth determination sub-module is used to determine a difference value between the second rendering color of the pixel and the original rendering color of the pixel, so as to obtain a difference value corresponding to the pixel.

The adjustment sub-module is used to adjust the second rendering color of the pixel according to the difference value corresponding to the pixel, so as to obtain the third rendering color of the pixel.

Any number of the modules, sub-modules, units, and sub-units according to embodiments of the present disclosure, or at least part of functions of any number of them may be implemented in one module. Any one or more of the modules, sub-modules, units, and sub-units according to embodiments of the present disclosure may be split into a plurality of modules for implementation. Any one or more of the modules, sub-modules, units, and sub-units according to embodiments of the present disclosure may be implemented at least partially as a hardware circuit, such as a field programmable gate array (FPGA), a programmable logic array (PLA), a system on a chip, a system on a substrate, a system on a package, an application specific integrated circuit (ASIC), or may be implemented by hardware or firmware in any other reasonable manner of integrating or encapsulating the circuit, or may be implemented by any one of three implementation modes of software, hardware and firmware or an appropriate combination thereof. Alternatively, one or more of the modules, sub-modules, units, and sub-units according to embodiments of the present disclosure may be at least partially implemented as a computer program module that, when executed, performs the corresponding functions.

For example, any number of the determination module 910, the adjustment module 920 and the obtaining module 930 may be combined into one module/unit/sub-unit for implementation, or any one of the modules/units/sub-units may be divided into a plurality of modules/units/sub-units. Alternatively, at least part of the functions of one or more of these modules/units/sub-units may be combined with at least part of the functions of other modules/units/sub-units and implemented in one module/unit/sub-unit. According to embodiments of the present disclosure, at least one of the determination module 910, the adjustment module 920 and the obtaining module 930 may be implemented at least partially as a hardware circuit, such as a field programmable gate array (FPGA), a programmable logic array (PLA), a system on a chip, a system on a substrate, a system on a package, an application specific integrated circuit (ASIC), or may be implemented by hardware or firmware in any other reasonable manner of integrating or encapsulating the circuit, or may be implemented by any one of the three implementation modes of software, hardware and firmware or an appropriate combination thereof. Alternatively, at least one of the determination module 910, the adjustment module 920 and the obtaining module 930 may be at least partially implemented as a computer program module that may perform corresponding functions when executed.

It should be noted that a part for the apparatus of processing the image in embodiments of the present disclosure corresponds to a part for the method of processing the image in embodiments of the present disclosure. For the descriptions of the apparatus of processing the image, reference may be made to the method of processing the image, and details will not be repeated here.

FIG. 10 schematically shows a block diagram of an electronic device suitable for implementing the method of processing the image according to embodiments of the present disclosure. The electronic device shown in FIG. 10 is just an example, and should not bring any limitation to functions and scopes of use of embodiments of the present disclosure.

As shown in FIG. 10, a computer electronic device 1000 according to embodiments of the present disclosure includes a processor 1001, which may execute various appropriate actions and processing according to the program stored in a read only memory (ROM) 1002 or the program loaded into a random access memory (RAM) 1003 from a storage part 1008. The processor 1001 may, for example, include a general-purpose microprocessor (for example, CPU), an instruction set processor and/or a related chipset and/or a special-purpose microprocessor (for example, an application specific integrated circuit (ASIC)), and the like. The processor 1001 may further include an on-board memory for caching purposes. The processor 1001 may include a single processing unit or multiple processing units for executing different actions of the method flow according to embodiments of the present disclosure.

Various programs and data required for the operation of the electronic device 1000 are stored in the RAM 1003. The processor 1001, the ROM 1002 and the RAM 1003 are connected to each other through a bus 1004. The processor 1001 executes various operations of the method flow according to embodiments of the present disclosure by executing the programs in the ROM 1002 and/or the RAM 1003. It should be noted that the program may also be stored in one or more memories other than the ROM 1002 and the RAM 1003. The processor 1001 may also execute various operations of the method flow according to embodiments of the present disclosure by executing the programs stored in the one or more memories.

According to embodiments of the present disclosure, the electronic device 1000 may further include an input/output (I/O) interface 1005 which is also connected to the bus 1004. The electronic device 1000 may further include one or more of the following components connected to the I/O interface 1005: an input part 1006 including a keyboard, a mouse, etc.; an output part 1007 including a cathode ray tube (CRT), a liquid crystal display (LCD), etc. and a speaker, etc.; a storage part 1008 including a hard disk, etc.; and a communication part 1009 including a network interface card such as a LAN card, a modem, and the like. The communication part 1009 performs communication processing via a network such as the Internet. A drive 1110 is also connected to the I/O interface 1005 as required. A removable medium 1011, such as a magnetic disk, an optical disk, a magneto-optical disk, a semiconductor memory, and the like, is installed on the drive 1110 as required, so that the computer program read therefrom is installed into the storage part 1008 as needed.

The method flow according to embodiments of the present disclosure may be implemented as a computer software program. For example, embodiments of the present disclosure include a computer program product including a computer program carried on a computer-readable storage medium. The computer program includes a program code for execution of the method shown in the flowchart. In such embodiments, the computer program may be downloaded and installed from the network through the communication part 1009, and/or installed from the removable medium 1011. When the computer program is executed by the processor 1001, the above-mentioned functions defined in the system of embodiments of the present disclosure are performed. According to embodiments of the present disclosure, the above-described systems, apparatuses, devices, modules, units, etc. may be implemented by computer program modules.

The present disclosure further provides a computer-readable storage medium, which may be included in the apparatus/device/system described in the above embodiments; or exist alone without being assembled into the apparatus/device/system. The above-mentioned computer-readable storage medium carries one or more programs that when executed, perform the methods according to embodiments of the present disclosure.

According to embodiments of the present disclosure, the computer-readable storage medium may be a non-transitory computer-readable storage medium, for example, may include but not limited to: a portable computer disk, a hard disk, a random access memory (RAM), a read-only memory (ROM), an erasable programmable read-only memory (EPROM or flash memory), a portable compact disk read-only memory (CD-ROM), an optical storage device, a magnetic storage device, or any suitable combination of the above. In the present disclosure, the computer-readable storage medium may be any tangible medium that contains or stores programs that may be used by or in combination with an instruction execution system, apparatus or device.

For example, according to embodiments of the present disclosure, the computer-readable storage medium may include the above-mentioned ROM 1002 and/or RAM 1003 and/or one or more memories other than the ROM 1002 and RAM 1003.

Embodiments of the present disclosure further include a computer program product, which contains a computer program. The computer program contains program code for performing the method provided by the embodiments of the present disclosure. When the computer program product runs on an electronic device, the program code causes the electronic device to implement the method of processing the image provided in embodiments of the present disclosure.

When the computer program is executed by the processor 1001, the above-mentioned functions defined in the system/apparatus of the embodiments of the present disclosure are performed. According to the embodiments of the present disclosure, the above-described systems, apparatuses, modules, units, etc. may be implemented by computer program modules.

In an embodiment, the computer program may rely on a tangible storage medium such as an optical storage device and a magnetic storage device. In another embodiment, the computer program may also be transmitted and distributed in the form of signals on a network medium, downloaded and installed through the communication part 1009, and/or installed from the removable medium 1011. The program code contained in the computer program may be transmitted by any suitable medium, including but not limited to a wireless one, a wired one, or any suitable combination of the above.

According to the embodiments of the present disclosure, the program code for executing the computer programs provided by the embodiments of the present disclosure may be written in any combination of one or more programming languages. In particular, these computing programs may be implemented using high-level procedures and/or object-oriented programming languages, and/or assembly/machine languages. Programming languages include, but are not limited to, Java, C++, Python, "C" language or similar programming languages. The program code may be completely executed on the user computing device, partially executed on the user device, partially executed on the remote computing device, or completely executed on the remote computing device or server. In a case of involving a remote computing device, the remote computing device may be connected to a user computing device through any kind of network, including a local area network (LAN) or a wide area network (WAN), or may be connected to an external computing device (e.g., through the Internet using an Internet service provider).

The flowcharts and block diagrams in the accompanying drawings illustrate the possible architecture, functions, and operations of the system, method, and computer program product according to various embodiments of the present disclosure. In this regard, each block in the flowcharts or block diagrams may represent a part of a module, a program segment, or a code, which part includes one or more executable instructions for implementing the specified logical function. It should be further noted that, in some alternative implementations, the functions noted in the blocks may also occur in a different order from that noted in the accompanying drawings. For example, two blocks shown in succession may actually be executed substantially in parallel, or they may sometimes be executed in a reverse order, depending on the functions involved. It should be further noted that each block in the block diagrams or flowcharts, and the combination of blocks in the block diagrams or flowcharts, may be implemented by a dedicated hardware-based system that performs the specified functions or operations, or may be implemented by a combination of dedicated hardware and computer instructions. Those skilled in the art may understand that the various embodiments of the present disclosure and/or the features described in the claims may be combined in various ways, even if such combinations are not explicitly described in the present disclosure. In particular, without departing from the spirit and teachings of the present disclosure, the various embodiments of the present disclosure and/or the features described in the claims may be combined in various ways. All these combinations fall within the scope of the present disclosure.

Embodiments of the present disclosure have been described above. However, these embodiments are for illustrative purposes only, and are not intended to limit the scope of the present disclosure. Although the various embodiments have been described separately above, this does not mean that measures in the respective embodiments may not be used in combination advantageously. The scope of the present disclosure is defined by the appended claims and their equivalents. Those skilled in the art may make various substitutions and modifications without departing from the scope of the present disclosure, and these substitutions and modifications should all fall within the scope of the present disclosure.

What is claimed is:

1. A method of processing an image, comprising:
determining, based on a predetermined color mode, a second rendering color of one or more pixels of an original image according to a first rendering color of the one or more pixels of the original image, wherein the first rendering color corresponds to a first color space, and the second rendering color corresponds to a second color space;
adjusting the second rendering color of the one or more pixels according to the second rendering color of the one or more pixels and an original rendering color of the one or more pixels, so as to obtain a third rendering color of the one or more pixels, wherein the original rendering color and the third rendering color correspond to the second color space, and the first rendering color is obtained by performing a color space conversion on the original rendering color; and
obtaining a target image according to the third rendering color of the one or more pixels, wherein a region corresponding to a visual saliency region of the original image in the target image has a color corresponding to the predetermined color mode.

2. The method according to claim 1, wherein the determining, based on a predetermined color mode, a second rendering color of one or more pixels of an original image according to a first rendering color of the one or more pixels of the original image comprises:
determining, based on a color association corresponding to the predetermined color mode, the second rendering color of the one or more pixels of the original image according to a first color component of the one or more pixels of the original image, wherein the first color component represents a first component of the first rendering color, and the color association represents an association between the first color component and the second rendering color.

3. The method according to claim 2, wherein the predetermined color mode corresponds to a plurality of predetermined colors; and
wherein the determining, based on a color association corresponding to the predetermined color mode, the second rendering color of the one or more pixels of the original image according to a first color component of the one or more pixels of the original image comprises:
determining, based on the color association corresponding to the predetermined color mode, a plurality of first probabilities corresponding to the one or more pixels according to the first color component of the one or more pixels of the original image, wherein the first probability represents a probability of the second rendering color of the pixel being the predetermined color;
determining a target probability corresponding to the one or more pixels according to the plurality of first probabilities corresponding to the one or more pixels; and
determining the second rendering color of the one or more pixels according to the target probability corresponding to the one or more pixels.

4. The method according to claim 3, wherein the determining a target probability corresponding to the one or more pixels according to the plurality of first probabilities corresponding to the one or more pixels comprises:
determining an average probability corresponding to the one or more pixels from the plurality of first probabilities corresponding to the one or more pixels; and
determining the average probability corresponding to the one or more pixels as the target probability corresponding to the one or more pixels.

5. The method according to claim 3, wherein the determining a target probability corresponding to the one or more pixels according to the plurality of first probabilities corresponding to the one or more pixels comprises:
determining a maximum probability corresponding to the one or more pixels from the plurality of first probabilities corresponding to the one or more pixels; and
determining the maximum probability corresponding to the one or more pixels as the target probability corresponding to the one or more pixels.

6. The method according to claim 3, wherein the determining, based on the color association corresponding to the predetermined color mode, a plurality of first probabilities corresponding to the one or more pixels according to the first color component of the one or more pixels of the original image comprises:
determining, based on the color association corresponding to the predetermined color mode, a plurality of second probabilities corresponding to the one or more pixels according to the first color component of the one or more pixels of the original image; and
determining the plurality of first probabilities corresponding to the one or more pixels according to the plurality of second probabilities corresponding to the one or more pixels and one or more first other color components, wherein the first other color component represents any of other components than the first component in the first rendering color.

7. The method according to claim 6, wherein the plurality of predetermined colors comprise black, white, and at least one other color; the plurality of second probabilities comprise a second probability corresponding to black, a second probability corresponding to white, and a second probability corresponding to the at least one other color; the one or more first other color components comprises a second color component and a third color component; and wherein the determining the plurality of first probabilities corresponding to the one or more pixels according to the plurality of second probabilities corresponding to the one or more pixels and one or more first other color components comprises: for a pixel among the one or more pixels, obtaining a first intermediate value corresponding to black according to the second color component of the pixel and the second probability corresponding to black;

obtaining the first probability corresponding to black according to the third color component of the pixel and the first intermediate value corresponding to black, wherein the first probability corresponding to black represents a probability of the second rendering color of the pixel being black;

obtaining a second intermediate value corresponding to white according to the second color component of the pixel and the second probability corresponding to white;

obtaining the first probability corresponding to white according to the third color component of the pixel and the second intermediate value corresponding to white, wherein the first probability corresponding to white represents a probability of the second rendering color of the pixel being white; and obtaining the first probability corresponding to the at least one other color according to the second color component of the pixel, the third color component of the pixel, and the second probability corresponding to the at least one other color, wherein the first probability corresponding to any of the at least one other color represents a probability of the second rendering color of the pixel being the any of the at least one other color.

8. The method according to claim 6, wherein the determining, based on the color association corresponding to the predetermined color mode, a plurality of second probabilities corresponding to the one or more pixels according to the first color component of the one or more pixels of the original image comprises:

processing the first color component of the one or more pixels of the original image based on one or more periodic functions corresponding to the predetermined color mode, so as to obtain the plurality of second probabilities corresponding to the one or more pixels, wherein the color association corresponding to the predetermined color mode is determined by the one or more periodic functions corresponding to the predetermined color mode.

9. The method according to claim 8, wherein the periodic functions corresponding to the predetermined color mode comprise one or more periodic functions corresponding to each of the plurality of predetermined colors; and wherein the processing the first color component of the one or more pixels of the original image based on one or more periodic functions corresponding to the predetermined color mode so as to obtain the plurality of second probabilities corresponding to the one or more pixels comprises: for a pixel among the one or more pixels of the original image, determining a value range corresponding to the first color component of the pixel;

determining, from the one or more periodic functions corresponding to each of the plurality of predetermined colors, a target periodic function corresponding to each of the plurality of predetermined colors according to the value range; and processing the first color component of the pixel based on the target periodic function corresponding to each of the plurality of predetermined colors, so as to obtain the plurality of second probabilities corresponding to the pixel.

10. The method according to claim 1, wherein the determining, based on a predetermined color mode, a second rendering color of one or more pixels of an original image according to a first rendering color of the one or more pixels of the original image comprises:

determining a region to be adjusted in the original image; and determining, based on the predetermined color mode, the second rendering color of the one or more pixels in the region to be adjusted according to the first rendering color of the one or more pixels in the region to be adjusted.

11. The method according to claim 1, wherein the adjusting the second rendering color of the one or more pixels according to the second rendering color of the one or more pixels and an original rendering color of the one or more pixels so as to obtain a third rendering color of the one or more pixels comprises: for a pixel among the one or more pixels, determining a difference value between the second rendering color of the pixel and the original rendering color of the pixel, so as to obtain a difference value corresponding to the pixel; and adjusting the second rendering color of the pixel according to the difference value corresponding to the pixel, so as to obtain the third rendering color of the pixel.

12. An electronic device, comprising:

one or more processors; and a memory configured to store one or more programs, wherein the one or more programs, when executed by the one or more processors, are configured to cause the one or more processors to at least:

determine, based on a predetermined color mode, a second rendering color of one or more pixels of an original image according to a first rendering color of the one or more pixels of the original image, wherein the first rendering color corresponds to a first color space, and the second rendering color corresponds to a second color space;

adjust the second rendering color of the one or more pixels according to the second rendering color of the one or more pixels and an original rendering color of the one or more pixels, so as to obtain a third rendering color of the one or more pixels, wherein the original rendering color and the third rendering color correspond to the second color space, and the first rendering color is obtained by performing a color space conversion on the original rendering color; and obtain a target image according to the third rendering color of the one or more pixels, wherein a region corresponding to a visual saliency region of the original image in the target image has a color corresponding to the predetermined color mode.

13. The electronic device according to claim 12, wherein the one or more programs are further configured to cause the one or more processors to at least:

determine, based on a color association corresponding to the predetermined color mode, the second rendering color of the one or more pixels of the original image according to a first color component of the one or more pixels of the original image, wherein the first color component represents a first component of the first rendering color, and the color association represents an association between the first color component and the second rendering color.

14. The electronic device according to claim 13, wherein the predetermined color mode corresponds to a plurality of predetermined colors; and wherein the one or more programs are further configured to cause the one or more processors to at least:

determine, based on the color association corresponding to the predetermined color mode, a plurality of first probabilities corresponding to the one or more pixels according to the first color component of the one or more pixels of the original image, wherein the first probability represents a probability of the second rendering color of the pixel being the predetermined color;

determine a target probability corresponding to the one or more pixels according to the plurality of first probabilities corresponding to the one or more pixels; and determine the second rendering color of the one or more pixels according to the target probability corresponding to the one or more pixels.

15. The electronic device according to claim 14, wherein the one or more programs are further configured to cause the one or more processors to at least:

determine an average probability corresponding to the one or more pixels from the plurality of first probabilities corresponding to the one or more pixels; and determine the average probability corresponding to the one or more pixels as the target probability corresponding to the one or more pixels.

16. The electronic device according to claim 12, wherein the one or more programs are further configured to cause the one or more processors to at least:

determine a region to be adjusted in the original image; and determine, based on the predetermined color mode, the second rendering color of the one or more pixels in the region to be adjusted according to the first rendering color of the one or more pixels in the region to be adjusted.

17. A non-transitory computer-readable storage medium having executable instructions therein, wherein the instructions, when executed by a processor, are configured to cause the processor to at least:

determine, based on a predetermined color mode, a second rendering color of one or more pixels of an original image according to a first rendering color of the one or more pixels of the original image, wherein the first rendering color corresponds to a first color space, and the second rendering color corresponds to a second color space;

adjust the second rendering color of the one or more pixels according to the second rendering color of the one or more pixels and an original rendering color of the one or more pixels, so as to obtain a third rendering color of the one or more pixels, wherein the original rendering color and the third rendering color correspond to the second color space, and the first rendering color is obtained by performing a color space conversion on the original rendering color; and obtain a target image according to the third rendering color of the one or more pixels, wherein a region corresponding to a visual saliency region of the original image in the target image has a color corresponding to the predetermined color mode.

18. The non-transitory computer-readable storage medium according to claim 17, wherein the instructions are further configured to cause the processor to at least:

determine, based on a color association corresponding to the predetermined color mode, the second rendering color of the one or more pixels of the original image according to a first color component of the one or more pixels of the original image, wherein the first color component represents a first component of the first rendering color, and the color association represents an association between the first color component and the second rendering color.

19. The non-transitory computer-readable storage medium according to claim 18, wherein the predetermined color mode corresponds to a plurality of predetermined colors; and wherein the instructions are further configured to cause the processor to at least:

determine, based on the color association corresponding to the predetermined color mode, a plurality of first probabilities corresponding to the one or more pixels according to the first color component of the one or more pixels of the original image, wherein the first probability represents a probability of the second rendering color of the pixel being the predetermined color;

determine a target probability corresponding to the one or more pixels according to the plurality of first probabilities corresponding to the one or more pixels; and determine the second rendering color of the one or more pixels according to the target probability corresponding to the one or more pixels.

20. The non-transitory computer-readable storage medium according to claim 17, wherein the instructions are further configured to cause the processor to at least:

determine a region to be adjusted in the original image; and determine, based on the predetermined color mode, the second rendering color of the one or more pixels in the region to be adjusted according to the first rendering color of the one or more pixels in the region to be adjusted.

* * * * *